United States Patent
Merg et al.

(10) Patent No.: US 10,692,051 B2
(45) Date of Patent: Jun. 23, 2020

(54) METHOD AND SYSTEM FOR DISPLAYING VEHICLE SERVICE INFORMATION BASED ON ORDERED GROUP OF INFORMATION SET IDENTIFIERS

(71) Applicant: Snap-on Incorporated, Kenosha, WI (US)

(72) Inventors: Patrick S. Merg, Hollister, CA (US); Jacob G. Foreman, Hollister, CA (US); Todd Mercer, Descanso, CA (US); Joshua C. Covington, San Juan Bautista, CA (US); Kahlil H. Cacabelos, San Jose, CA (US); Thomas Southward, San Diego, CA (US); Roy S. Brozovich, Campbell, CA (US)

(73) Assignee: Snap-on Incorporated, Kenosha, WI (US)

( * ) Notice: Subject to any disclaimer, the term of this patent is extended or adjusted under 35 U.S.C. 154(b) by 419 days.

(21) Appl. No.: 15/427,958

(22) Filed: Feb. 8, 2017

(65) Prior Publication Data
US 2018/0225341 A1 Aug. 9, 2018

(51) Int. Cl.
*G06Q 10/00* (2012.01)
*G06F 16/332* (2019.01)
(Continued)

(52) U.S. Cl.
CPC .............. *G06Q 10/20* (2013.01); *G06F 7/08* (2013.01); *G06F 16/285* (2019.01);
(Continued)

(58) Field of Classification Search
CPC .............................. G06Q 10/20; G06F 16/332
See application file for complete search history.

(56) References Cited

U.S. PATENT DOCUMENTS

| 5,414,626 A | 5/1995 | Boorse et al. |
| 7,363,129 B1 | 4/2008 | Barnicle et al. |

(Continued)

FOREIGN PATENT DOCUMENTS

| WO | 02/17118 A2 | 2/2002 |
| WO | 2015035056 A2 | 3/2015 |

OTHER PUBLICATIONS

Honda, 2011 Honda Odyssey Owner's Manual, copyrighted 2010, pp. 153, 614, 616, 631, 674-679, plus front and back covers of manual (12 pages).

(Continued)

*Primary Examiner* — William Spieler
(74) *Attorney, Agent, or Firm* — McDonnell Boehnen Hulbert & Berghoff LLP

(57) ABSTRACT

Methods and systems for displaying information sets in determined orders are described. The information sets comprise vehicle service information. An order of information set identifiers associated with the information sets is based on vehicle identifying information of a subset of vehicles, and an additional search term comprising a symptom identifier and/or a vehicle component identifier of a component located on the vehicles. The information set identifiers of the group can be arranged according to a hierarchy of information set identifiers. The information sets are output to a vehicle service tool (VST) that displays the information sets. The VST can provide feedback data indicative of whether any aspect of an information set was selected while displayed. A server can aggregate feedback data received from multiple instances of displaying the information sets and determine a modified order for at least some of the information set identifiers of the previously determined group.

33 Claims, 22 Drawing Sheets

(51) Int. Cl.
*G06F 7/08* (2006.01)
*G07C 5/08* (2006.01)
*G06F 16/28* (2019.01)
*G07C 5/00* (2006.01)

(52) U.S. Cl.
CPC .......... *G06F 16/332* (2019.01); *G07C 5/085* (2013.01); *G07C 5/0808* (2013.01); *G07C 5/008* (2013.01); *G07C 5/0816* (2013.01); *G07C 2205/02* (2013.01)

(56) References Cited

U.S. PATENT DOCUMENTS

| | | | |
|---|---|---|---|
| 8,145,377 | B2 | 3/2012 | Gilbert |
| 8,630,765 | B2 | 1/2014 | Chen |
| 2002/0103583 | A1 | 8/2002 | Ohmura et al. |
| 2003/0088583 | A1 | 5/2003 | Izuoka et al. |
| 2005/0096805 | A1 | 5/2005 | Fudali et al. |
| 2005/0096868 | A1 | 5/2005 | Trsar et al. |
| 2005/0193252 | A1 | 9/2005 | Cancilla et al. |
| 2005/0234602 | A1 | 10/2005 | Rigsby |
| 2006/0101074 | A1* | 5/2006 | Cancilla ............... G07C 5/0808 |
| 2006/0136104 | A1 | 6/2006 | Brozovich et al. |
| 2007/0156313 | A1 | 7/2007 | Fudali et al. |
| 2008/0119981 | A1* | 5/2008 | Chen .................. G05B 23/0267 701/31.4 |
| 2008/0294423 | A1* | 11/2008 | Castellani ........... G06F 11/0733 704/4 |
| 2008/0307010 | A1 | 12/2008 | Cullison et al. |
| 2011/0035094 | A1 | 2/2011 | Van Den Berg et al. |
| 2012/0011073 | A1* | 1/2012 | Rajpathak ............. G06F 16/355 705/305 |
| 2013/0297247 | A1 | 11/2013 | Jardine |
| 2013/0304306 | A1 | 11/2013 | Selkirk et al. |
| 2014/0074343 | A1 | 3/2014 | Fish et al. |
| 2014/0075356 | A1 | 3/2014 | Gray et al. |
| 2014/0277908 | A1 | 9/2014 | Fish et al. |
| 2015/0046391 | A1* | 2/2015 | Merg ...................... G06F 16/21 707/609 |
| 2015/0066781 | A1 | 3/2015 | Johnson et al. |
| 2015/0121275 | A1 | 4/2015 | Marshall et al. |
| 2016/0071334 | A1 | 3/2016 | Johnson et al. |
| 2017/0098200 | A1* | 4/2017 | Merg ..................... G06Q 10/20 |

OTHER PUBLICATIONS

How To—Collapsibles/Accordion, Learn how to create an accordion (collapsible content), w3schools.com, downloaded Jan. 12, 2017 from http://www.w3schools.com/howto/howto_js_accordion.asp (7 pages).

Limer, Eric, Here's the Iron Man UI Elon Musk Wants to Use to Design Rockets, Sep. 5, 2013, Gizmodo, http://gizmodo.com/heres-the-iron-man-ui-elon-must-wnts-to-use-to-build-1259695025 (2 pages).

Rocheleau, Jake, Best Practices for Accordion Menu in Web Design, downloaded Jan. 12, 2017 from https://webdesignledger.com/best-practices-accordions-in-web-design/ (12 pages).

Seyfert, Karl, OBD II Generic PID Diagnosis, Motor Magazine, Sep. 2007, Troy Michigan (7 pages).

Seyfert, Karl, "OBD II includes many helpful diagnostic trouble codes, designed to identify the possible causes of hundreds of potential system faults. But can it correctly identify a loose nut behind the wheel?", Motor Magazine, Oct. 2015, Troy, Michigan, pp. 4 and 6 (2 pages).

Seyfert, Karl, "OBD II's self-diagnostic capabilities have been a real boon to repair on many vehicles. But the systems on some early vehicles can really throw you a curve.", Motor Magazine, Jun. 2005, Troy, Michigan, pp. 6 and 8 (2 pages).

International Search Report, International Application No. PCT/US2016/053951, dated Dec. 22, 2016 (5 pages).

Written Opinion of the International Searching Authority, International Application No. PCT/US2016/053951, dated Dec. 22, 2016 (5 pages).

International Search Report, International Application No. PCT/US2018/014661, dated Apr. 16, 2018.

Written Opinion, International Application No. PCT/US2018/014661, dated Apr. 16, 2018.

* cited by examiner

FIG. 8

| IS ID | Information Set Categories | Vehicle: YMME_1.1 | | | |
|---|---|---|---|---|---|
| | | Sym.: S1 | Comp.: C1 | Sym. & Comp.: S1 & C1 | |
| IS1 | Additional Related Part Replacements | 10 | | | |
| IS2 | Common Replaced Parts Graph | 9 | | | |
| IS3 | Common Test Strategies | 2 | | 3 | |
| IS4 | Component Connector | | 2 | 4 | |
| IS5 | Component Location | | 3 | 6 | |
| IS6 | Component Operation | | 1 | 2 | |
| IS7 | Diagnosis | 1 | 9 | 1 | |
| IS8 | Final Report | | | | |
| IS9 | Guided Connector | | 4 | | |
| IS10 | Guided Test Procedure | 5 | 5 | 9 | |
| IS11 | Remove & Repair Procedure | | | | |
| IS12 | Images | | | | |
| IS13 | OEM DTC data and Test Procedure | 6 | 8 | 10 | |
| IS14 | OEM Diagrams | | | | |
| IS15 | OEM Specification | | | | |
| IS16 | OEM Test Procedure | 7 | | | |
| IS17 | Parts and Labor | | | | |
| IS18 | Post-repair Procedure | | | | |
| IS19 | Real Fix Tip | 8 | 10 | 8 | |
| IS20 | Related Real Fix Tip | | | | |
| IS21 | Repair Specification | | | | |
| IS22 | RO Information | | | | |
| IS23 | Technical Service Bulletin | | | | |
| IS24 | Technician Note | | | | |
| IS25 | Test Specifications | 4 | 7 | 7 | |
| IS26 | Troubleshooter | 3 | | 5 | |
| IS27 | Waveform Library | | | | |
| IS28 | Wiring Diagram | | 6 | | |

| IS ID | Information Set Categories | Vehicle: YMME_1.1 | | | |
|---|---|---|---|---|---|
| | | Sym.: S2 | Comp.: C3 | Sym. & Comp.: S2 & C3 | |
| IS1 | Additional Related Part Replacements | | | | |
| IS2 | Common Replaced Parts Graph | | 6 | 10 | |
| IS3 | Common Test Strategies | 2 | 3 | 4 | |
| IS4 | Component Connector | | | | |
| IS5 | Component Location | | 2 | 3 | |
| IS6 | Component Operation | | 1 | 1 | |
| IS7 | Diagnosis | 1 | | 2 | |
| IS8 | Final Report | | | | |
| IS9 | Guided Connector | | | | |
| IS10 | Guided Test Procedure | 5 | | 9 | |
| IS11 | Remove & Repair Procedure | | 7 | | |
| IS12 | Images | 6 | | | |
| IS13 | OEM DTC data and Test Procedure | | | | |
| IS14 | OEM Diagrams | | | | |
| IS15 | OEM Specification | | | | |
| IS16 | OEM Test Procedure | 7 | 4 | 7 | |
| IS17 | Parts and Labor | | | | |
| IS18 | Post-repair Procedure | | 10 | | |
| IS19 | Real Fix Tip | 8 | | | |
| IS20 | Related Real Fix Tip | | 8 | | |
| IS21 | Repair Specification | | | | |
| IS22 | RO Information | | | | |
| IS23 | Technical Service Bulletin | 10 | 9 | 8 | |
| IS24 | Technician Note | 9 | 5 | | |
| IS25 | Test Specifications | 4 | | 6 | |
| IS26 | Troubleshooter | 3 | | 5 | |
| IS27 | Waveform Library | | | | |
| IS28 | Wiring Diagram | | | | |

| IS ID | Information Set Categories | Vehicle: YMME_1.1 | | |
|---|---|---|---|---|
| | | Sym.: S2 | Comp.: C3 | Sym. & Comp.: S2 & C3 |
| IS1 | Additional Related Part Replacements | 18 | 13 | 18 |
| IS2 | Common Replaced Parts Graph | 13 | 6 | 10 |
| IS3 | Common Test Strategies | 2 | 3 | 4 |
| IS4 | Component Connector | 25 | 25 | 25 |
| IS5 | Component Location | 11 | 2 | 3 |
| IS6 | Component Operation | 12 | 1 | 1 |
| IS7 | Diagnosis | 1 | 15 | 2 |
| IS8 | Final Report | 17 | 14 | 17 |
| IS9 | Guided Connector | 26 | 26 | 26 |
| IS10 | Guided Test Procedure | 5 | 19 | 9 |
| IS11 | Remove & Repair Procedure | 14 | 7 | 14 |
| IS12 | Images | 22 | 20 | 22 |
| IS13 | OEM DTC data and Test Procedure | 6 | 24 | 13 |
| IS14 | OEM Diagrams | 24 | 23 | 24 |
| IS15 | OEM Specification | 23 | 22 | 23 |
| IS16 | OEM Test Procedure | 7 | 4 | 7 |
| IS17 | Parts and Labor | 19 | 17 | 19 |
| IS18 | Post-repair Procedure | 16 | 10 | 16 |
| IS19 | Real Fix Tip | 8 | 11 | 15 |
| IS20 | Related Real Fix Tip | 20 | 16 | 20 |
| IS21 | Repair Specification | 15 | 8 | 12 |
| IS22 | RO Information | 21 | 18 | 21 |
| IS23 | Technical Service Bulletin | 10 | 9 | 11 |
| IS24 | Technician Note | 9 | 5 | 8 |
| IS25 | Test Specifications | 4 | 21 | 6 |
| IS26 | Troubleshooter | 3 | 17 | 5 |
| IS27 | Waveform Library | 27 | 27 | 27 |
| IS28 | Wiring Diagram | 28 | 28 | 28 |

FIG. 11

☐ | P0335 | Diagnose > P0725 > Job Preview > Repair > Job Summary | 📋 NO TSBs | ≡ ⋯

Related Codes: P0725
Related Component: Crankshaft Position Sensor ⌄ Related Symptom: No Start ⌄

→ Common Replaced Parts Graph + 3263 ▸

☐ crankshaft position sen..
☐ camshaft position senso..
☐ drive belt (108)
☐ spark plug (40)
☐ engine mount (11)
☐ crankshaft position sen..

(graph with values 804, 526, 256, 0 on y-axis; 0k, 25k, 50k, 75k, 100k, 125k, 150k, 175k, 200k on x-axis)

→ Related Real Fixes ▸

| Real Fix Title | Fixed It |
|---|---|
| P0335, P0725, Replaced Crankshaft Position Sensor, | 1189 |
| P0335, P0725, Replaced Camshaft Position Sensor, | 1030 |
| P0335, Replaced Camshaft Position Sensor, Crank... | 260 |

→ Troubleshooter ▸

Tip - P0335
P0335 - Crankshaft Position Sensor A Circuit Malfunction
P0335 sets when ECM does not detect 1 degree signal from crankshaft position sensor (CKPS) during cranking or when...
Possible Causes
Possible causes are faulty crankshaft position sensor, weak battery or faulty starting system.

→ Real Fix + 1502 ▸

P0335, Replaced Crankshaft Position Sensor
Complaint
The customer states the check engine light is on.
Cause
Connected a scan tool and found code P0335 - Crankshaft Position Sensor "A" Circuit. Visual inspection of the crankshaft position (CKP) sensor wiring found no apparent damage.

| Wiring Diagram | Vehicle ID | Vehicle Component ID | Symptom ID |
|---|---|---|---|
| WD_1 | YMME_1.1 | C1, C2, C3, C4 | S1 |
| WD_2 | YMME_4.2 | C4, C5 | S2 |
| WD_3 | YMME_6.5 | C3, C9 | S5 |
| WD_4 | YMME_3.2 | C5 | S10, S11 |
| WD_5 | YMME_3.2 | C1 | S1 |
| WD_6 | YMME_5, YMME_9 | C1, C2, C4 | S1 |
| Null | YMME_12.1 | ALL | ALL |
| Null | YMME_2.1 | C5 | S10 |
| Null | YMME_16.2 | C8 | S6 |

```
┌─────────────────────────────────────────────────────────────────────────┐
│ RECEIVING, BY AT LEAST ONE PROCESSOR OF A SERVER, A REQUEST SENT FROM A │
│ FIRST VEHICLE SERVICE TOOL, WHEREIN THE REQUEST COMPRISES VEHICLE       │
│ IDENTIFYING INFORMATION AND AN ADDITIONAL SEARCH TERM, WHEREIN THE      │
│ ADDITIONAL SEARCH TERM COMPRISES (I) A SYMPTOM IDENTIFIER, BUT NOT A    │
│ VEHICLE COMPONENT IDENTIFIER, (II) THE VCI, BUT NOT THE SYMPTOM         │
│ IDENTIFIER, OR (III) THE SYMPTOM IDENTIFIER AND THE VCI IDENTIFIER,     │
│ WHEREIN THE VEHICLE IDENTIFYING INFORMATION IDENTIFIES A SUBSET OF      │
│ VEHICLES WITHIN A SET OF ALL VEHICLES, WHEREIN THE SYMPTOM IDENTIFIER   │
│ IDENTIFIES A SYMPTOM EXHIBITABLE WITHIN EACH VEHICLE OF THE SUBSET OF   │
│ VEHICLES, AND WHEREIN THE VEHICLE COMPONENT IDENTIFIER IDENTIFIERS A    │
│ COMPONENT ON EACH VEHICLE OF THE SUBSET OF VEHICLES                     │
└─────────────────────────────────────────────────────────────────────────┘
                                    │
                                    ▼  ─171
┌─────────────────────────────────────────────────────────────────────────┐
│ DETERMINING, BY THE AT LEAST ONE PROCESSOR OF THE SERVER, AN ORDERED    │
│ GROUP OF INFORMATION SET IDENTIFIERS BASED ON THE ADDITIONAL SEARCH     │
│ TERM, WHEREIN EACH INFORMATION SET IDENTIFIER IS ASSOCIATED WITH AN     │
│ INFORMATION SET CATEGORY                                                │
└─────────────────────────────────────────────────────────────────────────┘
                                    │
                                    ▼  ─172
┌─────────────────────────────────────────────────────────────────────────┐
│ DETERMINING, BY THE AT LEAST ONE PROCESSOR OF THE SERVER, MULTIPLE      │
│ INFORMATION SETS TO POPULATE A RESPONSE TO THE REQUEST, WHEREIN         │
│ DETERMINING THE MULTIPLE INFORMATION SETS COMPRISES DETERMINING THE,    │
│ FOR EACH INFORMATION SET IDENTIFIER OF THE ORDERED GROUP OF INFORMATION │
│ SET IDENTIFIERS, AN INFORMATION SET PERTAINING TO (I) THE SUBSET OF     │
│ VEHICLES, (II) THE ADDITIONAL SEARCH TERM, AND (III) THE INFORMATION    │
│ SET CATEGORY ASSOCIATED WITH THE INFORMATION SET IDENTIFIER             │
└─────────────────────────────────────────────────────────────────────────┘
                                    │
                                    ▼  ─173
┌─────────────────────────────────────────────────────────────────────────┐
│ TRANSMITTING, BY THE SERVER TO THE FIRST VEHICLE SERVICE TOOL, THE      │
│ RESPONSE TO THE REQUEST, THE RESPONSE COMPRISING DATA INDICATIVE OF     │
│ THE ORDERED GROUP OF INFORMATION SET IDENTIFIERS AND THE DETERMINED     │
│ MULTIPLE INFORMATION SETS                                               │
└─────────────────────────────────────────────────────────────────────────┘
                                                                    ─174
  ↗
170

FIG. 22
```

```
┌─────────────────────────────────────────────────────────────────────┐
│ RECEIVING, BY AT LEAST ONE PROCESSOR OF A VEHICLE SERVICE TOOL (VST), AN │
│ INPUT ASSOCIATED WITH VEHICLE IDENTIFYING INFORMATION AND AN ADDITIONAL │
│ SEARCH TERM, WHEREIN THE ADDITIONAL SEARCH TERM COMPRISES (I) A SYMPTOM │
│ IDENTIFIER, BUT NOT A VEHICLE COMPONENT IDENTIFIER, (II) THE VEHICLE │
│ COMPONENT IDENTIFIER, BUT NOT THE SYMPTOM IDENTIFIER, OR (III) THE SYMPTOM │
│ IDENTIFIER AND THE VEHICLE COMPONENT IDENTIFIER, WHEREIN THE VEHICLE │
│ IDENTIFYING INFORMATION IDENTIFIES A SUBSET OF VEHICLES WITHIN A SET OF ALL │
│ VEHICLES, WHEREIN THE SYMPTOM IDENTIFIER IDENTIFIES A SYMPTOM EXHIBITABLE │
│ WITHIN EACH VEHICLE OF THE SUBSET OF VEHICLES, AND WHEREIN THE VEHICLE │
│ COMPONENT IDENTIFIER IDENTIFIES A COMPONENT ON EACH VEHICLE OF THE │
│ SUBSET OF VEHICLES                                                  │
└─────────────────────────────────────────────────────────────────────┘
                                                              ↘181
                                  ↓
┌─────────────────────────────────────────────────────────────────────┐
│ TRANSMITTING, BY THE AT LEAST ONE PROCESSOR TO A SERVER, A REQUEST │
│ COMPRISING THE VEHICLE IDENTIFYING INFORMATION AND THE ADDITIONAL SEARCH │
│ TERM                                                                │
└─────────────────────────────────────────────────────────────────────┘
                                                              ↘182
                                  ↓
┌─────────────────────────────────────────────────────────────────────┐
│ RECEIVING, BY THE AT LEAST ONE PROCESSOR, A RESPONSE TO THE REQUEST, │
│ THE RESPONSE COMPRISING DATA INDICATIVE OF AN ORDERED GROUP OF │
│ INFORMATION SET IDENTIFIERS AND MULTIPLE INFORMATION SETS OF VEHICLE │
│ SERVICE INFORMATION                                                 │
└─────────────────────────────────────────────────────────────────────┘
                                                              ↘183
                                  ↓
┌─────────────────────────────────────────────────────────────────────┐
│ DISPLAYING, BY A DISPLAY CONNECTED TO THE AT LEAST ONE PROCESSOR, THE │
│ MULTIPLE INFORMATION SETS OF VEHICLE SERVICE INFORMATION ACCORDING TO │
│ THE ORDERED GROUP OF INFORMATION SET IDENTIFIERS                    │
└─────────────────────────────────────────────────────────────────────┘
                                                              ↘184
```

METHOD AND SYSTEM FOR DISPLAYING VEHICLE SERVICE INFORMATION BASED ON ORDERED GROUP OF INFORMATION SET IDENTIFIERS

BACKGROUND

The complexity of vehicles continues to increase due to various factors such as increasingly stricter government regulations pertaining to fuel consumption and passenger safety, and increasingly greater customer expectations. Better trained and better informed vehicle technicians are required to service and repair the highly complex vehicles built today as compared to the vehicle technicians working on vehicles built only a few years ago or before. As a result, systems and methods that result in better trained or better informed technicians are highly desirable.

Providing vehicle service information (VSI) relevant to a vehicle or particular symptom being worked on by a vehicle technician can be quite challenging. A system that can provide VSI to a vehicle technician in a manner in which the VSI deemed to be most relevant to the vehicle or particular symptom being worked on may be highly desirable to a vehicle technician.

Providers of VSI can be broadly classified as an original equipment manufacturer (OEM) provider of VSI or an aftermarket provider of VSI. The OEM provider typically provides VSI regarding the vehicles it builds. The aftermarket provider typically does not build any vehicles, but does provide VSI regarding vehicles built by an OEM.

In many instances, certain types of VSI are not available to an OEM or aftermarket provider of VSI. For example, when a new vehicle model is introduced by an OEM, the OEM may not have written any technical service bulletins regarding the new vehicle model or certain vehicle components on the new vehicle model. As another example, as a result of owners of new vehicles typically taking the new vehicles to repair shops affiliated with the OEM while the new vehicles are still within the warranty period, the frequency of new vehicles being repaired at an aftermarket repair shop not affiliated with an OEM is typically quite low during the warranty period. Consequently, the amount of VSI based on content provided by the aftermarket repair shops during the initial warranty period of the new vehicles can be quite low or even non-existent. As still yet another example, an OEM provider of VSI may license the use of its VSI to an aftermarket provider of VSI. In some instances, the OEM provider of VSI may stop providing its VSI to the aftermarket provider because a license agreement for providing VSI to the aftermarket provider has expired.

A vehicle technician that receives VSI from a VSI provider that provides VSI in a fixed format may not be satisfied with the VSI provider if the VSI provider provides the VSI in accordance with the fixed format, especially if the fixed format includes identifying one or more categories of VSI for which the VSI provider does have any VSI to provide the vehicle technician.

Overview

Several example embodiments that relate to displaying information sets of vehicle service information associated with an ordered group of information set identifiers based on vehicle identifying information that identifies a subset of vehicles and based on an additional search term comprise a symptom identifier and/or a vehicle component identifier are described herein.

Viewed from one aspect, an example embodiment takes the form of a method comprising: (i) receiving, by at least one processor of a server, a request sent from a first vehicle service tool, wherein the request comprises vehicle identifying information and an additional search term, wherein the additional search term comprises (a) a symptom identifier, but not a vehicle component identifier, (b) the vehicle component identifier, but not the symptom identifier, or (c) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles; (ii) determining, by the at least one processor of the server, an ordered group of information set identifiers based on the additional search term, wherein each information set identifier is associated with an information set category; (iii) determining, by the at least one processor of the server, multiple information sets to populate a response to the request, wherein determining the multiple information sets comprises determining, for each information set identifier of the ordered group of information set identifiers, an information set pertaining to (a) the subset of vehicles, (b) the additional search term, and (c) the information set category associated with the information set identifier; and (iv) transmitting, by the server to the first vehicle service tool, the response to the request, the response comprising data indicative of the ordered group of information set identifiers and the determined multiple information sets.

Viewed from another aspect, an example embodiment takes the form of a system comprising: at least one processor; and a computer-readable medium connected to the processor and comprising program instructions executable by the at least one processor to: (i) receive a request sent from a first vehicle service tool, wherein the request comprises vehicle identifying information and an additional search term, wherein the additional search term comprises (a) a symptom identifier, but not a vehicle component identifier, (b) the vehicle component identifier, but not the symptom identifier, or (c) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles; (ii) determine an ordered group of information set identifiers based on the additional search term, wherein each information set identifier is associated with an information set category; (iii) determine multiple information sets to populate a response to the request, wherein determining the multiple information sets comprises determining, for each information set identifier of the ordered group of information set identifiers, an information set pertaining to (a) the subset of vehicles, (b) the additional search term, and (c) the information set category associated with the information set identifier; and (iv) transmit to the first vehicle service tool the response to the request, the response comprising data indicative of the ordered group of information set identifiers and the determined multiple information sets Viewed from yet another aspect, an example embodiment takes the form of a computer-readable medium having stored thereon instructions executable by at least one processor to cause a server to perform functions comprising: (i) receiving a request sent from a first vehicle service tool, wherein the request comprises vehicle identifying information and an additional search term, wherein the additional search term comprises (a) a symptom identifier, but not a vehicle component identifier, (b) the vehicle component identifier, but not the symptom identifier, or (c) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles; (ii) determining an ordered group of information set identifiers based on the additional search term, wherein each information set identifier is associated with an information set category; (iii) determining multiple information sets to populate a response to the request, wherein determining the multiple information sets comprises determining, for each information set identifier of the ordered group of information set identifiers, an information set pertaining to (a) the subset of vehicles, (b) the additional search term, and (c) the information set category associated with the information set identifier; and (iv) transmitting to the first vehicle service tool the response to the request, the response comprising data indicative of the ordered group of information set identifiers and the determined multiple information sets.

Viewed from yet another aspect, an example embodiment takes the form of a method comprising: (a) receiving, by at least one processor of a vehicle service tool (VST), an input associated with vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles; (b) transmitting, by the at least one processor to a server, a request comprising the vehicle identifying information and the additional search term; (c) receiving, by the at least one processor, a response to the request, the response comprising data indicative of an ordered group of information set identifiers and multiple information sets of vehicle service information; and (d) displaying, by a display connected to the at least one processor, the multiple information sets of vehicle service information according to the ordered group of information set identifiers.

Viewed from yet another aspect, an example embodiment takes the form of a system comprising: at least one processor of a vehicle service tool (VST); a display connected to the at least one processor; and a computer-readable medium connected to the at least one processor and comprising program instructions executable by the at least one processor to: receive an input associated with vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles; transmit, to a server, a request comprising the vehicle identifying information and the additional search term; receive a response to the request, the response comprising data indicative of an ordered group of information set identifiers and multiple information sets of vehicle service information; and display, by the display, the multiple information sets of vehicle service information according to the ordered group of information set identifiers.

Viewed from yet another aspect, an example embodiment takes the form of a computer-readable medium having stored thereon instructions executable by at least one processor to cause a vehicle service tool (VST) to perform functions comprising: receiving an input associated with vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles; transmitting, to a server, a request comprising the vehicle identifying information and the additional search term; receiving a response to the request, the response comprising data indicative of an ordered group of information set identifiers and multiple information sets of vehicle service information; and displaying, by a display connected to the at least one processor, the multiple information sets of vehicle service information according to the ordered group of information set identifiers.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 8, FIG. 9, and FIG. 10 show examples of display card data in accordance with the example embodiments.

FIG. 11, FIG. 12, FIG. 13, FIG. 14, FIG. 15, FIG. 16, FIG. 17, FIG. 18, and FIG. 19 show example displays showing example information set identifiers.

FIG. 22 and FIG. 23 are flowcharts depicting sets of functions that can be carried out in accordance with the example embodiments.

DETAILED DESCRIPTION

This description describes several example embodiments, at least some which pertain to determining an ordered group of information set identifiers and displaying information sets of vehicle service information associated with the ordered group of information set identifiers based on vehicle identifying information that identifies a subset of vehicles and based on an additional search term comprise a symptom identifier and/or a vehicle component identifier are described herein. The determined ordered group of information set identifiers and the information sets can be output by a server. A vehicle service tool can be configured to request, receive, and display the information sets on a display in an order matching the determined ordered group of information set identifiers associated with the displayed information sets. The server can dynamically alter a predetermined ordered group of information set identifiers in response to determining an information set is not available for an information set identifier within the predetermined ordered group of information set identifiers. The information sets can be displayed on a display in a display format, such as a display card format, a paragraph format, a table format, or some other display format. A display format can include an accordion format for displaying different amounts of VSI within an information set based on whether an unexpanded or expanded state of the information set is selected.

Figure 1:
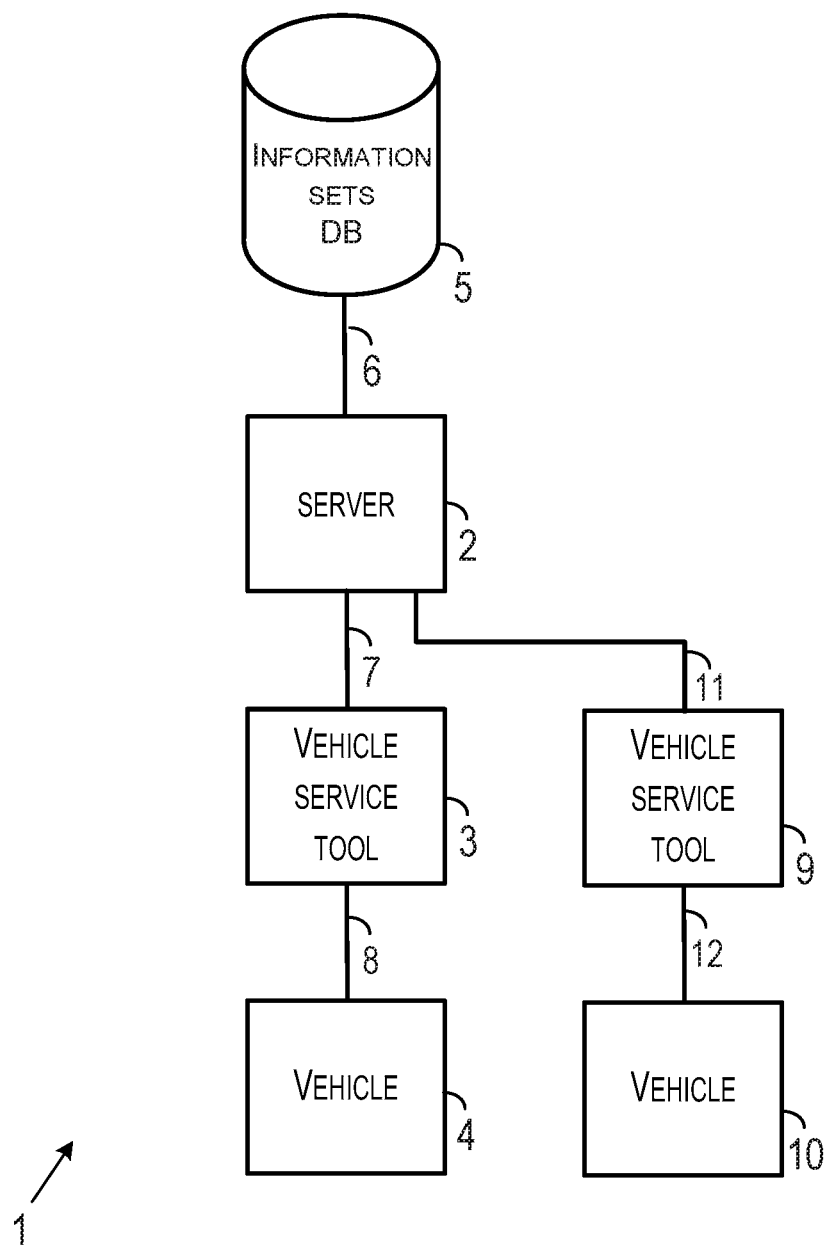
FIG. 1 is a diagram showing an example operating environment in which the example embodiments can operate.

FIG. 1 is a diagram showing an example operating environment 1 in which the example embodiments can operate. The operating environment 1 comprises a server 2, a vehicle service tool 3, a vehicle 4, an information set database (IS DB) 5, a communication link 6 to connect the server 2 and the IS DB 5, a communication link 7 connecting the server 2 and the VST 3, and a communication link 8 to connect the VST 3 and the vehicle 4. The IS DB 5 can comprise and/or be stored on a computer-readable memory (CRM). Example details regarding the server 2, the VST 3, and the IS DB 5 are discussed below.

One or more of the communication links 6, 7, and 8 can comprise a removably connectable communication link. For example, the communication link 8 can comprise a wiring harness with connectors on opposite ends of the harness that are removably connectable to the VST 3 and to the vehicle 4. As an example, one of the wiring harness connectors can be fastened to a mating connector on the VST 3 via fasteners (e.g., screws), and another of the wiring harness connectors can comprise a friction fit connector that mates with a data link connector in the vehicle 4 as well as similar data link connectors in other vehicles. Other types of connectors that make up part of a harness or connect to the wires within the harness are also possible.

One or more of the communication links 6, 7, and 8 can comprise various communication network components such as switches, modems, gateways, antennas, cables, transmitters, and/or receivers. The communication network components can be configured to perform communications using a Transmission Control Protocol (TCP) and the Internet Protocol (IP), such as the communication network commonly referred to as the Internet, or using a different communication network protocol. As an example, the communication link 7 can comprise a wide area network (WAN). The WAN can carry data using packet-switched and/or circuit-switched technologies. The WAN can comprise an air interface or wire to carry the data.

One or more of the communication links 6, 7, and 8 can comprise a wired data bus, a cable, or a fiber optic cable. For example, the communication link 6 can comprise a printed circuit on a circuit board to connect a CRM of the IS DB 5 to a processor within the server 2. As another example, the cable of a communication link connected to a database and to the server can comprise a serial attached SCSI (SAS) cable, a serial AT attachment (SATA) cable, an eSATA cable, or another type of cable to connect the database to the server 2. Other examples of the communication links 6, 7, and 8 are also possible.

The VST 3 and the vehicle 4 can be connected to each other via a wired communication link, a wireless communication link or both a wired communication link and a wireless communication link. The VST 3 and the server 2 can be connected to each other via a wired communication link, a wireless communication link or both a wired communication link and a wireless communication link.

A vehicle, such as vehicle 4, is a mobile machine that can be used to transport a person, people, or cargo. As an example, any vehicle discussed herein can be driven and/or otherwise guided along a path (e.g., a paved road or otherwise) on land, in water, or in the air or outer space. Driving and/or guiding a vehicle can occur manually or autonomously. As another example, any vehicle discussed herein can be wheeled, tracked, railed, or skied. As yet another example, any vehicle discussed herein can comprise an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. As an example, a vehicle guided along a path can comprise a van (such as a dry or refrigerated van), a tank trailer, a platform trailer, or an automobile carrier. As still yet another example, any vehicle discussed herein can comprise or use any appropriate voltage or current source, such as a battery, an alternator, a fuel cell, and the like, providing any appropriate current or voltage, such as about 12 volts, about 42 volts, and the like. As still yet another example, any vehicle discussed herein can comprise or use any desired system or engine. Those systems or engines can comprise items that use fossil fuels, such as gasoline, natural gas, propane, and the like, electricity, such as that generated by a battery, magneto, fuel cell, solar cell and the like, wind and hybrids or combinations thereof. As still yet another example, any vehicle discussed herein can comprise an ECU, a data link connector (DLC), and a vehicle communication link that connects the DLC to the ECU.

A vehicle manufacturer can build various quantities of vehicles each calendar year (i.e., January $1^{st}$ to December $31^{st}$). In some instances, a vehicle manufacturer defines a model year for a particular vehicle model to be built. The model year can start on a date other than January $1^{st}$ and/or can end on a date other than December $31^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can comprise vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle using particular vehicle identifying information. These other features can be identified in various manners, such as a regular production option (RPO) code, such as the RPO codes defined by the General Motors Company LLC, Detroit Mich. For purposes of this description, examples of different vehicle identifying information are indicated by the term YMM or YMME followed by an underscore and a whole number (e.g., YMME_1 and YMME_2).

The vehicle identifying information (e.g., a vehicle identifier) can comprise a vehicle identification number (VIN). A VIN is a unique identifier assigned to particular vehicles. Each VIN can comprise characters indicative of a YMM or YMME as well as other characteristics of the vehicle. As an example, a VIN can comprise a seventeen character VIN, in which the first through third characters represent a world make identifier including the country where the vehicle was built, the fourth and fifth characters represent a carline series, the sixth character represents a body style, the seventh character represents a restraint code, the eighth character represents an engine type, the ninth character represents a check digit, a tenth character represents a model year, the eleventh character represents a plant where the vehicle was built, and the twelfth through seventeenth character represent a production sequence number for the vehicle.

A vehicle communication link within a vehicle can comprise one or more conductors (e.g., copper wire conductors) or can be wireless. As an example, a vehicle communication link can comprise one or two conductors for carrying vehicle data messages in accordance with a vehicle data message (VDM) protocol. A VDM protocol can comprise a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle.

For purposes of this description, an ECU is a vehicle component. An ECU can control various aspects of vehicle operation or other vehicle components within a vehicle. For example, an ECU can comprise a powertrain (PT) system ECU, an engine control module (ECM) ECU, a supplemental inflatable restraint (SIR) system (i.e., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within a vehicle. Performance of a functional test can or a reset procedure with respect to an ECU can comprise the display device 4 transmitting a VDM to a vehicle. A VDM received an ECU can comprise a PID request. A VDM transmitted by an ECU can comprise a response comprising the PID and a PID data value for the PID. In the drawings, an ECU input is represented by the capital letter "I" and a whole number (e.g., "I5"), and an ECU output is represented by the capital letter "O" and a whole number (e.g., "O5."

The DLC within the vehicle 4 can comprise a connector such as an OBD I connector, an OBD II connector, or some other connector. An OBD II connector can comprise slots for retaining up to sixteen connector terminals, but can comprise a different number of slots or no slots at all. As an example, a DLC connector can comprise an OBD II connector that meets the SAE J1962 specification such as a connector 16M, part number 12110252, available from Delphi Automotive LLP of Troy, Mich. The DLC can comprise conductor terminals that connect to a conductor in a vehicle. For instance, the DLC can comprise connector terminals that connect to conductors that respectively connect to positive and negative terminals of a vehicle battery. The DLC can comprise one or more conductor terminals that connect to a conductor of the vehicle communication link such that the DLC is communicatively connected to the ECU within the vehicle 4.

A person skilled in the art, upon reading this description, will understand that the VST 3 and the server 2 can operate to request, receive, and output information sets of VSI and information set data, and to perform other described functions regardless of whether or not a vehicle, such as the vehicle 4, is connected to the VST 3. The server 2 can serve more than one VST. Accordingly, FIG. 1 shows the example operating environment 1 can comprise a VST 9 connected to the server 2 via a communication link 11 and to a vehicle 10 via a communication link 12. The VST 9 can be configured like the VST 3. The communication links 7 and 11 can be the same communication link.

Figure 2:
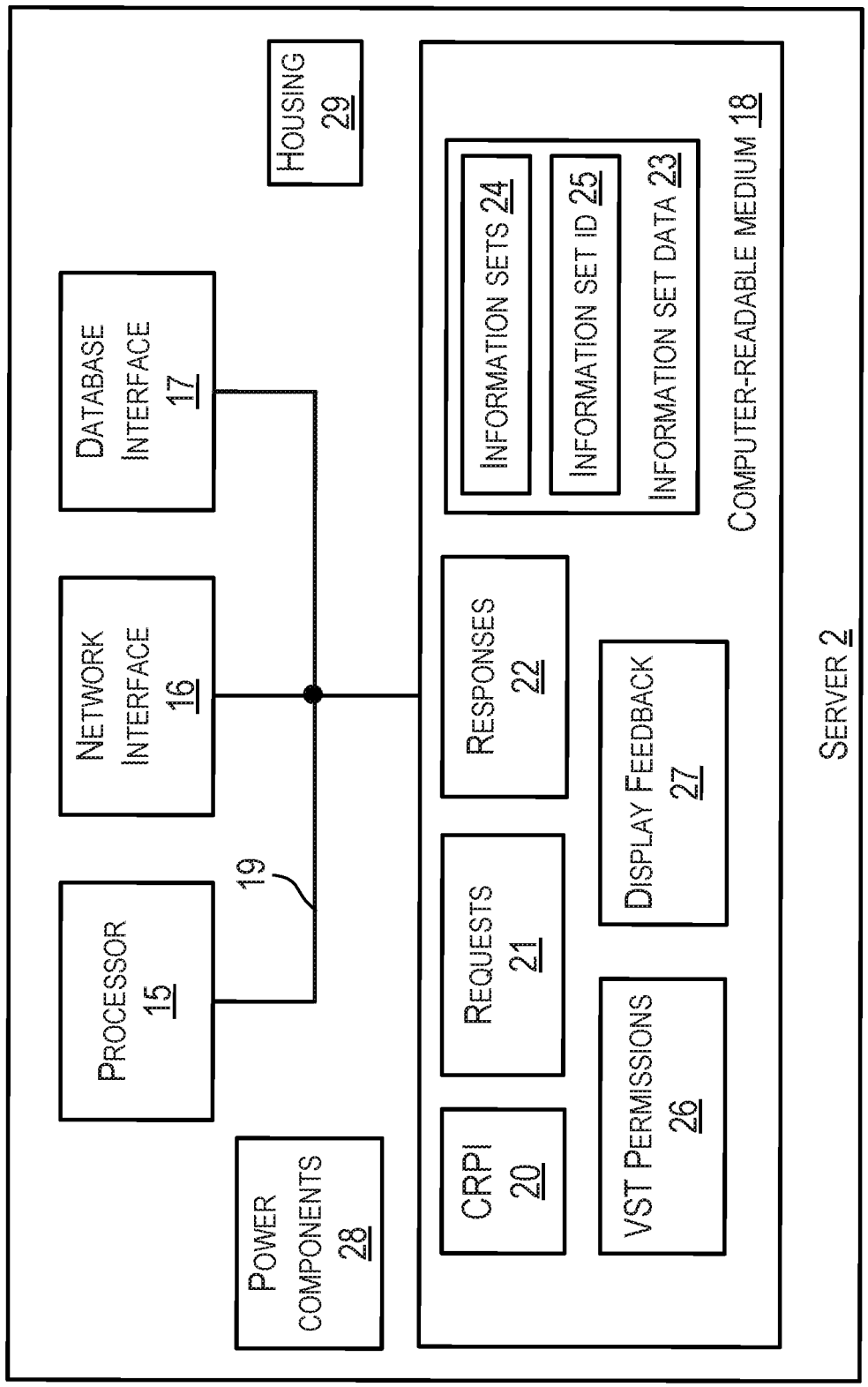
FIG. 2 is a block diagram of an example server.

Next, FIG. 2 is a block diagram showing example components and content of the server 2. As shown in FIG. 2, the server 2 can comprise a processor 15, a network interface 16, a database interface 17, a computer-readable medium (CRM) 18, and a connection mechanism 19 that communicatively couples two or more of the processor 15, the network interface 16, the database interface 17, and the computer-readable medium 18 together. As an example, the connection mechanism 19 can comprise a system bus or network to carry data to another component of the server 2 in a serial or parallel manner. The connection mechanism 19 can comprise multiple connectors configured to mate with a connector of a component of the server 2. The server 2 can comprise a circuit board, such as a printed circuit board. One or more of the other components of the server 2 can be mounted to the circuit board. A component mounted to the circuit board can be referred to as being "on-board" the server 2.

The processor 15, and any other processor discussed in this description, can comprise one or more processors. Accordingly, a processor can be referred to as "at least one processor." Each processor discussed in this description can comprise a general purpose processor (e.g., an INTEL® single core microprocessor or an INTEL® multicore microprocessor), or a special purpose processor (e.g., a digital signal processor, a graphics processor, or an application specific integrated circuit (ASIC) processor). Each processor discussed in this description can be configured to execute computer-readable program instructions (CRPI). For example, the processor 15 can execute the CRPI 20 stored in the CRM 18. Each processor discussed in this description can be configured to execute hard-coded functionality in addition to or as an alternative to software-coded functionality (e.g., via CRPI). In particular, the processor 15 can be programmed to perform any function or combination of functions discussed in this description as being performed by the server 2 or by a component of the server 2.

The CRM 18, and any other CRM discussed in this description, can comprise one or more memories. Each memory of a CRM can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A CRM, such as a CRM storing and/or within a database, can comprise a rotatable disk (e.g., one or more disks). For example, the rotatable disk can comprise an AT Attachment (ATA) disk, a serial ATA (SATA) disk, a serial attached SCSI (SAS) disk, redundant array of inexpensive disks (RAID), or another type of rotatable disk configured to operate as a memory. Additionally or alternatively, a CRM, such as a CRM storing and/or within a database, can comprise a solid state drive, such as a flash disk.

The CRM 18 stores computer-readable data, such as the CRPI 20, requests 21, responses 22, information set data 23, information sets 24, information set identifiers 25, VST permissions 26, and display feedback 27. The information set data 23 can comprise some or all of the IS DB 5. The information sets 24 can comprise some or all of the IS DB 5, such as data the processor 15 determines is to be sent to the VST 3 in response to a request for VSI. The information set data 23 can comprise information set identifiers 25, each of which is associated with an information set category. The information set data 23 can comprise other data used to form a response to a request the server 2 receives from the VST 3. That other data of the information set data 23 can, for example, comprise display format data indicative of how an information set is to be displayed on a display of the VST 3. As an example, the display format data can comprise a display format such as a display card format, a paragraph format, a table format, or some other display format. The information set data 23 can also comprise new display card data that is to be stored in the IS DB 5. The information sets 24 can comprise new VSI that is to be stored in the IS DB 5.

The display feedback 27 can comprise data the processor 15 uses to modify an order of information set identifiers within the information set data 23. The processor 15 can aggregate separate instances of display feedback data received from one or more instances of the VST 3 within the display feedback 27. The display feedback 27 can indicate that information set identifiers with ordered group of information set identifiers IS7, IS3, IS26, IS25, IS10, IS13, IS 16, IS19, IS24, and IS23 (i.e., the first ten information set identifiers (shown as order numbers 1 to 10) in the ordered group of information set identifiers 91 shown in FIG. 10) have been selected 145, 130, 180, 128, 97, 93, 77, 52, 17, and 3 times, respectively, by aggregating display feedback provided by various VSTs. The processor 15 can determine that the display card IS26 has been selected more than a threshold number of times than another display card in the set of ordered display cards and alter the set of ordered display cards such that the display card selected more often is moved higher up in a hierarchy of display cards. For example, the processor 15 could alter the group of ordered information set identifiers 90 to be IS26, IS7, IS3, IS25, IS10, IS13, IS 16, IS19, IS24, and IS23, wherein IS26 is moved up in the hierarchy of information set identifiers and IS7 and IS3 are moved down in the hierarchy of information set identifiers.

Furthermore, the display feedback 27 can comprise data that another information set, such as IS6 was selected more often by vehicle technicians than IS23 when manually searching for information sets to diagnose a symptom with symptom ID S2 for a vehicle identified by vehicle ID YMME_1.1. The processor 15 can use that display feedback to alter the ordered group of information set identifiers 91 by removing IS 23 and inserting IS6 such that the set of ordered display cards becomes IS7, IS3, IS26, IS25, IS10, IS13, IS 16, IS19, IS24, and IS6. Other examples of using the display feedback 27 are also possible.

Furthermore, the display feedback 27 can comprise data indicative of user engagement with an information set. As an example, the data indicative of user engagement can comprise an amount of time, such as an amount of time between when a user selects a first information set until the user selects a second information set, or an amount of time the VST 3 determines the user is looking at a display of a user interface 32 while the display is displaying the information set. As another example, the data indicative of user engagement can comprise data indicative of the quantity of time(s) users view and/or select the information set while displayed on the display.

The CRPI 20 can comprise a plurality of program instructions. The CRPI 20 can comprise data structures, objects, programs, routines, or other program modules that can be accessed by the processor 15 and/or executed by the processor 15 to perform any function or group of functions described in this description as being formed by the server 2 and/or by a component of the server 2. As an example, the server 2 can perform functions shown in FIG. 22.

The network interface 16 can comprise one or more components for communicatively coupling the server 2 to the communication link 7 or to a gateway that is part of or connected to the communication link 7. The network interface 16 can comprise component(s) for wireless or wired communications via the communication link 7. The network interface 16 can comprise a receiver to receive data transmitted over the communication link 7 to the server 2. The network interface 16 can comprise a transmitter to transmit data over the communication link 7 to the VST 3 or to another device. The transmitter and receiver of the server 2 can be configured as a modem. The network interface 16 can be configured as a network interface card that is adapted to be connected to a slot of a card connector mounted on a circuit board within the server 2. The network interface 16 can comprise a network connector, such as a CAT5 or CAT6 cable connector. The network interface 16 can comprise a cable, such as a CAT5 or CAT6 cable. The network interface 16 can comprise the communication interfaces 425 shown in FIG. 24 or some portion thereof.

A transmitter can transmit radio signals carrying data and a receiver can receive radio signals carrying data. A network interface or vehicle interface with such a transmitter and receiver can comprise one or more antennas and can be referred to as a "radio communication interface," an "RF communication interface," or a "wireless communication interface." The radio signals transmitted or received by a radio communication interface can be arranged in accordance with one or more wireless communication standards or protocols such as an IEEE 802.15.1 standard for WPANs, a Bluetooth version 4.1 standard developed by the Bluetooth Special Interest Group (SIG) of Kirkland, Wash., or an IEEE 802.11 standard for wireless LANs (which is sometimes referred to as a WI-FI® standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

Additionally or alternatively, a transmitter can transmit a signal (i.e., one or more signals or one or more electrical waves) carrying or representing data onto a wire (e.g., one or more wires) and a receiver can receive via a wire a signal carrying or representing data over the wire. The wire can be part of a communication link, such as the communication link 7. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The data transmitted by a communication interface can comprise a destination identifier or address of a network device to which the data is to be transmitted. The data transmitted by a communication interface can comprise a source identifier or address of the system component including the communication interface. The source identifier or address can be used to send a response to the network device that comprises the communication interface that sent the data.

The network interface 16 can comprise a modem, a network interface card, and/or a chip mountable on a circuit board. As an example the chip can comprise a CC3100 Wi-Fi® network processor available from Texas Instruments, Dallas, Tex., a CC256MODx Bluetooth® Host Controller Interface (HCI) module available from Texas instruments, and/or a different chip for communicating via Wi-Fi®, Bluetooth® or another communication protocol.

The database interface 17 can comprise one or more components for managing data stored in a database, such as the IS DB 5. For an embodiment in which the IS DB 5 is located off board the server 2, the database interface 17 can comprise a variety of components, some of which can depend on the type of CRM storing and/or within the database. As an example, database interface 17 can comprise a disk controller, such as a SATA card disk controller or a RAID card disk controller. For an embodiment in which the IS DB 5 and/or the IS DB 6 are located on-board the server 2, the database interface 17 can comprise a bus, such as a bus to provide direct memory access to the data stored in the database. The database interface 17 can communicate database commands to a database (e.g., a SELECT command) and responses from a database (e.g., data retrieve from the database).

The server 2 can comprise power components 28 and a housing 29. The power components 28 are described below. The housing 29 is configured to support and protect other elements of the server 2. The housing 29 can comprise a single piece or multi-piece housing. Two or more pieces of a multi-piece housing can snap together or be fastened together using non-snapping fasteners. The housing 29 can surround an interior volume such that components of the server 2 can be located inside the housing 29. As an example, at least one of the processor 15, the network interface 16, the database interface 17, the computer-readable medium 18, or the power components 28 can be arranged inside the housing 29. The housing 29 can comprise an opening that exposes at least a portion of a component of the server 2 arranged inside the housing 29 to space outside of housing 29. As an example, the opening of the housing 29 can expose a card slot, such as a compact flash card slot, of the computer-readable medium 18, or a Universal Serial Bus (USB) port or Ethernet port of the network interface 16, or a power supply input connector of the power components 29. A wiring harness or cable can be connected to a portion of the network interface 16 or the database interface 17 exposed via an opening of the housing 29. That wiring harness or cable can be part of the network interface 16 or the database interface 17 to which the wiring harness or cable is connectable. Other examples of portions of components exposed by an opening of the housing 29 are also possible.

Figure 3:
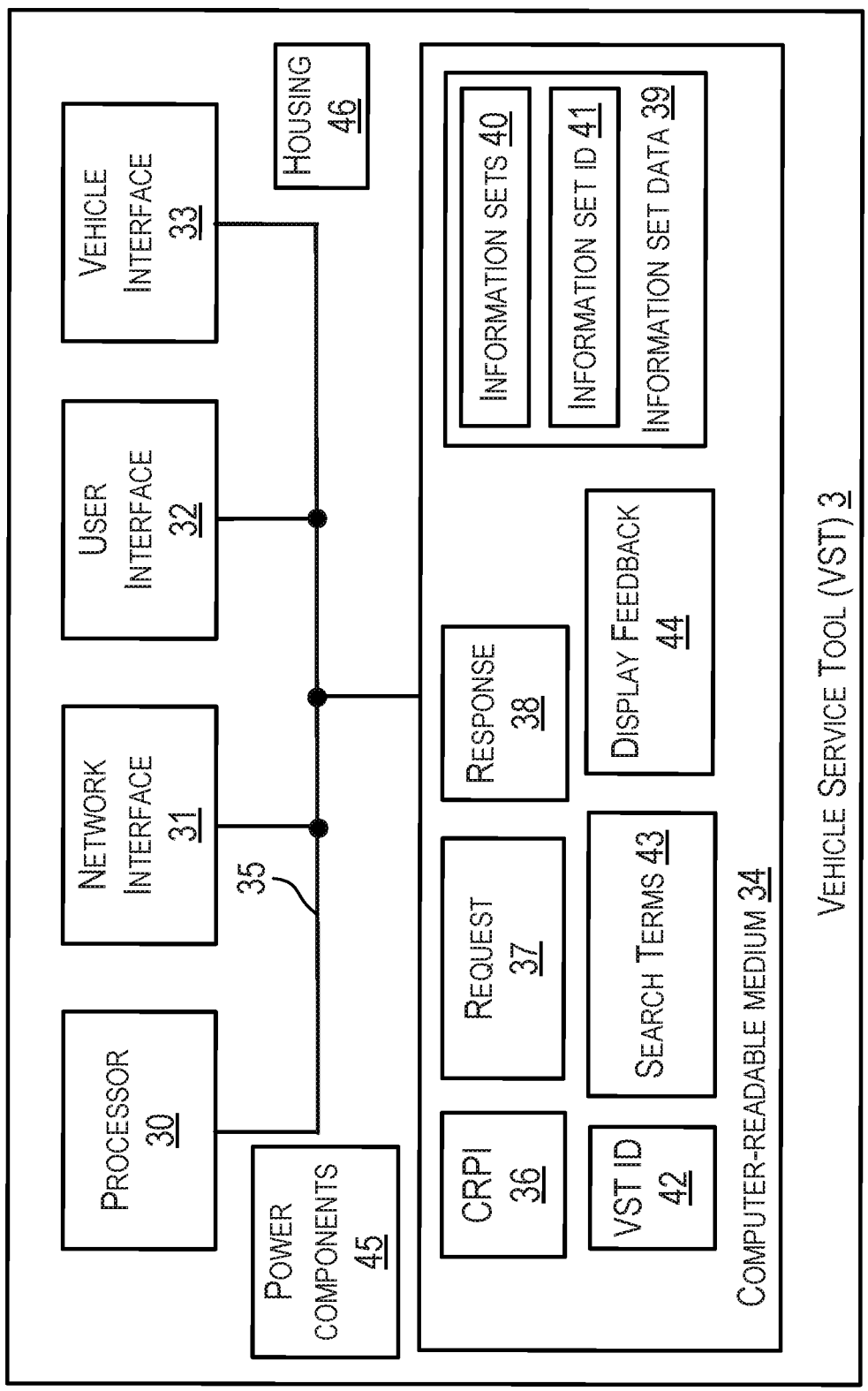
FIG. 3 is a block diagram of an example vehicle service tool.

Next FIG. 3 shows a block diagram showing example components and content of the VST 3. As shown in FIG. 3, the VST 3 can comprise a processor 30, a network interface 31, a user interface 32, a vehicle interface 33, a CRM 34, and a connection mechanism 35 that communicatively couples two or more of the processor 30, the network interface 31, the user interface 32, the vehicle interface 33, and the CRM 34 together. As an example, the connection mechanism 35 can comprise a system bus or network to carry data to another component of the VST 3 in a serial or parallel manner. The connection mechanism 35 can comprise multiple connectors configured to mate with a connector of a component of the VST 3. The VST 3 can comprise a circuit board, such as a printed circuit board. One or more of the other components of the VST 3 can be mounted to the circuit board. A component mounted to the circuit board can be referred to as being "on-board" the VST 3. The connection mechanism 35 can comprise a transmitter and receiver to connect two or more components of the VST 3 via radio signals.

As discussed above, the processor 30 can comprise one or more processors. The processor 30 can execute CRPI 36 stored in the CRM 34. Furthermore, the processor 30 can be programmed to perform any function or combination of functions discussed in this description as being performed by the VST 3 or by a component of the VST 3. As an example, the VST 3 can perform functions shown in FIG. 23.

The network interface 31 can comprise one or more components for communicatively coupling the VST 3 to server 2 via the communication link 7. The network interface 31 can comprise a component for wireless and/or wired communications via the communication link 7. The network interface 31 can comprise a modem and/or a network interface card. The network interface 31 can comprise the communication interfaces 425 shown in FIG. 24 or some portion thereof. The network interface 31 can be configured to allow the VST to communicate with other devices via the communication link. Those other devices, for example, can comprise sources of information sets of VSI to be stored in the IS DB 5.

The network interface 31 can transmit various data and/or messages to the server 2 via the communication link 7. The processor 30 can cause the network interface 31 to transmit the various data and/or messages. As an example, those data and/or messages can comprise a request with vehicle identifying information and an additional search term, such as the request 50 shown in FIG. 5.

The network interface 31 can receive various data and/or messages transmitted from the server 2 via the communication link 7. The processor 30 can receive the various data and/or messages received by network interface 31. As an example, the network interface 31 can receive a response comprising information set identifiers and information sets, such as the response 60 shown in FIG. 6.

The user interface 32 comprises one or more user input elements and one or more user output elements. Each user input element is configured to input data (e.g., selection data) into the VST 3. The user interface 32 can provide the input data to the processor 30 or to another component of the VST 3. As an example, the user-input elements can comprise a touch screen display, a user input section having one or more input keys, a pointing device such as a computing system mouse, a keyboard (e.g., a QWERTY keyboard), a display pointer (e.g., a computer mouse input device), or a microphone for receiving spoken inputs. The user interface 32 can comprise electrical circuits that provide electrical signals (representative of the input data) to the processor 30.

Each user-output element of the user interface 32 is configured to output (e.g., present) data via the VST 3. As an example, a user-output element of the user interface 32 can comprise a display for visually presenting data such as a display card populated with VSI, a graphical user interface for entering search terms to request the VSI, an image file (e.g., a JPEG image file), and a video file (e.g., an MPEG4 video file). As another example, a user-output element can comprise an audio speaker to audibly present data via the VST 3.

The vehicle interface 33 comprises one or more components for communicatively coupling the VST 3 to the vehicle 4 via the communication link 8. The vehicle interface 33 can comprise a transceiver (e.g., an integrated transmitter and receiver, or a distinct transmitter and a distinct receiver). The transmitter of the vehicle interface 33 is configured to transmit data to the vehicle 4. The data transmitted to the vehicle 4 can comprise a request for a vehicle data message. The receiver of the vehicle interface 33 is configured to receive data transmitted by the vehicle 4 over the communication link 8. The data received by the vehicle interface 33 from the vehicle 4 can comprise a VDM arranged according to a VDM protocol. The VDM can comprise vehicle identifying information regarding the vehicle 4. The VDM can comprise a component identifier, such as an identifier of an ECU that transmits the VDM to the VST 3. The VDM can comprise a symptom identifier, such as a DTC. The processor 30 can select data from within the VDM and cause the selected data to be displayed by the user interface 32. As an example, the user interface 32 can display the selected data within a display card, paragraph, or table including data of an information set.

The vehicle interface 33 can comprise a wiring harness removably connectable to a DLC within the vehicle 4. The wiring harness is configured to provide a wired connection between the VST 3 and the vehicle 4. The wiring harness 4 can be part of the vehicle communication link 8. The vehicle interface 33 can comprise one or more connectors, one of which can be located at the end of the wiring harness if so equipped. As another example, the connector of the vehicle interface 33 can comprise a connector including a wireless transceiver to communicate with a separate wireless transceiver within the VST 3. The connector including the wireless transceiver is connectable to a DLC within the vehicle 4.

The CRM 34 stores computer-readable data, such as the CRPI 36, a request 37, a response 38, information set data 39 (comprising for example, information sets 40 and information set identifiers 41), a VST ID 42, search terms 43, and display feedback 44. The request 37 can comprise one or more requests generated by the processor 30. As an example, the request 37 can comprise and/or be configured as the request 50 shown in FIG. 5 or any portion of the request 50. A request of the request 37 can be provided to the network interface 31 for transmission to the server 2. The response 38 can comprise a response received by the network interface 31 from the server 2. As an example, the response 38 can comprise and/or be configured as the response 60 shown in FIG. 6 or any portion of the response 60. Data contained within the response 60 can be parsed and stored in other parts of the CRM 34. For example, the information set identifiers 65 within the response 60 can be stored within the information set identifiers 41, and the information sets 66 within the response 60 can be stored within the information sets 40. The search terms 43 can comprise the search terms added to the request 37. As an example, the search terms 43 can comprise vehicle identifying information (e.g., YMME_1), vehicle component identifiers (e.g., C1), and symptom identifiers (e.g., S1).

The information set identifiers 65 can comprise metadata regarding the information sets 66. The metadata regarding the information sets 66 can comprise an information source (e.g., a category identifier) and an information type (e.g., metadata indicative of how data of the information set is marked up or a data file format). As an example, the information type metadata can indicate the information set comprises text, a graphic, a video. The processor 30 can determine how an information set is to be displayed by referring to the information type metadata. For example, if the information set comprises a schematic diagram of a vehicle wiring system, the information source can indicate the information sets comprise an information set identifier IS28 indicative that the information set comprises a wiring diagram, and the information type metadata can indicate the information set comprises a graphic. For this example, the processor 30 can determine that the information set is to be displayed in a display card data container as a wiring diagram may not be suited for displaying in a different type of data container, such as a paragraph data container.

In accordance with another example, the information set identifiers 65 can indicate a data container type in which each information set of the information sets is to be displayed. The information set identifiers 65 can comprise data indicating two or more data container types applicable to displaying data of an information set, such as a list data container type and a paragraph data container type for displaying text of the information set. A user input element of the user interface 32 can be used to a different data container type to display an information set if more than one data container types is applicable to displaying an information set.

The processor 30 can cause the user interface 32 to display search terms from the search terms 43 and the processor 30 can determine displayed search terms selected for placement into a request being generated by the processor 30.

The processor 30 can output a response populated with information sets to the user interface 32. A display of the user interface is configured to display the information sets. The processor 30 can determine a selection input via the user interface 32 with respect to the information sets output to the user interface 32. As an example, the selection input can comprise an input indicative of selecting a link within an information set, selecting an information set to expand a size of the information set, or selecting a scroll bar to scroll through information sets output to the user interface 32. The processor 30 can determine which information sets are displayed on the display of the user interface 32 and an amount of time the displayed information sets are displayed. In this way, the processor 30 can determine that a particular information set associated with an information set identifier with a lower hierarchy position within an ordered group of information set identifiers is displayed for a longer amount of time than a different information set associated with an information set identifier with a greater hierarchy position within the ordered group of information set identifiers. By aggregating display feedback data, such as the aforementioned feedback data, the processor 15 of the server 2 can use the data to make a determination that the hierarchy positions of two or more information set identifiers within the ordered group of information set identifiers should be changed.

The VST 3 can comprise power components 45 and a housing 46. The power components 45 are described below. The housing 46 is configured to support and protect other elements of the VST 3. The housing 46 can comprise a single piece or multi-piece housing. Two or more pieces of a multi-piece housing can snap together or be fastened together using non-snapping fasteners. The housing 46 can surround an interior volume such that components of the VST 3 can be located inside the housing 46. As an example, at least one of the processor 30, the network interface 31, the user interface 32, the vehicle interface 33, the computer-readable medium 34, or the power components 45 can be arranged inside the housing 46. The housing 46 can comprise an opening that exposes at least a portion of a component of the VST 3 arranged inside the housing 46 to space outside of housing 46. As an example, the opening of the housing 46 can expose a card slot, such as a compact flash card slot, of the computer-readable medium 34, or a USB port or Ethernet port of the network interface 32, a display of the user interface 32, a push button of the user interface 32, or a power supply input connector of the power components 45. A wiring harness or cable can be connected to a portion of the network interface 31 or the vehicle interface 33 exposed via an opening of the housing 46. That wiring harness or cable can be part of the network interface 31 or the vehicle interface 33 to which the wiring harness or cable is connectable. Other examples of portions of components exposed by an opening of the housing 46 are also possible.

Figure 4:
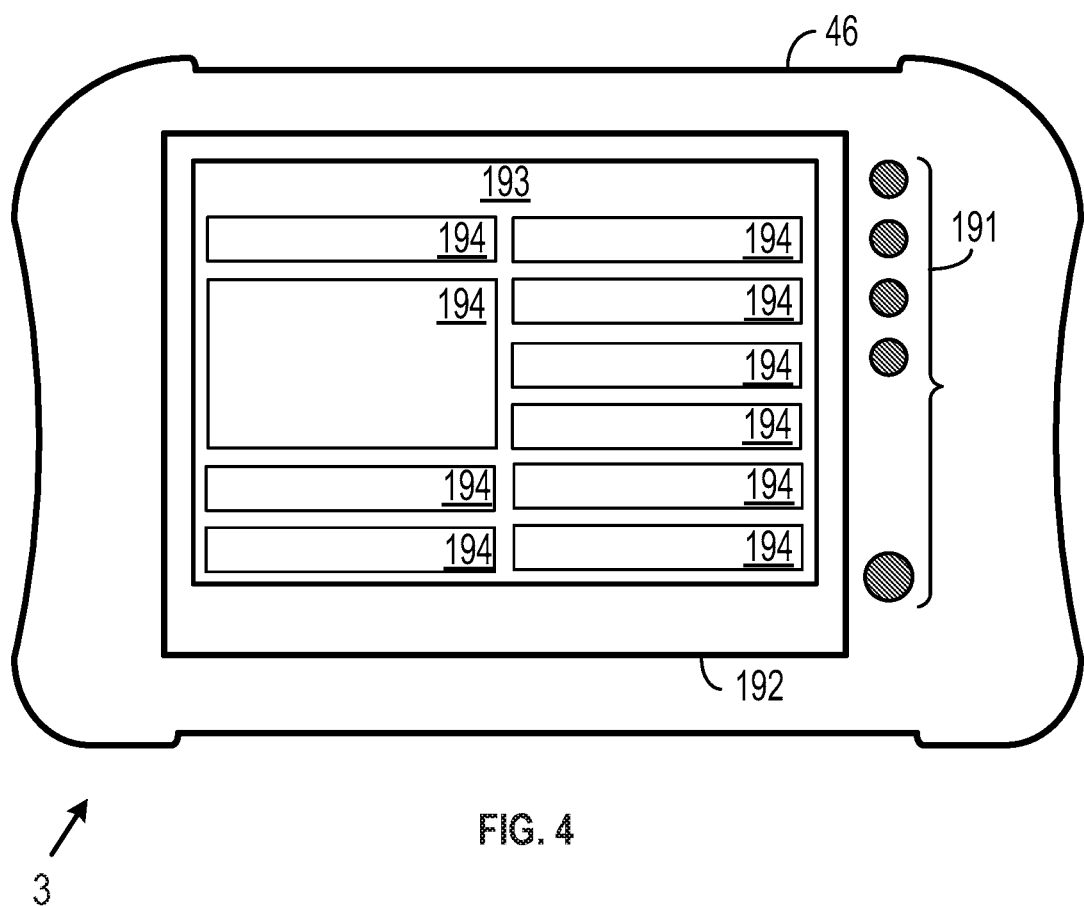
FIG. 4 is a line drawing showing one side of an example vehicle service tool.

Next, FIG. 4 shows an example of the VST 3. As shown in FIG. 4, the VST 3 comprises the housing 46 and aspects of the user interface 32, such as user input elements 191 and a display 192. FIG. 4 depicts the display 192 displaying a displayable page 193 including information sets 194. The user input elements 191 can comprise buttons or other components for inputting data or selections into the VST 3. The display 192, for example, can comprise a liquid crystal display (LCD), a light emitting diode (LED) display, or another type of display. The information sets 194 can be displayed within display cards or displayed using a different display format.

A displayable page, such as the displayable page 193 or any other displayable page shown or described in this application, comprises the content of what a display, such as the display 192, displays anytime the display is powered on. A displayable page can also comprise the content that can be displayed on the display as a result of moving scroll bar positions and/or as a result of zooming in or out on the display. A displayable page can comprise a web page. A displayable page can display information sets of VSI that pertain to an ordered group of information set identifiers. A displayable page can be static or dynamic. A displayable page can comprise a script executable by the at least one processor 30 to dynamically change the displayable page. For example a displayable page can comprise a script that is executable to change an information set pertaining to PID data to display PID values recently received from a vehicle. A displayable page can display at least some of the content of an information set according to a particular display format associated with the displayable page. The displayable page can be configure such that the display format used to display the information set can be changed from a first display format to a second display format. A displayable page can comprise a virtual image, such as virtual image of a vehicle identified by vehicle identifying information, and information sets determined during a search can be overlaid on the virtual image to augment the virtual image being displayed. The data containers containing each information set can be positioned above relevant portions of the virtual image. The metadata regarding an information set can comprise data indicative of the relevant portion of the virtual image. As an example, a relevant portion of the vehicle image can comprise a portion of the vehicle image that represents a particular component on the vehicle. Examples of the display formats are described throughout this description.

Figure 5:
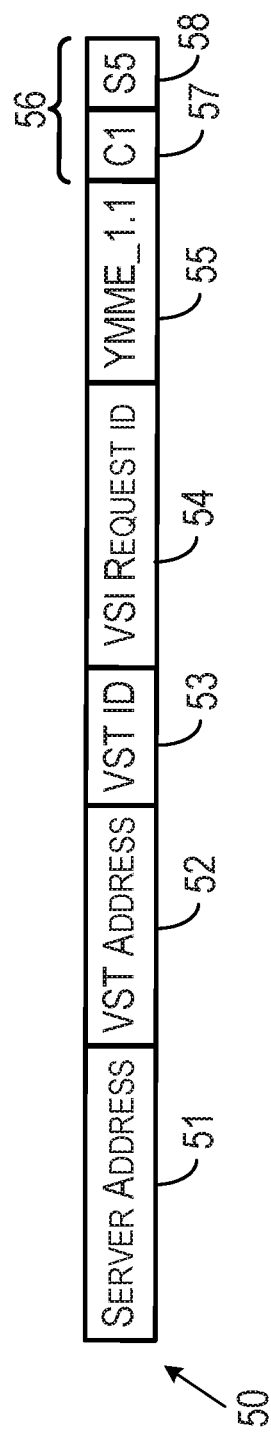
FIG. 5, FIG. 6, and FIG. 7 depict example communications in accordance with the example embodiments.

Next, FIG. 5 shows an example request 50. The request 50 represents a communication transmitted by the VST 3 over the communication link 8 to the server 2 so as to request VSI from the server 2. The request 50 comprises a server address 51 (such as an Internet Protocol (IP) address assigned to the server 3), a VST address 52 (such as an IP address assigned to the VST 3), a VST ID 53, a VSI request ID 54, vehicle identifying information 55, and an additional search term (AST) 56. As shown in FIG. 5, the AST 56 comprises a vehicle component identifier 57, and a symptom identifier 58. One or more of the server address 51 and the VST address 52 can be temporarily assigned to the server 2 and the VST 3, respectively, such as when an IP address is assigned as the server address 51 or as the VST address 52. The VST ID 53 can comprise a permanent ID assigned to the VST 3 to distinguish the VST 3 from other VSTs. The VST ID 53 can be assigned to each VST by the manufacturer of the VST. The VSI request ID 54 can comprise data that indicates the request 50 is a request for VSI. The vehicle identifying information 55 can, for example, comprise a YMM or YMME. In accordance with the example embodiments, another request can comprise a server address 51, a VST address 52, a VST ID 53, a VSI request ID 54, vehicle identifying information 55 and an AST that comprises a vehicle component identifier 57, but not a symptom identifier 58, or an AST that comprises a symptom identifier 58, but not a vehicle component identifier 57. In accordance with the example embodiments, a request for VSI can comprise the vehicle identifying information 55 and the additional search term 56, and that request may or may not include at least one of the server address 51, the VST address 52, the VST ID 53, and the VSI request ID 54.

The server 2 can determine by reference to the VST permissions 26 to determine whether a VST associated with the VST ID 53 is authorized (e.g., licensed) to receive the requested VSI. If the server 2 determines the VST 3 is not authorized to receive the requested VSI or some portion of the requested VSI, the server 2 can transmit a notification to the VST 3 indicating that the VST 3 is not authorized to receive the requested VSI. The server 2 can transmit the notification to another computing device, such as a smart phone operated by a sales person. The sales person can afterwards propose to a user of the VST 3 that the user acquire further VST permissions for the VST 3.

In FIG. 5, the vehicle identifying information 55 is YMME_1.1, which can represent a subset of vehicles such as all 1999 Chevrolet Tahoes with 5.7 liter engines. Table 1 below shows examples of the vehicle identifying information. The component ID 57 can comprise an identifier for a vehicle component, such as a vehicle component commonly referred to as an engine coolant temperature sensor, which for this description is simply referred to as "C1." The symptom ID 58 can comprise an identifier for a symptom that can be exhibited in a vehicle identified by the vehicle identifying information 55. Table 3 below comprises examples of symptom identifiers S1 to S5 and a vehicle symptom associated with each of those symptom identifiers.

TABLE 1

| Vehicle Identifying Information | Year | Make | Model | Engine |
|---|---|---|---|---|
| YMM_1 | 1999 | Chevrolet | Tahoe | Null |
| YMME_1.1 | 1999 | Chevrolet | Tahoe | 5.7 L |
| YMME_1.2 | 1999 | Chevrolet | Tahoe | 6.5 L |
| YMM_2 | 2000 | Chevrolet | Tahoe | Null |
| YMME_2.1 | 2000 | Chevrolet | Tahoe | 5.7 L |
| YMME_2.2 | 2000 | Chevrolet | Tahoe | 6.5 L |

TABLE 2

| Symptom ID | Vehicle Symptom |
|---|---|
| S1 | DTC P0128 - coolant temperature below thermostat regulating temperature |
| S2 | HVAC system - low heat |
| S3 | Engine coolant leaking |
| S4 | Engine overheating |
| S5 | DTC 2182 - coolant temperature sensor 2 circuit malfunction |
| S6 | DTC P0335 - crankshaft position sensor "A" circuit malfunction |
| S7 | DTC P0725 - engine speed sensor input circuit malfunction |
| S8 | Engine - No start |

TABLE 3

| Vehicle Component Identifier | Vehicle Component |
|---|---|
| C1 | Engine Coolant Temperature Sensor |
| C2 | Engine ECU |
| C3 | Thermostat |
| C4 | Radiator |
| C5 | Cooling Fan |
| C6 | Crankshaft Position Sensor |

Figure 6:
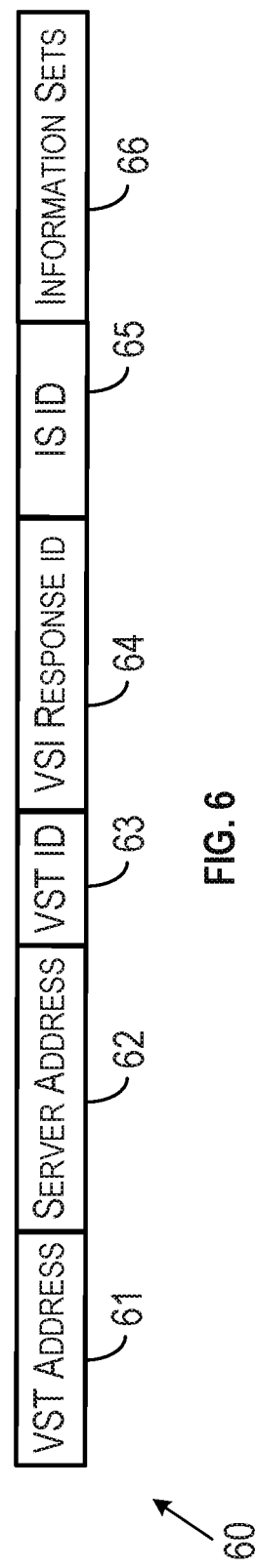

Next, FIG. 6 shows an example response 60. The response 60 represents a communication transmitted by the server 2 to the VST 3 over the communication link 8. The request 60 comprises a VST address 61 (such as the IP address assigned to the VST 3), a server address 62 (such as the IP address assigned to the server 2), a VST ID 63 (such as the permanent ID assigned to the VST 3), a VSI response ID 64, information set identifiers 65, and information sets 66. The VSI response ID 64 can comprise data that indicates the response 60 is a response comprising VSI and/or information sets of VSI. Furthermore, the VSI response ID 64 can comprise data indicating the response 60 is sent in reply to the request 50 comprising the VSI request ID 54. The VSI response ID 64 can be identical to or different than the VSI request ID 54. As an example, the information set identifiers 65 can be indicative of an ordered group of information set identifiers and the information sets 66 can comprise VSI to display on the display 192 in an arrangement indicated by the information set identifiers 65. As another example the information set identifiers 65 can be indicative of an order for displaying multiple portions of the information sets 66. In accordance with the example embodiments, the response 60 can comprise the information set identifiers 65 and the information sets 66, and that response may or may not include at least one of the VST address 61, the server address 62, the VST ID 63, and the VSI response ID 64.

Figure 7:
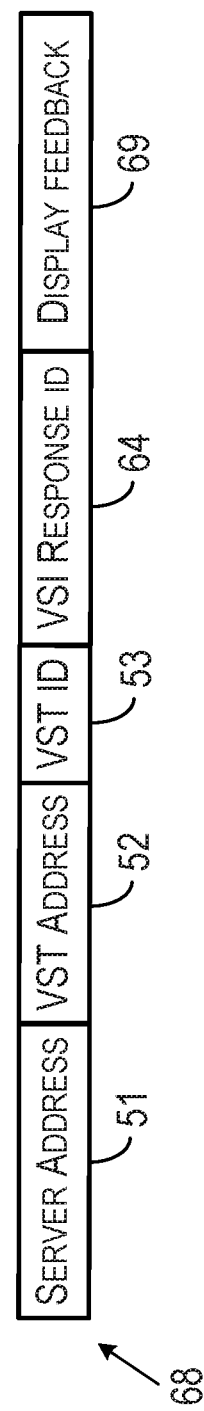

Next, FIG. 7 shows an example display feedback communication (DFC) 68. The DFC 68 represents a communication transmitted by the VST 3 to the server 2 over the communication link 8. The DFC 68 can comprise the server address 51, the VST address 52, and the VST ID 53 similar to the request 50. The DFC 68 can comprise the VSI response ID 64 similar to the response 60. The DFC 68 can further comprise display feedback 69, which the processor 30 can obtain from the display feedback 44.

Next, FIG. 8 shows an example of information set data (ISD) 70. The ISD 70 can be stored in the IS DB 5 in a table format or in another data storage format. The ISD 70 comprises a list of information set identifiers (IS IDs) 71 and a list of information set categories 72. Each IS ID is associated with the information set category shown in the same row of the ISD 70. The ISD 70 also comprises a hierarchical order of information set identifiers for additional search terms 74 and particular vehicle identifying information 73. Since an information set is associated with an information set identifier, determining an ordered group of information set identifiers can comprise and/or occur by determining an ordered group of information sets. Each information set category can be associated with a different category of VSI.

As shown in FIG. 8, the vehicle identifying information 73 comprises the YMME_1.1 identifier, and the additional search terms 74 comprise the symptom identifier S1, the vehicle component identifier C1, and the combination of S1 and C1. The ISD 70 comprises an ordered group of information set identifiers 75 associated with the symptom identifier, an ordered group of information set identifiers 76 associated with the vehicle component identifier, and an ordered group of information set identifiers 77 associated with the combination of symptom ID and component ID. A person skilled in the art will understand that the example embodiments can be carried out based on orders of information set identifiers that are associated with different types of search terms and those information set identifiers can be associated with an information set category or with a different type of information displayable on a display.

As shown in FIG. 8, the ISD 70 comprises twenty-eight different information set identifiers and twenty-eight different information set categories. A different number of information set identifiers and information set categories could be used in accordance with the example embodiments. Furthermore, as shown in FIG. 8, each ordered group of information set identifiers 75, 76, and 77 comprises an order of ten different information set identifiers indicated by the whole numbers one to ten. The example embodiments allow for orders of information set identifiers having a quantity of information set identifiers other than ten. An ordered group of information set identifier could comprise an ordered group of all information set identifiers.

An ordered group of information set identifiers can be based on an additional search term. For example, if the additional search term for a component represents a mechanical vehicle component without any electronic aspects, such as an idler arm of a vehicle suspension, an ordered group of information set identifiers pertaining to the mechanical vehicle component can exclude information set identifiers for electrical aspects, such as the information set identifier IS28 that pertains to the wiring diagram information set category. Instead, the ordered group of information set identifiers pertaining to the mechanical vehicle component can comprise information set identifiers that are associated with information sets relevant to mechanical vehicle components.

Next, FIG. 9 shows an example of information set data 80. The ISD 80 can be stored in the IS DB 5 in a table format or in another data storage format. The ISD 80 comprises the list of information set identifiers 71 and the list of information set categories 72. Each information set ID is associated with the information set category shown in the same row of the ISD 80. The ISD 80 also comprises a hierarchical order of information set identifiers for additional search terms 81 and the particular vehicle identifying information 73.

As shown in FIG. 9, the vehicle identifying information 73 comprises the YMME_1.1 identifier, and the additional search terms 81 comprise the symptom identifier S2, the vehicle component identifier C3, and the combination of S2 and C3. The ISD 80 comprises an ordered group of information set identifiers 82 associated with the symptom identifier, an ordered group of information set identifiers 83 associated with the vehicle component identifier, and an ordered group of information set identifiers 84 for the combination of symptom ID and component ID.

Similar to the ISD 70, the ISD 80 comprises twenty-eight different information set identifiers and twenty-eight different information set categories. A different number of information set identifiers and information set categories could be used in accordance with the example embodiments. Furthermore, as shown in FIG. 9, each ordered group of information set identifiers 82, 83, and 84 comprises an order of ten different information set identifiers indicated by the whole numbers one to ten. The ordered groups of information set identifiers 82, 83, and 84 can differ from the ordered groups of information set identifiers 75, 76 and 77, respectively, for various reasons. One example reason is that the vehicle component C1 comprises an electronic vehicle component and the vehicle component C3 is a mechanical vehicle component.

Next, FIG. 10 shows an example of information set data 90. The ISD 90 can be stored in the IS DB 5 in a table format or in another data storage format. The ISD 90 comprises the list of IS identifiers 71 and the list of information set categories 72. Each IS ID is associated with the information set category shown in the same row of the ISD 90. The ISD 90 also comprises a hierarchical order of information set identifiers for the additional search terms 81 and the particular vehicle identifying information 73.

As shown in FIG. 10, the vehicle identifying information 73 comprises the YMME_1.1 identifier, and the additional search terms 81 comprise the symptom identifier S2, the vehicle component identifier C3, and the combination of S2 and C3, which are the same as shown in the ISD 80. The ISD 90 comprises an ordered group of information set identifiers 91 associated with the symptom identifier, an ordered group of information set identifiers 92 associated with the vehicle component identifier, and an ordered group of information set identifiers 93 for the combination of symptom ID and component ID.

Unlike the orders of information set identifiers within the ISD 70 and the ISD 80, each ordered group of information set identifiers 91, 92, and 93 comprises an order of all different information sets identifiers within the information sets identifiers 71. The ordered groups of information set identifiers 91, 92, and 93 are indicated by the whole numbers one to twenty-eight.

Figure 14:
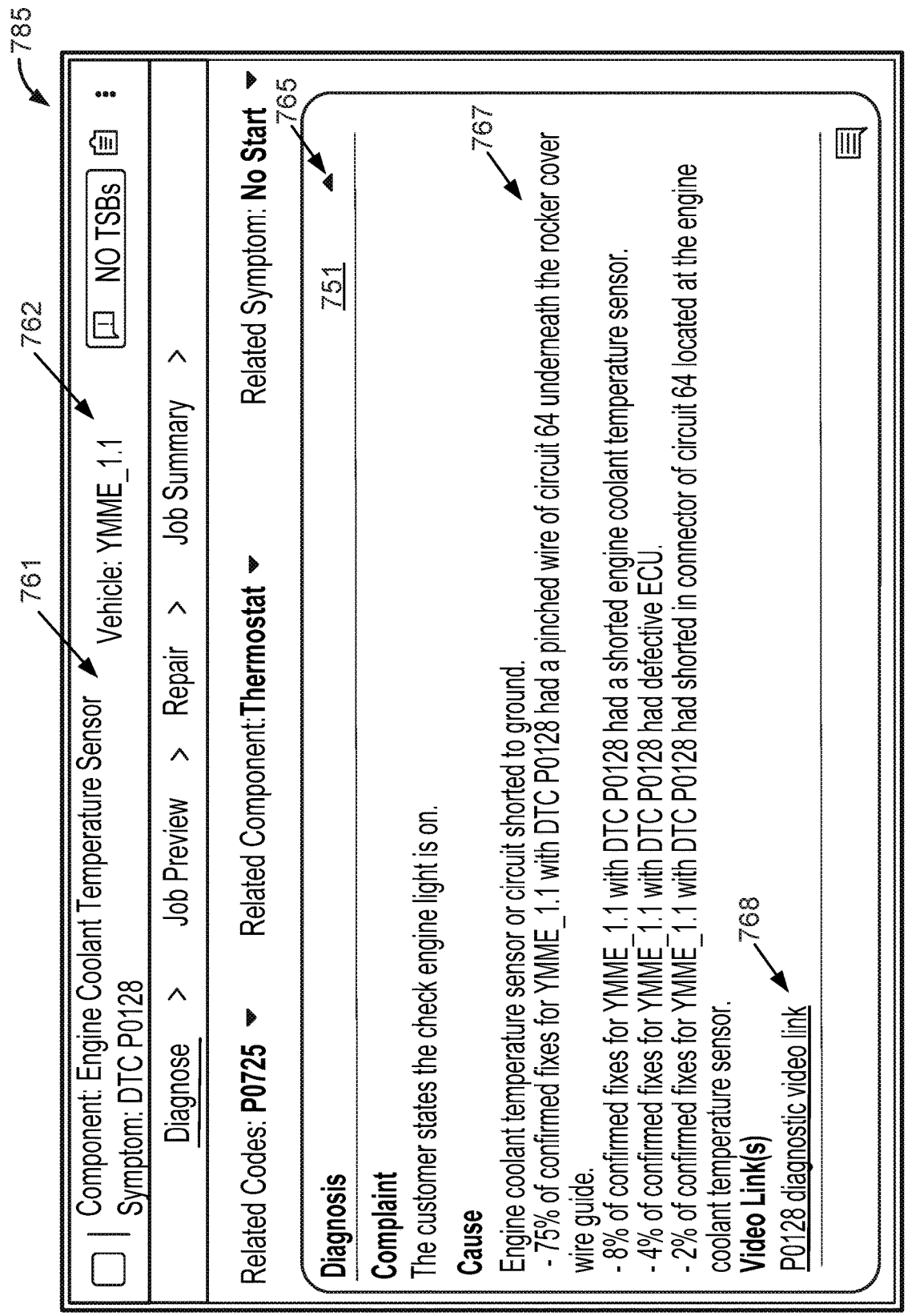
Figure 15:
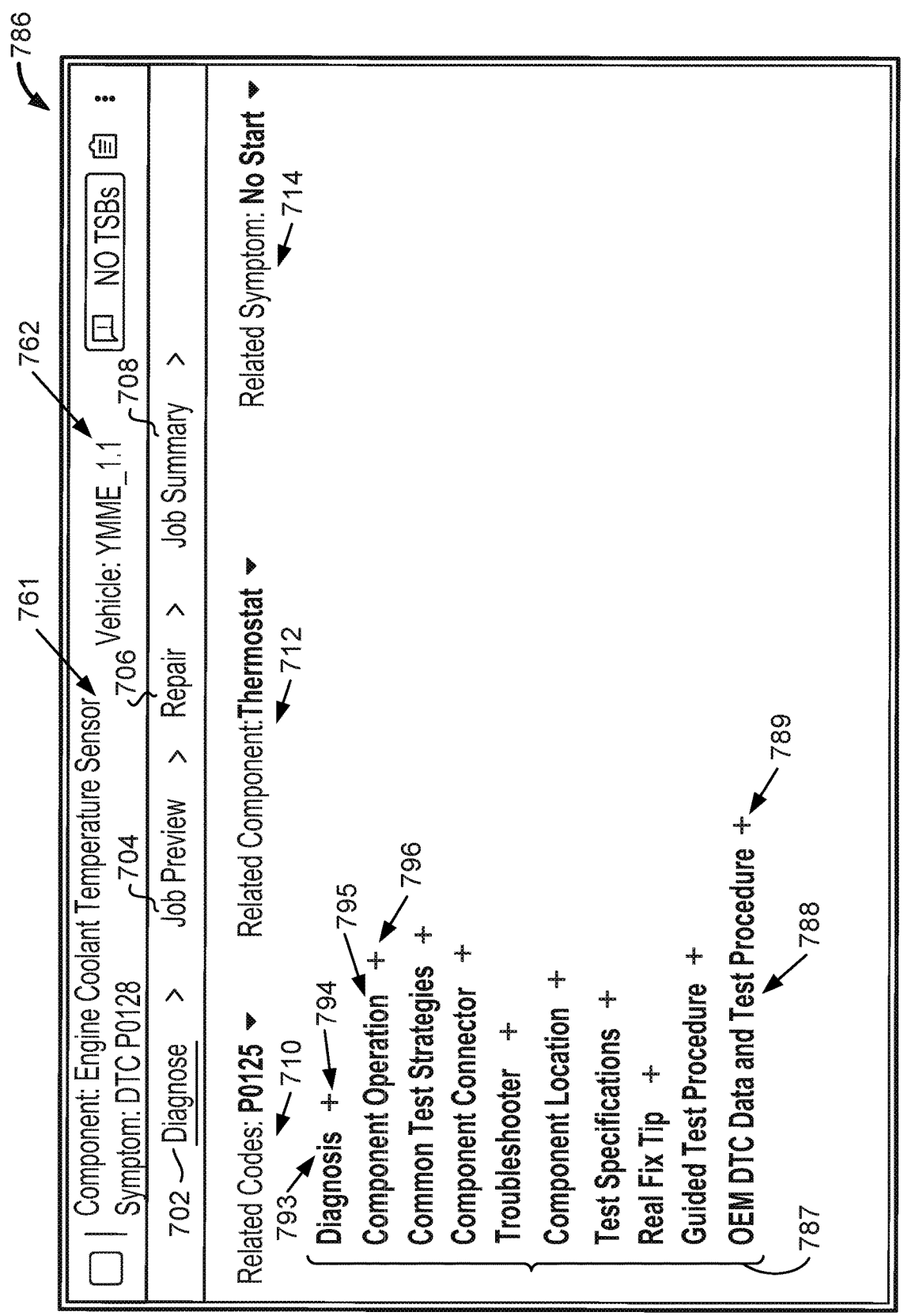
Figure 16:
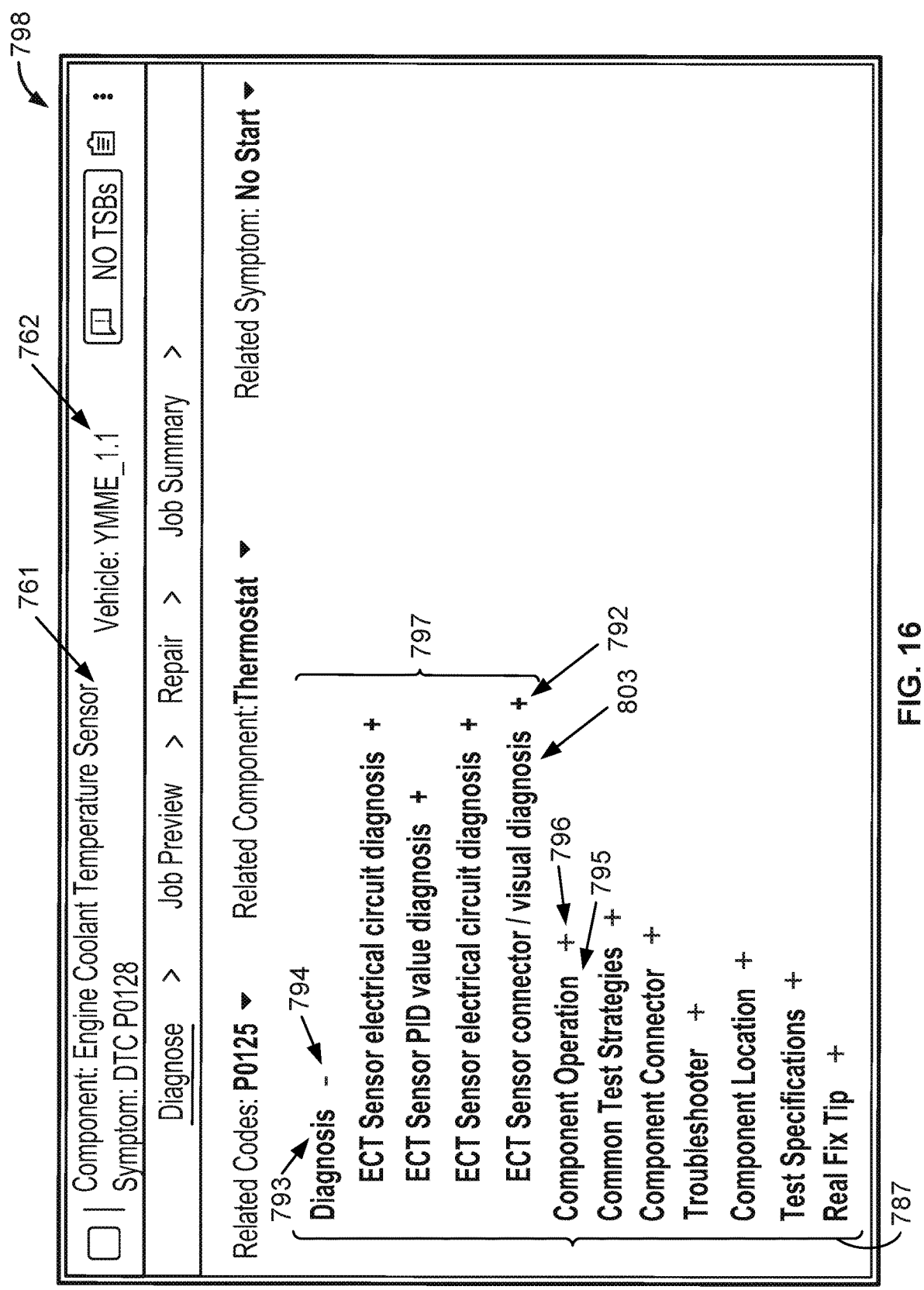
Figure 17:
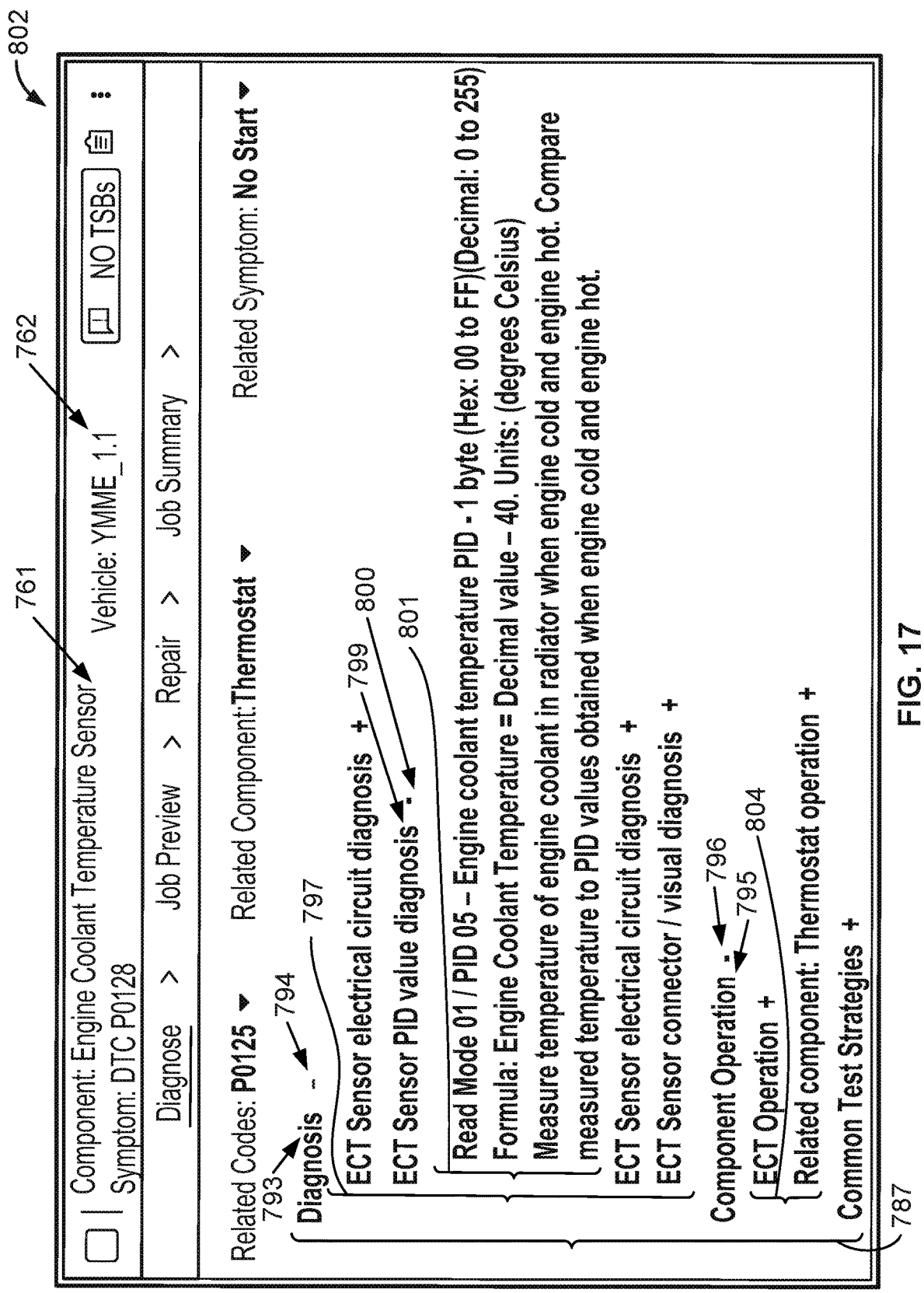

The information sets 66 can comprise information sets determined to be associated with the vehicle identifying information 55 and the additional search term 56 of a request. The information set identifiers 65 of a response to the request can comprise data indicative of how (e.g., a display format) the information sets 66 are to be displayed. As an example, the display format can comprise a display card format, a paragraph format, a table format, or some other display format. FIG. 11 to FIG. 14 show examples of a display displaying information sets of VSI in a display card format. FIG. 15 to FIG. 17 show examples of displaying information sets of VSI in a paragraph format. A display format can be configured with an accordion that allows for displaying different amounts of an information set depending on a variety of factors. The display format configured with the accordion can comprise one or more selectors that allows for expanding the accordion such that more of the information set is displayed or for contracting the accordion such that less of the information set is displayed. As an example, an unexpanded accordion can display a name of an information set category, a first expansion of that accordion can provide more information, such as a summary or brief description pertaining to the information set category, and a further expansion of that accordion can provide even further information such as a detailed description and/or images. The various items shown and discussed in any display card format for a given information set category can be displayed on a display page in a different display format for the given information set category.

Next, FIG. 11 shows an example displayable page 700 output by the processor 30 and displayed on a display of the user interface 32. The displayable page 700 comprises information sets displayed within display cards 716, 718, 720, and 722 and a variety of other aspects that are described hereafter.

The displayable page 700 includes a search-trigger identifier display-segment 732. The search-trigger identifier display-segment 732 identifies the DTC P0335, which is an example of an additional search term entered via the user interface 32. The search-trigger identifier display-segment 732 can display vehicle identifying information and any and all search terms entered for a request described herein.

The displayable page 700 includes display portion selectors 702, 704, 706, and 708. The display portion selector 702 includes a displayed-selectable element with respect to a DIAGNOSE display portion. The display portion selector 704 includes a displayed-selectable element with respect to a JOB PREVIEW display portion. The display portion selector 706 includes a displayed-selectable element with respect to a REPAIR display portion. The display portion selector 708 includes a displayed-selectable element with respect to a JOB SUMMARY display portion. The term "display portion selector" indicates that the selector corresponding to that term is a selector of another item to display (e.g., another displayable page or another portion of a displayable page).

One or more of the display portion selectors 702, 704, 706, and 708 can be highlighted to indicate a status of servicing a vehicle (or more shortly, a "service status"). In the displayable page 700, the display portion selector 702 is highlighted by underlining to indicate the service status is diagnosis. The service status can be determined based on user inputs. A user can select multiple display portion selectors such that information sets pertaining to multiple service statuses are displayed simultaneously by the display 192.

The display portion selectors 702, 704, 706, and 708 may include action-triggers. As an example, an action-trigger of the display portion selectors 702, 704, 706, and 708 can be selected to cause the display of the user interface 32 to display a different displayable page. For instance, while the display of the user interface 32 displays the displayable page 700, the action-trigger of the display portion selector 706 can be selected to cause the display of the user interface 32 to display a REPAIR display portion that displays information sets more relevant to performing a vehicle repairs as compared to information sets more relevant to diagnosis, a job preview, or a job summary. As another example, selection of an action-trigger associated with a currently-displayed displayable page can cause the currently-displayed displayable page to change (e.g., change to displaying a top portion of the currently-displayed displayable page or change to display an unseen portion of the currently-displayed displayable page). Additionally or alternatively, selection of an action-trigger associated with a currently-displayed displayable page can cause a display portion within the currently-displayed displayable page to be updated with newly or recently received or determined information.

The displayable page 700 can include a technical service bulletin (TSB) indicator 730. In the displayable page 700, the TSB indicator 730 indicates that no TSBs were discovered during a search of the IS DB 5 based on the selected identifier(s) indicated by the search-trigger identifier display-segment 732. In accordance with an example in which one or more TSBs was discovered during a search, the TSB indicator 730 indicates that the one or more TSBs were discovered and the TSB indicator 730 can include a displayed-selectable element that, when selected, causes the display of the user interface 32 to display an identifier of a TSB or the TSB. As an example, the display of the user interface 32 can display the TSB by overlaying the TSB upon the currently-displayed displayable page or the currently-displayed displayable page can be updated to include a display portion that includes the TSB or an action-trigger selectable to cause the TSB to be displayed by the display device.

The displayable page 700 comprises an action-trigger 710 to identify a related DTC, an action-trigger 712 to identify a related component, and an action-trigger 714 to identify a related symptom. The action-triggers 710, 712, and 714 can comprise an expander 744 selectable using a user interface input component to cause the display of the user interface 32 to display additional DTC(s), component(s), and symptom(s), respectively.

The arrangement of a displayable page, display portion of a displayable page, or an information set within a displayable page can be defined using web coding with stylesheets, such as cascading style sheets. The stylesheets can be stored within the IS DB 5. The stylesheets can define how the content of the display portion or information set, written in a markup language, is to be displayed. The information sets can be associated with queries and rules to generate the data indicating how each information set is to be displayed. As an example, an information set can comprise a vehicle wiring diagram, such as a wiring diagram 111 shown in FIG. 21. A first rule for that example information set can be to query the IS DB 5 for an image of a particular electrical circuit of a schematic diagram, and a second rule for the information set can be to query the IS DB 5 for an image of a system schematic showing the particular electrical circuit if the image is not returned in response to the first query. The example information sets described in this description can be associated with or encoded with the rules to perform queries for the particular data to be displayed as the information set.

As an example, an information set can be displayed within a display card. A display card, displayed at a displayable page, can include a display card border 736 that forms an outer boundary of the display card. In the displayable page 700, the display card borders 736 are rounded rectangles. In accordance with the example embodiments, a display card border can be a shape other than a rounded rectangle. Display card information can be displayed within an information display area 742 formed by the display card border 736. A displayable page including a display card can include a scroll bar to cause the display card to be displayed at the VST 3 if not currently displayed at the VST 3 or to more fully display the display card or to remove at least a portion of the display card from the display of the user interface 32.

A display card can include a display card title 738. A display card title 738 can, for example, include a title such as "Corrective Action Graph," "Related Real Fixes," "Troubleshooter," "Real Fix," or some other title. A display card title 738 can provide an indication of the information displayed within the information display area 742 of the display card having the display card title 738.

A display card can include a prior repair count 740. As shown in the displayable page 700, the display card 716 includes a prior repair count 740 that indicates "+3263." The number 3263 with respect to the display card 716 can indicate the number of parts that have been replaced for instances of a selected vehicle with respect to the search-trigger identifier within the search-trigger identifier display-segment 732. For instance, with respect to the DTC P0335 and the selected vehicle, a drive belt can have been replaced 108 times, a spark plug can have been replaced 40 times, and an engine mount can have been replaced 11 times. The other parts shown in the list of parts in the display card 716 may have been replaced a number of times that add up to 3,104 times such that the number of times the parts in the list of parts have been replaced equals 3,263.

A display card can include an add-to-report icon 734, as shown in the display card 720. The add-to-report icon 734 can include an action-trigger that, when selected or in response to being selected, can cause an aspect, based on the display card including the add-to-report icon 734, to be added to a final report and/or within the IS DB 5. Other examples of display cards including an instance of an add-to-report icon 734 are shown in various display cards shown in the figures showing a display card.

A display card can include an added-to-report icon 724, as shown in the display card 716. The added-to-report icon 724 can appear in a display card in response to an add-to-report card within the same display card being selected. The added-to-report icon 724 can include an action-trigger that, when selected or in response to being selected, can cause the add-to-report icon 734 to be displayed instead of the added-to-report icon 724 and removal of the added aspect based on the display card from the final report.

A display card can include an ask-a-community icon 726, as shown in the display card 718. The ask-a-community icon 726 can include an action-trigger that, when selected or in response to being selected, results in the display of the user interface 32 displaying an ask-a-community display card (not shown) at which data can be input for sending to devices of a community of users, such as vehicle service tools configured like the VST 3 being used by the community of users. The ask-a-community display card, in accordance with the ask-a-community icon 726, can include, for example, a pop-up window. After inputting the data via the ask-a-community display card, the VST 3 can transmit the data to the server 2 for subsequent transmission to the VSTs of the community of users. Furthermore, after inputting the data via the ask-a-community display card, the VST 3 can stop displaying the ask-a-community display card.

A display card can include a comment icon 728, as shown in the display card 718. The comment icon 728 can include an action-trigger that, when selected or in response to being selected, results in the VST 3 displaying an add-a-comment display card (not shown) at which data can be input as comments to be transmitted to the server 2. The add-a-comment display card, in accordance with the comment icon 728, can include, for example, a pop-up window. After inputting the data via the add-a-comment display card, the VST 3 can transmit the comment data to the server 2. Furthermore, after inputting the data via the add-a-comment display card, the VST 3 can stop displaying the add-a-comment display card. The comments provided to the server 2 can be stored in the IS DB 5 for use as data to be displayed in the information display area 742 of a display card.

The display card title 738 of the display card 716 and the information set category for the display card 716 is "Corrective Action Graph." The display card 716 can include one or more action-triggers that is selectable by a user of the VST 3. For example, a part within the list of parts or the graph can include an action-trigger. Selecting a part, such as crankshaft position sensor, from the list of parts can cause the server 2 to update the graph in the display card, such that the graph pertains to the selected part. A graph that pertains to a single part rather than multiple parts can appear as within a displayed graph.

The display card title 738 of the display card 718 and the information set category for the display card 718 is "Related Real Fixes." The information display area 742 of the display card 718 can include a textual note. As an example, the textual note can include titles of repair tips based on previous repairs. The display card 718 can include one or more action-triggers (e.g., a repair tip title) that are selectable by a user of the VST 3. Selection of a particular repair tip title can cause the server 2 to update the display card 718 with a repair tip pertaining to the selected repair tip title. The data populated into the display card 718 can be data the server 3 locates in the IS DB 5 regarding other real fixes for the vehicle identifying information and an additional search term.

The display card title 738 of the display card 720 and the information set category for the display card 720 is "Troubleshooter." The information display area 742 of the display card 720 can include a textual note. As an example, the textual note can include a text descriptor of a DTC and text describing possible causes of the DTC. The display card 720 can include one or more action-triggers (e.g., a portion of the textual note) that are selectable by a user of the VST 3.

The display card title 738 of the display card 722 and the information set category for the display card 722 is "Real Fix." The information display area 742 of the display card 722 can include a textual note. As an example, the textual note can include text describing a complaint and text describing a cause of the complaint. The display card 722 can include one or more action-triggers (e.g., a portion of the textual note) that are selectable by a user of the VST 3. The data populated into the display card 722 can be data the server 3 locates in the IS DB 5 based on vehicle identifying information and an additional search term.

Figure 12:
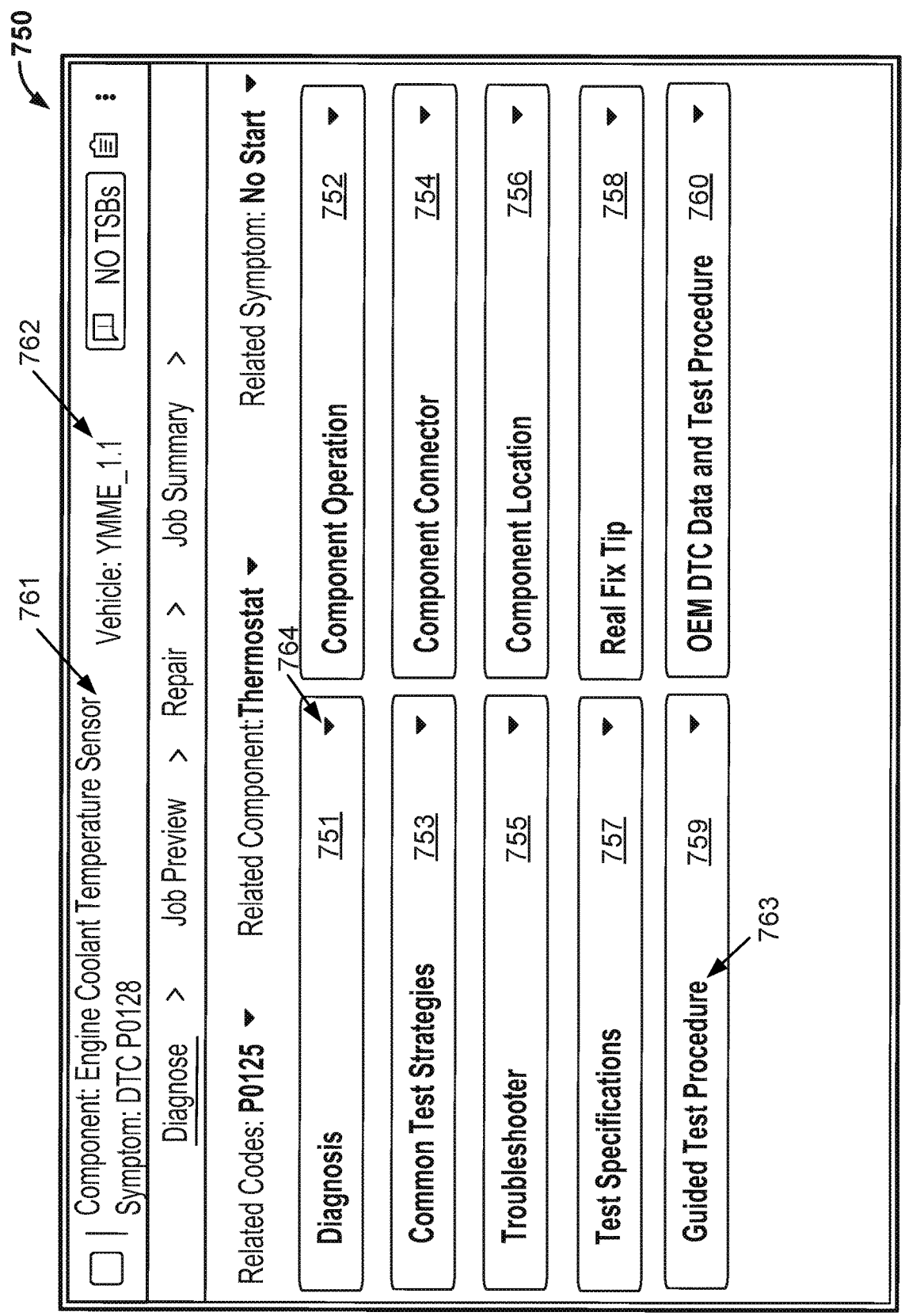

Next, FIG. 12 shows an example displayable page 750. The processor 30 can output the displayable page 750 to the display of the user interface 32. The displayable page 750 comprises a search-trigger identifier display-segment 761 showing additional search terms including the vehicle component identifier C1 and the symptom identifier S1. The displayable page 750 comprises a vehicle identifier display segment 762 showing the vehicle identifying information for the subset of vehicles identifiable as YMME_1.1. The information displayed in the search-trigger identifier display-segment 761 and the vehicle identifier display segment 762 can be input into the VST 3 using one or more user input components of the user interface 32.

The displayable page 750 also comprises display cards 751, 752, 753, 754, 755, 756, 757, 758, 759, and 760 (or more simply, "display cards 751-760"). Each of the display cards 751-760 comprises a display card title. The display card titles for the display cards 751-760 represent the information set category for the display cards for the ordered group of information set identifiers 77, which is established for the vehicles identifiable as YMME_1.1, the vehicle component identifier C1, and the symptom identifier S1. As an example, the display card title 763 for the display card 759 is "Guided Test Procedure." FIG. 12 shows an example of how the display cards 751-760 can be displayed in accordance with the ordered group of information set identifiers 77 (e.g., left to right and top to bottom).

In FIG. 12, each of the displayable pages 751-760 is shown in an unexpanded stated. Each of the displayable pages 751-760 comprises an accordion resize selector (ARS). An ARS can be selected using a user input component of the user interface 32 to cause the processor 30 to change the size of one or more accordions. In FIG. 11 to FIG. 14, the ARS are shown as filled in triangles (i.e., a downward pointing triangle represents an ARS selectable to expand the size of a display card comprising the ARS and an upward pointing triangle represents an ARS selectable to reduce the size of a display card comprising the ARS). The ARS 764 (shown as a downward pointing triangle) is contained within the display card 751. The processor 30 can determine an ARS was selected, the type of ARS selected, and cause the accordion associated with the selected ARS to expand. Expansion of an accordion can result in displaying additional VSI (if available) of an information set within the expanded accordion. Expansion of a display card having an accordion display results in altering how the display cards of the set of ordered display cards is displayed.

Figure 13:
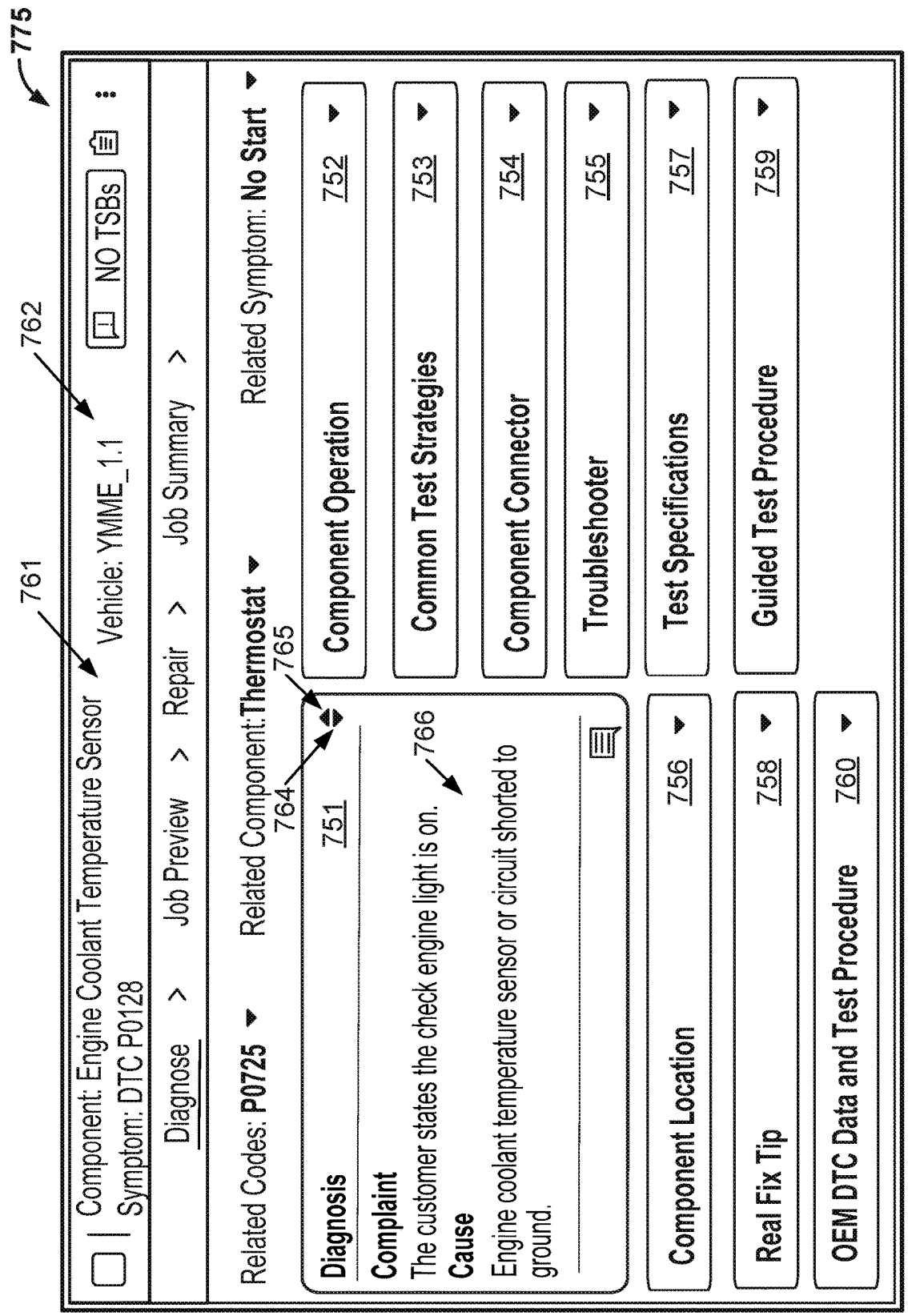

Next, FIG. 13 shows an example displayable page 775. The processor 30 can output the displayable page 775 to the display of the user interface 32. The displayable page 775 comprises the search-trigger identifier display-segment 761 showing additional search terms including the vehicle component identifier C1 and the symptom identifier S1. The displayable page 775 comprises the vehicle identifier display segment 762 showing the vehicle identifying information for the subset of vehicles identifiable as YMME_1.1.

The displayable page 775 also comprises the display cards 751-760 with ARS. As shown in FIG. 14, the display card 751 has been expanded to a first expanded state to display additional VSI 766 not shown in the display card 751 in an unexpanded state (as shown in FIG. 12). The display card 751 in the displayable page 775 comprise the ARS 764 to indicate the display card 751 can be expanded to second expanded state, and an ARS 765 to provide an ARS selectable to resize the display card 751 to its unexpanded sized as shown in FIG. 12.

The displayable page 775 shows another example of how the display cards 751-760 can be displayed in accordance with the order of display cards 77. Other examples of displaying the display cards 751-760 in accordance with the order of display cards 77 are also possible (e.g., left side first, top to bottom, then right side, top to bottom).

Next, FIG. 14 shows an example displayable page 785. The processor 30 can output the displayable page 785 to the display of the user interface 32. The displayable page 785 comprises the search-trigger identifier display-segment 761 showing additional search terms including the vehicle component identifier C1 and the symptom identifier S1. The displayable page 785 comprises the vehicle identifier display segment 762 showing the vehicle identifying information for the subset of vehicles identifiable as YMME_1.1.

The displayable page 785 also comprises the display card 751 in a second expanded state with respect to the first expanded state shown in FIG. 13. As shown in FIG. 14, the display card 751 has been expanded to display additional VSI 767 not shown in the display card 751 in the first expanded state (as shown in FIG. 13) and such that display cards 752-760 are not displayed by the display of the user interface 32. The displayable page 785 can be displayed in response to the processor 30 determining the ARS 764 was selected using a user input component of the user interface 32 while the display card 751 was displayed in the first expanded state as shown in FIG. 13. The additional content 767 comprises a link 768 to further additional content, such as a video. A user input element of the user interface 32 can be used to select the link 768 to cause the processor 30 to obtain the video and to output the video to the display of the user interface 32.

The ARS 765 can be selected while the display card 751 is displayed in the first expanded state to cause the display card 751 to be displayed in the unexpanded state, such as shown in FIG. 12, or to a first expanded state if the ARS 765 is selected while the display card is displayed in the second expanded state. The ARS 764 is not shown in the display card 751 in the displayable page 785, for example, because the display card 751 is being displayed in its largest expanded size.

Other examples of displaying a display card in an expanded state are also possible. For example, as shown in FIG. 11, multiple display cards can be displayed in an expanded state.

Next, FIG. 15 shows an example displayable page 786. The displayable page 786 can comprise aspects shown in other example displayable pages, such as the action-triggers 710, 712, and 714, the search-trigger identifier display-segment 761, the vehicle identifier display segment 762 and other aspects shown in other example displayable pages as well or instead. The displayable page 786 also comprises data from an information set associated with the ordered group of information set identifiers 77 shown in FIG. 8.

In particular, the displayable page 786 comprises the information set category identifiers 787, three of which are the OEM DTC Data and Test Procedure category identifier 788, the diagnosis category identifier 793, and the component operation category identifier 795. Each information set category identifier is displayed with an accordion resize selector (ARS), such as the ARS 789, 794, and 796. Each ARS is shown as a "+" when the accordion associated with the ARS is expandable, and as a "−" in FIG. 16 and FIG. 17 when the accordion associated with the ARS is not expandable any further. Other examples of symbols representing an ARS in an expanded or unexpanded state are also possible. In FIG. 15, FIG. 16, and FIG. 17, the information sets are displayed in a paragraph format.

Next, FIG. 16 shows an example displayable page 798. The displayable page 798 can comprise aspects shown in other example displayable pages, such the search-trigger identifier display-segment 761, the vehicle identifier display segment 762 and other aspects shown in other example displayable pages as well or instead. The displayable page 798 also comprises data from an information set associated with the ordered group of information set identifiers 77 shown in FIG. 8.

In particular, the displayable page 786 comprises at least a portion of the information set category identifiers 787, two of which are the diagnosis category identifier 793 and the component operation category identifier 795. Two identifiers ("Guided Test Procedure" and "OEM DTC Data and Test Procedure") of the information set category identifiers 787 are not shown on FIG. 16 due to an accordion of the portion of the information set pertaining to the diagnosis category identifier 793 being expanded. The ARS 794 in FIG. 17 is shown as a "−". Sub-category identifiers 797 (including the sub-category identifier "ECT Sensor connector/visual diagnosis" 803) of the diagnosis category identifier 793 are displayed in a paragraph format when the accordion of the diagnosis category identifier 793 is expanded. Each information set sub-category identifier is displayed with an accordion resize selector (ARS), such as the ARS 792. A category of an accordion could be expanded to display VSI without any sub-category identifiers.

Next, FIG. 17 shows an example displayable page 802. The displayable page 802 can comprise aspects shown in other example displayable pages, such the search-trigger identifier display-segment 761, the vehicle identifier display segment 762 and other aspects shown in other example displayable pages as well or instead. The displayable page 802 also comprises data from an information set associated with the ordered group of information set identifiers 77 shown in FIG. 8.

In particular, the displayable page 802 comprises at least a portion of the information set category identifiers 787, two of which are the diagnosis category identifier 793 and the component operation category identifier 795. Five identifiers of the information set category identifiers 787 are not shown on FIG. 17 due to accordions of the portion of the information set pertaining to the diagnosis category identifier 793 and the component operation category identifier 795 being expanded. An ARS 800 for the ECT Sensor PID value diagnosis sub-category identifier 799 is shown as a "–". Vehicle service information 801 of the ECT Sensor PID value diagnosis sub-category identifier 799 is displayed in a paragraph format when the accordion of the ECT Sensor PID value diagnosis sub-category identifier 799 is expanded. The vehicle service information 801 can be indented to distinguish the VSI 801 from other portions of the VSI displayed as part of the displayable page 802. Sub-category identifiers 804 are displayed in a paragraph format when the accordion of the Component Operation category identifier 795 is expanded.

Figure 18:
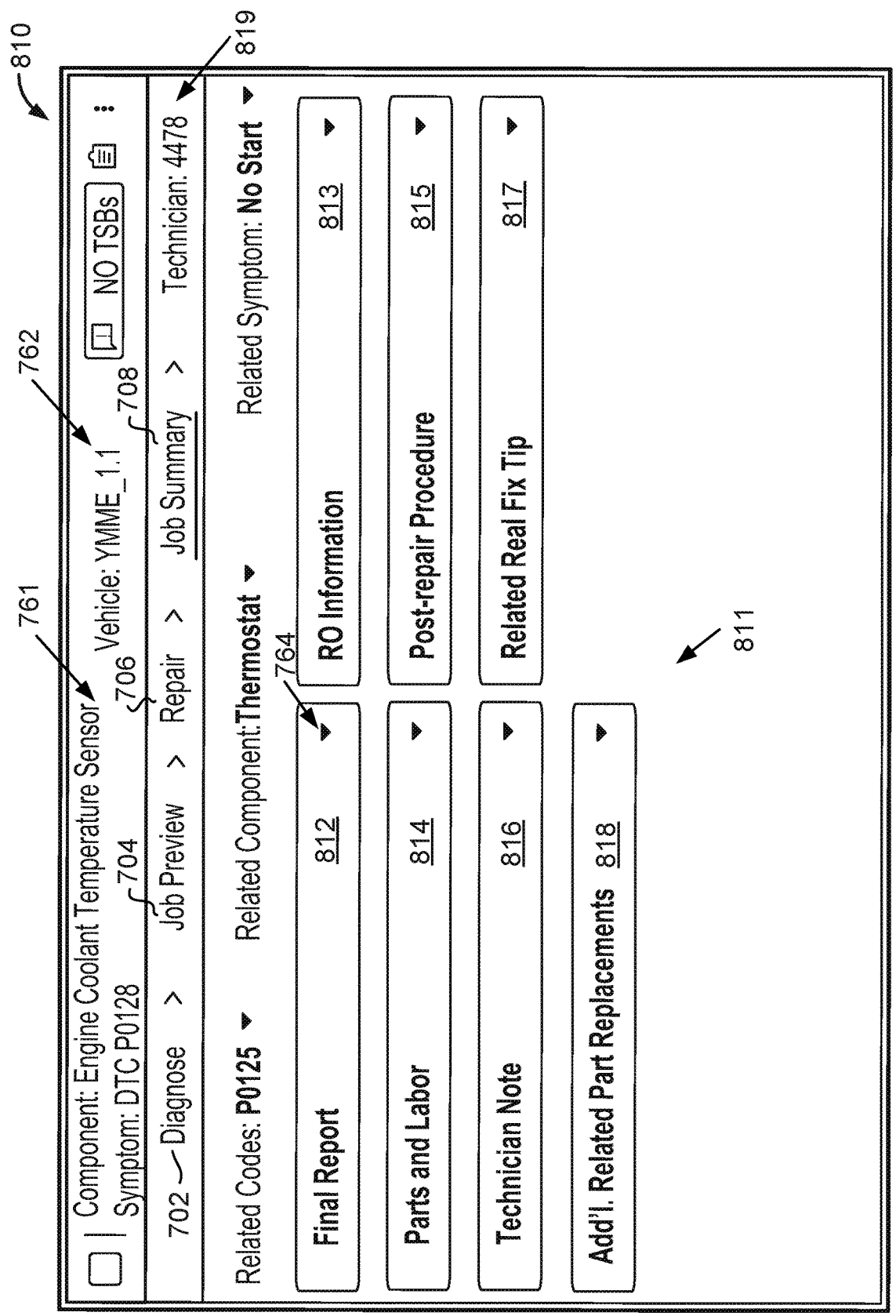

Next, FIG. 18 shows an example displayable page 810, which can be displayed for a service status that differs from the service status that exists when the displayable page 750 in FIG. 12 is displayed. As shown in FIG. 18, the service status is the JOB SUMMARY status. The displayable page 810 can comprise aspects shown in other example displayable pages, such as the search-trigger identifier display-segment 761, the vehicle identifier display segment 762 and other aspects shown in other example displayable pages as well or instead. The displayable page 810 also comprises data from an information set associated with an ordered group of information set identifiers comprising the information set identifiers in the following order: IS8, IS22, IS17, IS18, IS24, IS20, and IS1. These identifiers are selected from the list of information set identifiers 71 and are associated with the service status of JOB SUMMARY, the vehicle identifying information YMME_1.1, the symptom identifier S1, and the vehicle component identifier C1. In accordance with this example, the ordered group of information set identifiers 77 shown in FIG. 8 can be further associated with the service status of DIAGNOSE.

The displayable page 810 includes an information set 811 displayed in the display card format with display cards 812, 813, 814, 815, 816, 817, and 818, which include vehicle service information pertaining to the ordered group of information set identifiers comprising IS8, IS22, IS17, IS18, IS24, IS20, and IS1. The information set could be displayed in a displayable page using a different display format. Furthermore, the displayable page comprises a customer identifier 819. Comparing FIG. 12 and FIG. 18, a person skilled in the art will understand that the information set and the ordered group of information set identifiers can change dynamically based on the service status determined by the processor 30.

The user interface components of the user interface 32 can be used to reposition data containers displayed on a displayable page, such as the displayable page 810 displayed on a display of the user interface 32. As an example, a user interface component can be used to reposition the display card 812 to the position of another display card displayed within the displayable page 810 or to an open space within the displayable page, such as the open space to the right and below the display card 818. The processor 30 can cause the other data containers on a displayable page to reposition the other data containers according to the order of the data containers. As another example of repositioning data containers, the processor 30 can cause two display containers to swap positions on a displayable page, such as the display cards 812 and 815 can swap positions if the display card 812 is selected and dragged onto the display card 815 or the display card 815 is selected and dragged onto the display card 812. Other examples of repositioning data containers on a displayable page are also possible.

Figure 19:
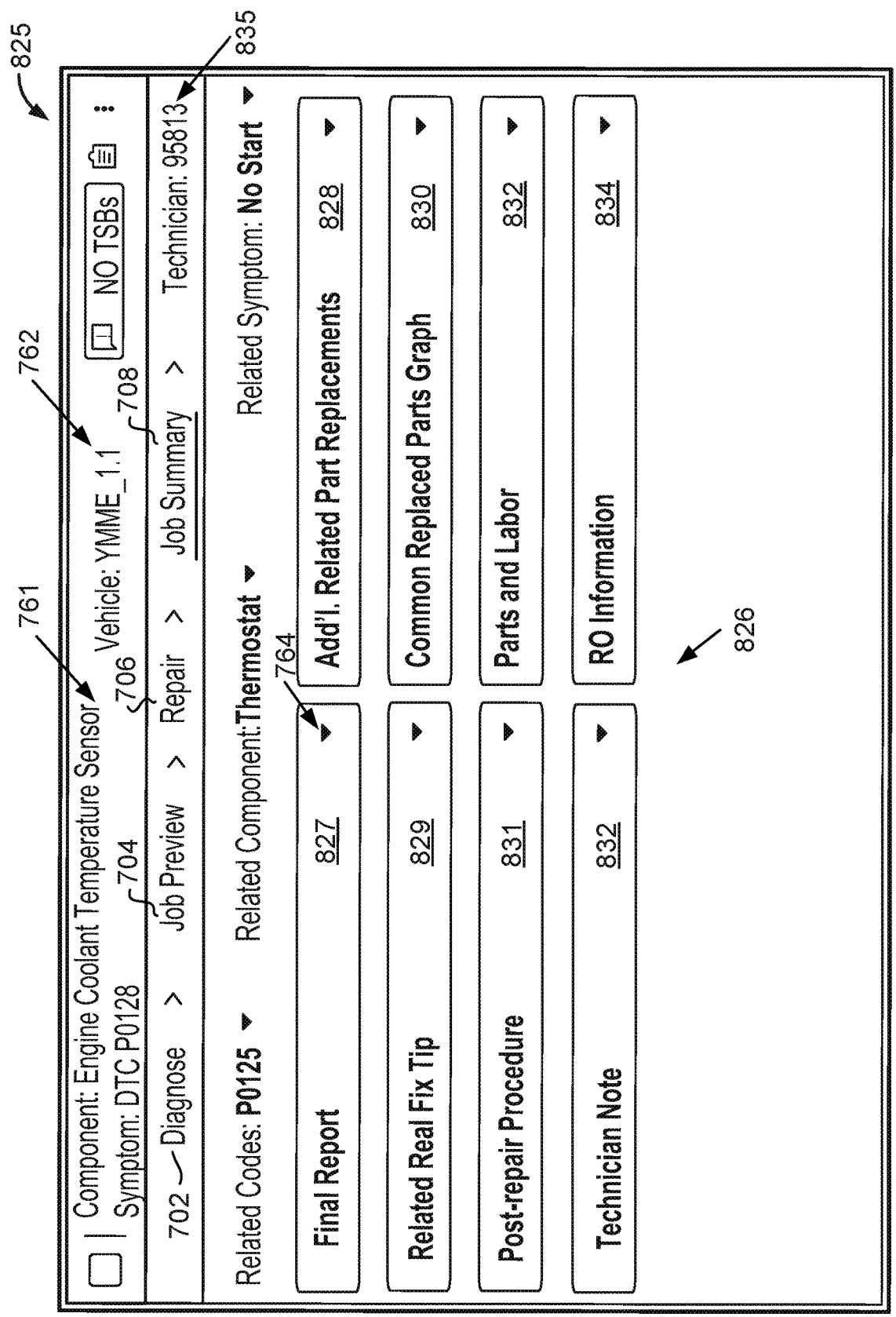

Next, FIG. 19 shows an example displayable page 825, which can be displayed for the same service status that exists when the displayable page 810 in FIG. 18 is displayed. As shown in FIG. 19, the service status is the JOB SUMMARY status. The displayable page 825 can comprise aspects shown in other example displayable pages, such as the search-trigger identifier display-segment 761, the vehicle identifier display segment 762 and other aspects shown in other example displayable pages as well or instead. The displayable page 825 also comprises data from an information set associated with an ordered group of information set identifiers comprising the information set identifiers in the following order: IS22, IS1, IS20, IS2, IS18, IS17, IS24, and IS22. These identifiers are selected from the list of information set identifiers 71 and are associated with the service status of JOB SUMMARY, the vehicle identifying information YMME_1.1, the symptom identifier S1, the vehicle component identifier C1, and a customer identifier 835.

The displayable page 825 includes an information set 826 displayed in the display card format with display cards 827, 828, 829, 830, 831, 832, 833, and 834, which include vehicle service information pertaining to the ordered group of information set identifiers comprising IS22, IS1, IS20, IS2, IS18, IS17, IS24, and IS22. The information set could be displayed in a displayable page using a different display format. Comparing FIG. 18 and FIG. 19, a person skilled in the art will understand that the information set and the ordered group of information set identifiers can change dynamically based on the customer identifier determined by the processor 30. The processor 30 can customize an ordered group of information set identifiers based on a one or more customer identifiers, such as a technician identifier, a repair shop identifier, the VST ID 42, a group of technician identifiers, a group of repair shop identifiers and/or a group of VST identifiers.

Customizing an ordered group of information set identifiers can include such actions as adding an information set identifier, removing an information set identifier, and/or establishing a different order of the information set identifiers. In one respect, the processor 30 can customize the ordered group of information set identifiers based on inputs entered via the user interface 32 specifically to customize the order of the information set identifiers. In another respect, the processor 30 can customize the ordered group of information set identifiers by learning a pattern of a particular technician, a repair shop, or use of a particular VST, for example, viewing and/or selecting vehicle service information in multiple different displayable pages.

U.S. patent application Ser. No. 14/874,317, filed Oct. 2, 2015 is incorporated by reference herein. The vehicle service information shown or described with respect to a display card in U.S. patent application Ser. No. 14/874,317 are examples of vehicle service information that can be part of an information set within the IS DB 5. Each display card title shown or described in U.S. patent application Ser. No. 14/874,317 is an example of an information set category.

Figures 20, 21:
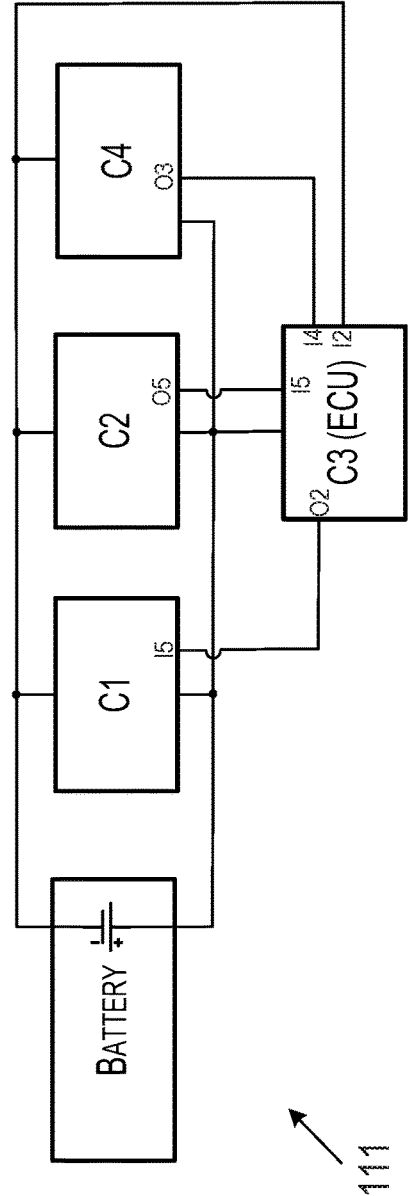
FIG. 20 shows example vehicle service information.
FIG. 21 shows an example wiring diagram.

Next, FIG. 20 shows example information set data 110. The information set data 110 shows an example of how an information set category (e.g., wiring diagrams) is associated with vehicle identifying information and additional search terms. In FIG. 20, the wiring diagrams are identified using identifiers in the form "WD_X," where "X" is a positive whole number. Other identifiers for information set data, such as memory addresses where an information set is stored within the IS DB 5 or a pointer to those memory address(es) can be included within the information set data 110 or in place of the information set identifiers such as the wiring diagram ID. Each wiring WD_1 through WD_6 is associated with at least one vehicle ID, at least one vehicle component ID, and at least one symptom ID. The information set data 110 also shows, by use of the word "NULL," that wiring diagrams are not available within the IS DB 5 for vehicles identified by the vehicle ID YMME_12.1 (all component ID and all symptom ID) and for vehicles identified by the vehicle ID YMME_2.1 (vehicle component ID C5 and symptom ID S10) and vehicles identified by the vehicle ID YMME_16.2 (vehicle component ID C8 and system ID S6).

Next, FIG. 21 shows the example wiring diagram 111. The wiring diagram 111 shows components C1, C2, C3, C4, and a battery, as well as how the components are connected to the battery. As an example, the wiring diagram 111 is an example of the wiring diagram "WD_1" shown in the example information set data 110 in FIG. 20.

Next, FIG. 22 shows a flowchart depicting a set of functions 170 (or more simply "the set 170") that can be carried out in accordance with the example embodiments described in this description. The set 170 comprises the functions shown in blocks labeled with whole numbers 171 through 174 inclusive. The following description of the set 170 comprises references to elements shown in other figures described in this description, but the functions of the set 170 are not limited to being carried out only by the referenced elements. A variety of methods can be performed using all of the functions shown in the set 170 or any proper subset of the functions shown in the set 170. Any of those methods can be performed with other functions such as one or more of the other example functions described in this description.

Block 171 includes receiving, by the at least one processor (e.g., the processor 15) of a server, a request sent from a first VST (e.g., the VST 3), wherein the request comprises vehicle identifying information and an additional search term, wherein the additional search term comprises (i) a symptom ID, but not a VCI, (ii) the VCI, but not the symptom ID, or (iii) the symptom ID and the VCI, wherein the vehicle identifying information identifies a subset of vehicles within a set of all vehicles, wherein the symptom identifier is exhibitable within each vehicle of the subset of vehicles, and wherein the vehicle component identifier identifies a component on each vehicle of the subset of vehicles. Receiving the request can comprise a receiver of the server 2 receiving the request from a communication link 7 by which the server 2 and the VST 3 communicate with each other.

The vehicle identifying information can comprise: a vehicle manufacturer identifier, and (i) at least one vehicle model year identifier and at least one vehicle model identifier, or (ii) at least one vehicle model year identifier, at least one vehicle model identifier, and at least one engine identifier. The symptom ID can comprise a DTC identifier, a customer complaint (e.g., "car doesn't start," or "engine stops cold"), or an identifier of a different symptom.

Next block 172 includes determining, by the at least one processor of the server, an ordered group of information set identifiers based on the additional search term. As shown in FIG. 8 to FIG. 10, each information set identifier can be associated with an information set category. As an example, determining the ordered group of information set identifiers based on the additional search term comprises determining, from among multiple selectable ordered groups of information set identifiers, a selectable ordered group of information set identifiers associated with the additional search term.

The multiple selectable ordered groups of information set identifiers comprise a first ordered group of multiple information set identifiers associated with the symptom identifier, but not the vehicle component identifier, a second ordered group of multiple information set identifiers associated with the vehicle component identifier, but not the symptom identifier, and a third ordered group of multiple information set identifiers associated with the symptom identifier and the vehicle component identifier. The determined ordered group of information set identifiers comprises (i) the first ordered group of multiple information set identifiers if the additional search term comprises the symptom identifier, but not the vehicle component identifier, (ii) the second ordered group of multiple information set identifiers if the additional search term comprises the vehicle component identifier, but not the symptom identifier, or (iii) the ordered group of multiple information set identifiers if the additional search term comprises the symptom identifier and the vehicle component identifier.

Each information set identifier in each of the multiple selected ordered groups of information set identifiers is associated with a different category of vehicle service information. This allows for two or more of the multiple selected ordered groups of information set identifiers to comprise at least one common information set identifier.

The multiple selectable ordered groups of information set identifiers can comprise additional groups of information set identifiers. The quantity of selectable ordered groups of information set identifiers can depend upon factors such as the number of symptom identifiers, the number of component identifiers, and whether each symptom identified by a symptom identifier pertains to each component identifier by a component identifier. For example, if the IS DB 5 includes three symptom identifiers and four component identifiers, then the IS DB 5 can comprise nineteen ordered groups of information set identifiers (e.g., three groups of information set identifiers based on the symptom identifiers, but not any component identifier, four groups of information set identifiers based on the component identifiers, but not any symptom identifier, and twelve groups of information set identifiers based on each combination of a symptom identifier and a component identifier). As another example, the IS DB 5 may not include a group of information set identifiers for a combination of a component identifier and a symptom identifier if the component identifier identifies a vehicle component (e.g., an alternator) that does not pertain to a symptom (e.g., "engine coolant leaking") identified by one of the symptom identifiers.

In accordance with the example embodiments, each of the first ordered group of multiple information set identifiers, the second ordered group of multiple information set identifiers, and the third ordered group of multiple information set identifiers comprise identical information set identifiers, but in a different order. Alternatively, the first ordered group of multiple information set identifiers comprises at least one information set identifier not within either of the second ordered group of information set identifiers and the third second ordered group of information set identifiers, the second ordered group of multiple information set identifiers comprises at least one information set identifier not within either of the first ordered group of information set identifiers and the third ordered group of information set identifiers, and/or the third ordered group of multiple information set identifiers comprises at least one information set identifier not within either of the first ordered group of information set identifiers and the second ordered group of information set identifiers. Still further, the example embodiments allow for two or more of the first ordered group of multiple information set identifiers, the second ordered group of multiple information set identifiers, and the third ordered group of multiple information set identifiers to be identical to one another.

Furthermore, the determined ordered group of information set identifiers can comprise a personalized ordered group of information set identifiers based on the additional search term or a default ordered group of information set identifiers based on the additional search term. The personalized ordered group can comprise multiple information set identifiers that the processor 15 determines from prior use of a particular VST and/or from prior use of a VST by a particular user. The processor 15 can determine that the prior use indicates that a particular information set category of "real fix tip" (associated with IS identifier IS19) is a preferred information set category of the particular user and/or the users of the particular VST. The processor can alter the ordered group of information set identifiers based on the additional search term such that the personalized ordered group comprises the particular information set category if not contained in the default ordered group and/or with a different position of the hierarchy of information set identifiers compared to a position of the particular information set of category if the default ordered group comprises the particular information set category.

Next block 173 includes determining, by the at least one processor of the server, multiple information sets to populate a response to the request, wherein determining the multiple information sets comprises determining, for each information set identifier of the ordered group of information set identifiers, an information set pertaining to (i) the subset of vehicles, (ii) the additional search term, and (iii) the information set category associated with the information set identifier. In one respect, the information set identifier can comprise data that is mapped to data that is indicative of the information set category. For example and with reference to FIG. 8, an information set identifier can comprise an information set identifier, such as IS2, that by itself does not describe an information set category. In another respect, the information set identifier can comprise data that describes an information set category, such as the "common replaced parts graph" information set category that can be mapped to an information set identifier that by itself does not describe an information set category.

Each information set comprises a set of information regarding a particular subset of information. In particular, each information set can comprise a set of information regarding a particular subset of vehicle service information. In this description, examples of information sets are listed in the form of 'subject' information set, where that information set comprises information regarding and/or in that form of the 'subject.' Unless explicitly described, the information of an information set can comprise textual information, graphical information, video information and/or another form of information.

As an example, the multiple information sets can comprise at least one information set (or any two to twenty information sets) selected from the group consisting of: a technical service bulletin information set, a component connector information set, a wiring diagram information set, a line routing information set, a remove and replace procedure information set, a component operation information set, a vehicle component calibration information set, a component location information set, an additional replaced part information set, a commonly replaced parts information set, a real-fix tip information set, a specification information set, a common test strategies information set, an OEM code data and test procedure information set, a part and labor information set, an associated vehicle component information set, a post-repair information set, a collision repair information set, a parameter identifier data information set, and a vehicle scan tool function information set.

The specification information set can comprise an original equipment manufacturer (OEM) specification information set and/or an aftermarket specification information set. The line routing information set can comprise at least one of a vacuum line routing information set, a hydraulic line information set, an electrical circuit routing information set, an optical circuit routing information set, and a pneumatic line routing information set. The VST function of the VST function information set can comprise at least one of a VST diagnostic function, a VST functional test function, a VST component test function, a VST repair function, a VST calibration function, and a VST regeneration function. Other examples of the VST function of a VST function information set are also possible.

The VST diagnostic function can comprise, for example, a vehicle data display function, a read DTC function, or a clear DTC function. The VST functional test function can comprise, for example, an engine injector disable function or an ABS isolation valve solenoid enable/disable function. The VST component test function can comprise, for example, a malfunction indictor lamp on/off function, a glow plug in/off function, or an instrument panel gauge up/down function. The VST repair function can comprise, for example, a program key FOB function. The VST calibration function can comprise, for example, an engine oil life reset function or a fuel filter life reset function. The VST repair function can comprise a program key FOB function, a reprogram injector flow rate functions, or a fuel system priming function. The VST regeneration function can comprise, for example, a diesel particulate filter (DPF) enable function or a DPF service regeneration function. Other examples of the various VST functions are also possible.

As another example, the processor 15 can determine an ordered group of information set identifiers and alter the initial ordered group of information set identifiers by removing any information set identifiers for which VSI is not available for populating a response with information sets to determine a final ordered group of information set identifiers. For instance, the processor 15 can initially determine that an ordered group of information set identifiers for a vehicle component identifier C5 and a symptom identifier S1 includes an information set identifier for the information set category referred to as wiring diagram. The processor 15 can refer to the VSI 110 (shown in FIG. 20) to determine whether or not the IS DB 5 contains a wiring diagram to populate a display card for a subset of vehicles identified by the vehicle identifying information received in the request. If the vehicle identifying information comprises the vehicle ID YMME_3.2, the processor 15 by referring to the VSI 110 can determine that the wiring diagram WD_4 pertains to component ID C5, symptom ID S10, and vehicle ID YMME_3.2. If the vehicle identifying information comprises the vehicle ID YMME_2.1, the processor 15 by referring to the VSI 110 can determine that the IS DB 5 does not comprise a wiring diagram that pertains to component ID C5, symptom ID S10, and vehicle ID YMME_2.1. The processor 15 can be configured to request VSI from a secondary source if the VSI is not contained in the IS DB 5. If the processor 15 determines the VSI needed to populate a response is not available, the processor 15 can alter the initial ordered group of information set identifiers by removing the information set identifier (e.g., the wiring diagram information set identifier) from the initial ordered group of information set identifiers. The processor 15 can finalize determining the ordered group of information set identifiers by removing each diagram information set identifier for which VSI is not available for populating the response with the initial ordered group of information set identifiers.

Next block 174 includes transmitting, by the server 2 to the VST 3, the response to the request, the response comprising data indicative of the ordered group of information set identifiers and the determined multiple information sets. As an example, the data indicative of the ordered group of information set identifiers comprises for each information set identifier of the ordered group of information set identifiers (i) an identifier indicative of the information set or the category associated with the information set identifier, and (ii) a display order position indicative of a display position relative to display positions of other information set identifiers of the ordered group of information set identifiers. The determined ordered group of information set identifiers in the response can comprise an initial ordered group of information set identifiers if the processor 15 determines an information set pertaining to each information set identifier is available for populating into the response. Alternatively, the determined ordered group of information set identifiers in the response can comprise an altered set of ordered group of information set identifiers if the processor 15 alters the initial ordered group of information set identifiers for any reason.

As an example, the response to the request can comprise data for displaying ordered group of information set identifiers and the determined multiple information sets in a particular display format in which vehicle service information of each of the multiple information sets is displayed in a data container of a display page. The data container of the display page can, for example, comprise a display card, a table, a list, or a paragraph.

Next, another function performable with the set 170 comprises determining, by the processor 15, a set of rules that define a searching order for determining the multiple information sets from within the IS DB 5. If the determined ordered group of information set identifiers comprises the first ordered group of multiple information set identifiers then the searching order is arranged as the vehicle identifying information and then the symptom identifier or the symptom identifier and then the vehicle identifying information. If the determined ordered group of information set identifiers comprises the second ordered group of multiple information set identifiers, then the searching order is arranged as the vehicle identifying information and then the vehicle component identifier or the vehicle component identifier and then the vehicle identifying information. Otherwise, if the determined ordered group of information set identifiers comprises the third ordered group of multiple information set identifiers then the searching order is arranged as: (i) the vehicle identifying information, then the symptom identifier, and then the vehicle component identifier, (ii) the vehicle identifying information, then the vehicle component identifier, and then the symptom identifier, (iii) the symptom identifier, then the vehicle identifying information, and then the vehicle component identifier, (iv) the symptom identifier, then the vehicle component identifier, and then the vehicle identifying information, (v) the vehicle component identifier, then the vehicle identifying information, and then the symptom identifier, or (vi) the vehicle component identifier, then the symptom identifier, and then the vehicle identifying information. Determining the multiple information sets comprises searching the database based on the defined searching order.

Next, another function performable with the set 170 comprises determining, by the at least one processor 15 of the server, multiple information set identifiers associated with the additional search term, wherein each information set identifier of the multiple information set identifiers is associated with a hierarchical value and an information set category; and determining, by the at least one processor 15, vehicle service information applicable to the information set category associated with each information set identifier of at least a subset of the ordered group of information set identifiers is available for providing in the response. Determining the ordered group of information set identifiers based on the additional search term comprises ordering each information set identifier of the at least a subset of the multiple information set identifiers based on the hierarchical value of that information set identifier with respect to the hierarchical value of each other information set identifier of the subset of the multiple information set identifiers.

Next, another function performable with the set 170 comprises (a) receiving, at the at least one processor 15 of the server, untagged vehicle service information, (b) determining, by the at least one processor of the server, at least a portion of the untagged vehicle service information pertains to (i) the subset of vehicles, the symptom identifier or the vehicle component, and (ii) a particular information set category, (c) determining, by the at least one processor of the server, at least a portion of the untagged vehicle service information pertains to (i) the subset of vehicles, the symptom identifier or the vehicle component, and (ii) a particular information set category; and (d) storing, within a database of information sets, the tagged vehicle service information. The multiple information sets comprise the tagged vehicle service information. The untagged vehicle service information can comprise at least one repair order indicative of a prior repair made to a vehicle.

Next, another function performable with the set 170 comprises receiving, by the VST 3, the response to the request; and displaying, by the display 192, the determined ordered group of information set identifiers and at least a portion of the determined multiple information sets received as part of the response to the request.

Next, another function performable with the set 170 comprises determining, by the at least one processor 15 of the server, an information set is not available for a particular information set identifier of the determined ordered group of information set identifiers; and altering, by the at least one processor 15 of the server, the determined ordered group of information set identifiers by removing the information set identifier from the determined ordered group of information set identifiers.

The at least one processor can further alter the determined ordered group of information set identifiers by adding an information set identifier to the determined ordered group of information sets identifiers such that determined ordered group of information set identifiers and the modified ordered group of information set identifiers have the same quantity of information set identifiers. For instance, if the processor 15 determines the ordered group of information set identifiers is the top ten hierarchical information set identifiers (i.e., IS7, IS3, IS26, IS25, IS10, IS13, IS16, IS19, IS24, and IS23) of the ordered group of information set identifiers 91 and that an information set is not available for the information set identifier IS10 with respect to the vehicle identifying information and the additional search term, the processor 15 can remove IS10 and add the next highest priority information set identifier (e.g., IS5). Altering the determined ordered group of information set identifiers can include increasing a priority of the information set identifier having a priority lower than the information set identifier removed from the ordered group. In this case, the example modified ordered group of information set identifiers can be as follows: IS7, IS3, IS26, IS25, IS13, IS16, IS19, IS24, IS23, and IS5.

Next, for a case in which the additional search term comprises at least the symptom identifier, another function performable with the set 170 comprises (a) receiving, at the processor 15, a set of vehicle data sent by a second VST (e.g., the VST 9), wherein the set of vehicle data comprises the vehicle identifying information, the symptom identifier, and parameter identifier (PID) data generated by a vehicle of the subset of vehicles; (b) associating, by the processor 15, the set of vehicle data with tags indicative of the vehicle identifying information, the symptom identifier, and a PID category; and (c) storing, within a database of information sets, the set of vehicle data and the associated tags. The information set category associated with a particular information set identifier of the ordered group of information set identifiers comprises the PID category. The information set associated with the particular information set identifier comprises the PID data of the set of vehicle data sent by the second VST. In one respect, the first VST and the second VST can be separate VSTs. In another respect, the first VST and the second VST can be the same. In accordance with this latter respect, the same VST could be used to capture the set of vehicle data from a first vehicle of the subset at a first day and time and the same VST could be used to send the request to the server at block 171.

Next, for a case in which a particular information set associated with a particular information set identifier of the determined an ordered group of information set identifiers comprises a first article and a link to the first article, another function performable with the set 170 comprises (a) receiving, by the at least one processor 15, a selection of the link to the first article; and (b) causing, by the at least one processor 15 in response to receiving the selection, the accordion to expand from the first size to the second size, retrieve the article from the link to the first article, and display the retrieved article in the accordion set to the second size. The particular information set comprises vehicle service information for display in an accordion expandable from a first size to a second size and reducible from the second size to the first size. The second size of the accordion is larger than the first size of the accordion. The link to the first article is displayed in the accordion set to the first size.

Next, FIG. 23 shows a flowchart depicting a set of functions 180 (or more simply "the set 180") that can be carried out in accordance with the example embodiments described in this description. The set 180 comprises the functions shown in blocks labeled with whole numbers 181 through 184 inclusive. The following description of the set 180 comprises references to elements shown in other figures described in this description, but the functions of the set 170 are not limited to being carried out only by the referenced elements. A variety of methods can be performed using all of the functions shown in the set 180 or any proper subset of the functions shown in the set 180. Any of those methods can be performed with other functions such as one or more of the other example functions described in this description.

Block 181 includes receiving, by at least one processor 30 of a vehicle service tool 3, an input associated with vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier. The vehicle identifying information identifies a subset of vehicles within a set of all vehicles. The symptom identifier identifies a symptom exhibitable within each vehicle of the subset of vehicles. The vehicle component identifier identifies a component on each vehicle of the subset of vehicles.

In accordance with an example embodiment in which the VST 3 comprises a connector connectable to a vehicle 4 of a subset of vehicles, receiving the input associated with the vehicle identifying information and the additional search term at block 181 can comprise receiving by the at least one processor 30 via the connector at least one message from the vehicle 4. The at least one message can the vehicle identifying information, the additional search term, or the vehicle identifying information and the additional search term. As an example, the vehicle identifying information within the at least one message can comprise a VIN of the vehicle or a portion of the VIN. As another example, the additional search term within the at least one message can comprise a DTC from an ECU and an identifier of the ECU.

Next, block 182 includes transmitting, by the at least one processor 30 to a server 2, a request comprising the vehicle identifying information and the additional search term. As an example, the request can be arranged like the request 50. As another example, the request can be arranged to include one or more of the aspects of the request 50. Transmitting the request can comprise the processor 30 outputting the request to the network interface 31 and the network interface 31 transmitting the request to the server 2 via the communication link 7.

Next, block 183 includes receiving, by the at least one processor 30, a response to the request, the response comprising data indicative of an ordered group of information set identifiers and multiple information sets of vehicle service information. As an example, the response can be arranged like the response 60. As another example, the response can be arranged to include one or more aspects of the response 60. Receiving the response can comprise the network interface 31 receiving the response and providing the response to the processor 30 via the connection mechanism 35.

Next, block 184 includes displaying, by a display connected to the at least one processor 30, the multiple information sets of vehicle service information according to the ordered group of information set identifiers. The connection of the at least one processor 30 and the display can, for example, occur via the connection mechanism 35 and/or a communication link, such as the communication link 7 or 8. The display can comprise the display 192 of the user interface 32.

The display 192 can display the multiple information sets of VSI using a particular display format. The particular display format can comprise a display format in which VSI of each of the multiple information sets is displayed in a data container of a display page. The data container of the display page, can for example, comprise a display card, a table, a list, or a paragraph. For example, the display can display the multiple information sets of VSI using a display card format, such as the way multiple information sets are displayed using the display card format, as shown in FIG. 11 to FIG.

14. As another example, the display can display the multiple information sets of VSI using a paragraph format, such as the way multiple information sets are displayed using the paragraph format, as shown in FIG. 15 to FIG. 17. The display can display the multiple information sets of VSI with other data, such as the vehicle identifying information and the additional search term. Additional examples of that other data are also possible.

A display format for displaying an information set of VSI can comprise accordion display format that comprises displaying the information set of VSI within an accordion having two or more accordion states. One of the accordion states can comprise an unexpanded state. At least a portion of the VSI of the information set is not visible with the accordion in the unexpanded state. One of the accordion states can comprise an expanded state in which VSI not visible in a less expanded state is visible in the expanded state. FIG. 12 to FIG. 14 illustrate the diagnosis display card with an unexpanded state and two expanded states for the diagnosis information set category. FIG. 17 illustrates the diagnosis information set displayed in the paragraph format with an unexpanded state and two expanded states.

In one case, the data container of a display page displaying multiple information sets comprises a display card. Further, displaying the multiple information sets of VSI according to the ordered group of information set identifiers comprises displaying, by the display, a first display card in an unexpanded state. Additional functions performable with the set 180 can comprise: (i) displaying, by the display, a display card resize selector associated with the first display card; (ii) receiving, by the at least one processor 30, a selection of the display card resize selector while the first display card is displayed in the unexpanded state, and (iii) displaying, by the display in response to the at least one processor receiving the selection of the display card resize selector while the first display card is displayed in the unexpanded state, the first display card in a first expanded state, wherein a size of the first display card is greater when the first display card is displayed in the first expanded state compared to the unexpanded state. Still further, additional functions performable with the set 180 can comprise (i) receiving, by the at least one processor 30, a selection of the display card resize selector while the first display card is displayed in the first expanded state; and displaying, by the display in response to receiving the selection of the display card resize selector while the first display card is displayed in the first expanded state, the first display card in a second expanded state or in the unexpanded state. The size of the first display card is greater when the first display card is displayed in the second expanded state compared to the first expanded state.

Furthermore, the at least one processor 30 can receive a selection of the display card resize selector while the first display card is displayed in the first expanded state. In response to receiving that selection the processor 30 can cause the display 192 to display the first display card in a second expanded state or in the unexpanded state. The size of the first display card is greater when the first display card is displayed in the second expanded state compared to the first expanded state.

Next, another function performable with the set 180 comprises determining, by the processor 30, feedback data indicative of which information set or information sets of the multiple information sets was selected while being displayed by the display 192, and outputting, by the at least one processor 30 to a network interface of the VST 3, the feedback data for transmission to the server 2. The server 2 can receive and store the feedback data within the display feedback 27, aggregate the feedback data with other feedback data regarding displaying and selection of information sets and modify an order of an ordered group of information set identifiers based on the aggregated feedback data.

The processor 30 can determine selection of an information set in various ways. For example, the processor 30 can determine an information set was selected by determining a selection of a link within the displayed information set, a selection of a resize selector associated with the information set, a selection of an added-to-report icon associated with the information set, a selection of an add-to-report icon associated with the information set, a selection of an ask-a-community icon associated with the information set, or a selection of a comment icon associated with the information set. Other examples of the processor 30 determining an information set was selected are also possible.

Next, additional functions performable with the set 180 comprises at least one of (i) displaying, by the display, a first display card including a link to additional displayable content, (ii) receiving, by the at least one processor 30, a selection of the link to the additional displayable content; (iii) receiving, by the at least one processor in response to receiving the selection of the link, the additional displayable content; and (iv) displaying, by the display in response to receiving the selection of the link, the additional displayable content. As an example, the additional displayable content can comprise video content.

Figure 24:
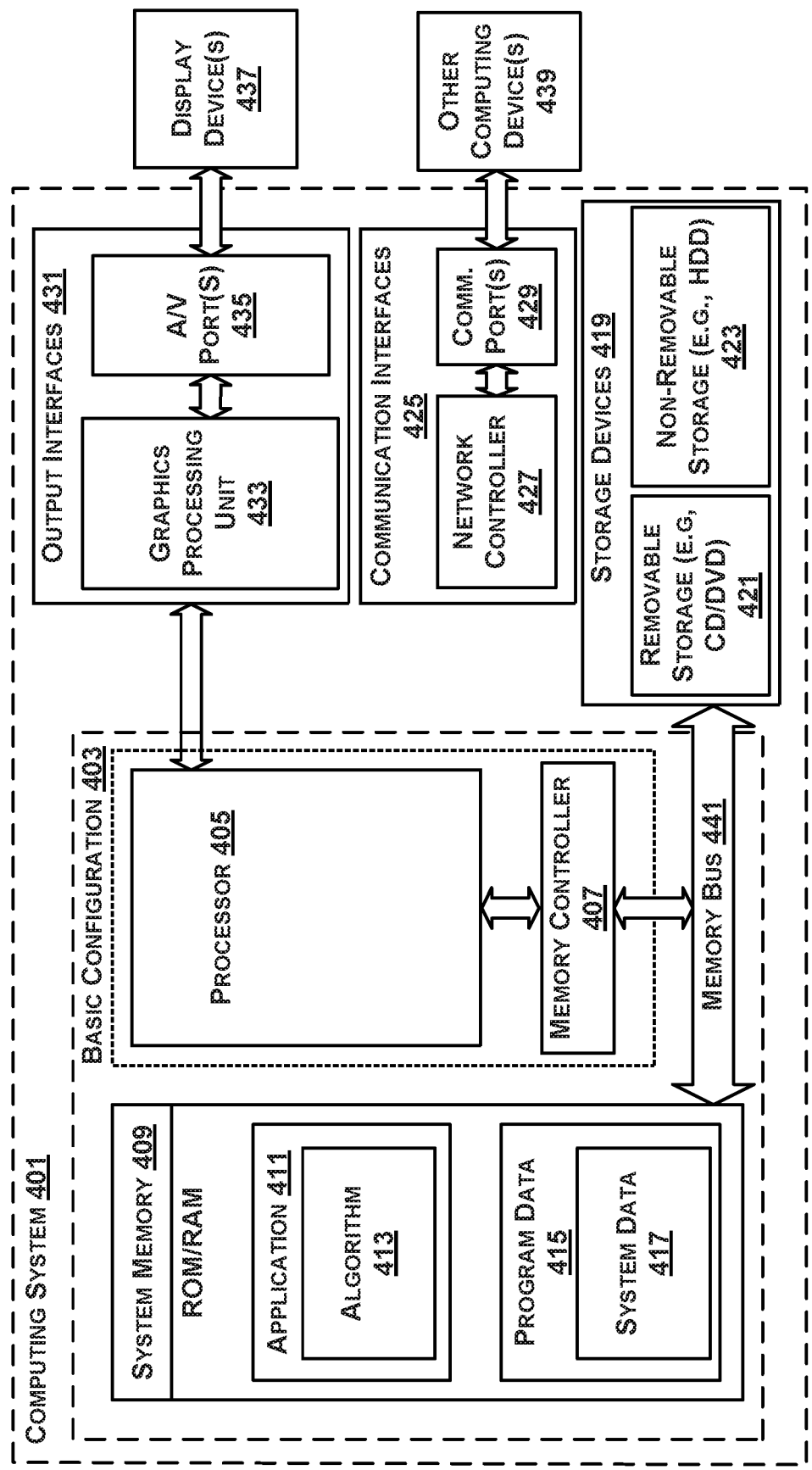
FIG. 24 is a functional block diagram illustrating a computing system that is arranged in accordance with the example embodiments.

Next, FIG. 24 is a functional block diagram illustrating an example computing system 401. One or both of the server 2 and the VST 3 can be configured as the computing system 401.

In a basic configuration 403, the computing system 401 can comprise one or more processors 405 and a system memory 409. A memory bus 441 can be used for communicating between the processor 405 and the system memory 409. Depending on the desired configuration, the processor 405 can be of any type including but not limited to a microprocessor (µP), a microcontroller (µC), a digital signal processor (DSP), or any combination thereof. A memory controller 407 can also be used with the processor 405, or in some implementations, the memory controller 407 can be an internal part of the processor 405.

Depending on the desired configuration, the system memory 409 can be of any type including but not limited to volatile memory (such as RAM), non-volatile memory (such as ROM, flash memory, etc.) or any combination thereof. The system memory 409 can comprise one or more applications 411, and program data 415. The application 411 can comprise an algorithm 413 that is arranged to perform the functions described as being performed by the server 2 or the VST 3. The program data 415 can comprise system data 417 that could be directed to any number of types of data, such as at least one of: the requests 21, the responses 22, the information set data 23, the information sets 24, the information set ID 25, the VST permissions 26, the request 37, the response 38, the information set data 39, the information sets, 40, the information set ID 41, the VST ID 42, the search terms 43, and the display feedback 44. In some example embodiments, the applications 411 can be arranged to operate with the program data 415 on an operating system executable by the processor 405.

The computing system 401 can have additional features or functionality, and additional interfaces to facilitate communications between the basic configuration 403 and any devices and interfaces. For example, data storage devices 419 can be provided including removable storage devices 421, non-removable storage devices 423, or a combination thereof. Examples of removable storage and non-removable storage devices comprise magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can comprise volatile and nonvolatile, non-transitory, removable and non-removable media implemented in any method or technology for storage of information, such as computer-readable program instructions, data structures, program modules, or other data such as the data stored in a computer-readable memory, such as the CRM 18 and the CRM 34.

The system memory 409 and the storage devices 419 are examples of computer-readable medium, such as the CRM 18 and the CRM 34. The system memory 409 and the storage devices 419 can comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 401.

The computing system 401 can comprise or be implemented as a portion of a small-form factor portable (i.e., mobile) electronic device such as a smartphone (e.g., an IPHONE® smartphone from Apple Inc. of Cupertino, Calif., or a GALAXY S® smartphone from Samsung Electronics Co., Ltd. Of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The application 411, or the program data 415 can comprise an application downloaded to the communication interfaces 425 from the APP STORE® online retail store, from the GOOGLE PLAY® online retail store, or another source of the applications. The VST 3 or a component of the VST 3 can comprise or be configured as a smartphone, a tablet device, or a wearable device.

Figure 25:
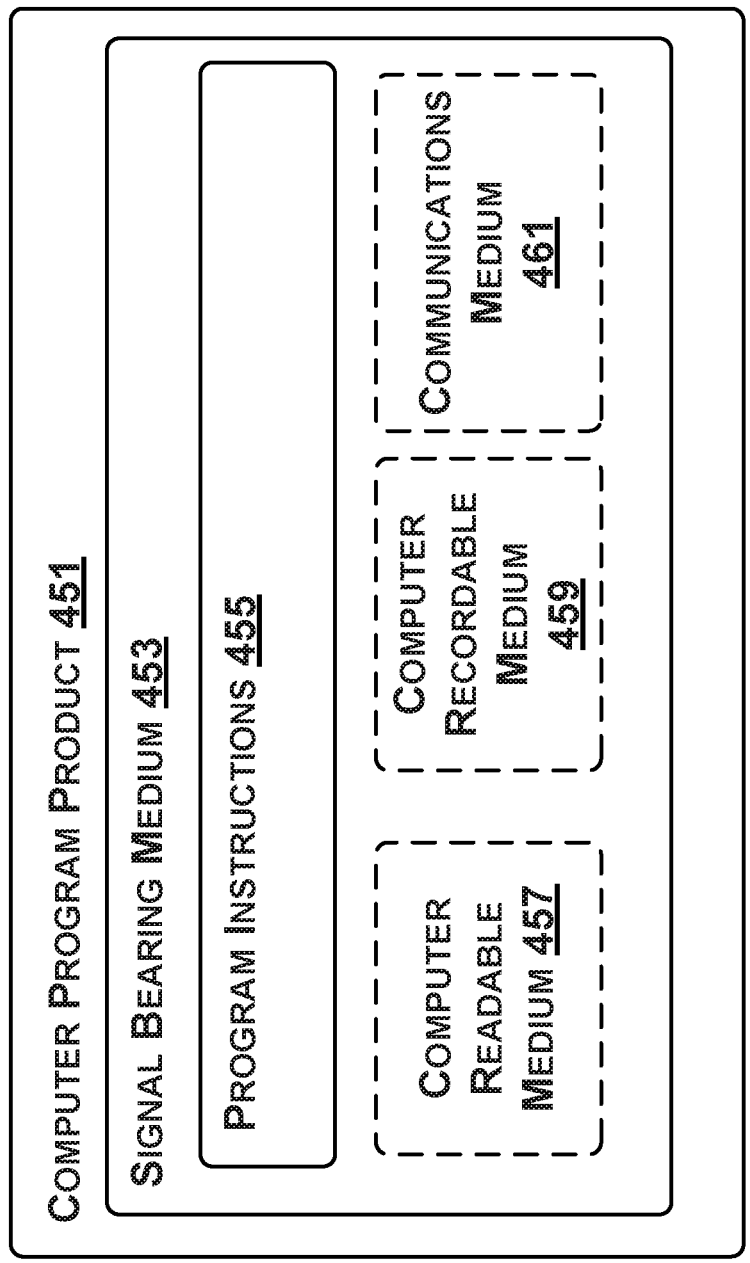
FIG. 25 is a schematic illustrating a conceptual partial view of a computer program product for executing a computer process on a computing system, according to an example embodiment.

Additionally or alternatively, the computing system 401 can comprise or be implemented as part of a personal computing system (including both laptop computer and non-laptop computer configurations), or a server. In some embodiments, the disclosed methods can be implemented as CRPI encoded on a non-transitory computer-readable storage media in a machine-readable format, or on other non-transitory media or articles of manufacture. FIG. 25 is a schematic illustrating a conceptual partial view of an example computer program product 451 that comprises a computer program for executing a computer process on a computing system, arranged according to at least some embodiments presented herein.

The computing system 401 can also comprise output interfaces 431 that can comprise a graphics processing unit 433, which can be configured to communicate to various external devices such as display devices 437 or speakers via one or more A/V ports 435 or a communication interface 425. The communication interface 425 can comprise a network controller 427, which can be arranged to facilitate communications with one or more other computing systems 439 over a network communication via one or more communication ports 429. The communication connection is one example of a communication media. Communication media can be embodied by CRPI, data structures, program modules, or other data in a modulated data signal, such as a carrier wave or other transport mechanism, and comprises any information delivery media. A modulated data signal can be a signal that has one or more of its characteristics set or changed in such a manner as to encode information in the signal. By way of example, and not limitation, communication media can comprise wired media such as a wired network or direct-wired connection, and wireless media such as acoustic, radio frequency (RF), infrared (IR) and other wireless media.

In one embodiment, the example computer program product 451 is provided using a signal bearing medium 453. The signal bearing medium 453 can comprise one or more programming instructions 455 that, when executed by one or more processors can provide functionality or portions of the functionality described above with respect to FIG. 1 to FIG. 24. In some examples, the signal bearing medium 453 can encompass a computer-readable medium 457, such as, but not limited to, a hard disk drive, a Compact Disc (CD), a Digital Video Disk (DVD), a digital tape, or any other memory described herein. In some implementations, the signal bearing medium 453 can encompass a computer recordable medium 459, such as, but not limited to, memory, read/write (R/W) CDs, R/W DVDs, etc. In some implementations, the signal bearing medium 453 can encompass a communications medium 461, such as, but not limited to, a digital and/or an analog communication medium (e.g., a fiber optic cable, a waveguide, a wired communications link, a wireless communication link, etc.). Thus, for example, the signal bearing medium 453 can be conveyed by a wireless form of the communications medium 461 (e.g., a wireless communications medium conforming to the IEEE 802.11 standard or another transmission protocol).

The one or more programming instructions 455 can be, for example, computer executable and/or logic implemented instructions. In some examples, a computing system such as the computing system 401 of FIG. 24 can be configured to provide various operations, functions, or actions in response to the programming instructions 455 conveyed to the computing system 401 by one or more of the computer-readable medium 457, the computer recordable medium 459, and/or the communications medium 461.

The processor 15 can be configured like the processor 405. The CRM 18 can be configured as part of or all of the system memory 409 or the storage devices 419. The network interface 16 and the database interface 17 can be configured as part of or all of the communication interfaces 425. The processor 30 can be configured like the processor 405. The CRM 34 can be configured as part of or all of the system memory 409 or the storage devices 419. The network interface 31 and the vehicle interface 33 can be configured as part of or all of the communication interfaces 425.

Each of the server 2 and the VST 3 can comprise power components 28 and 45, respectively. In accordance with the example embodiments, a power component can comprise a connection to an external power source and circuitry to allow current to flow to other elements connected to the power component. As an example, the external power source can comprise a wall outlet at which a connection to an alternating current can be made. As another example, the external power source can comprise an energy storage device (e.g., a battery) or an electric generator.

Additionally or alternatively, a power component can comprise a connection to an internal power source and power transfer circuitry to allow current to flow to other elements connected to the internal power source. As an example, the internal power source can comprise an energy storage device, such as a battery. Furthermore, any power component(s) described herein can comprise various circuit protectors and signal conditioners. The power components described herein can provide a way to transfer electrical currents to other elements that operate electrically.

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable medium to perform some function can comprise executing all of the program instructions of those CRPI or only a portion of those CRPI.

The term "data" within this description can be used interchangeably with the term "content" or other terms, such as "indicator," "indicators," "identifier," or "identifiers." The data described herein can be processed in various ways, such as transmitted, received, stored, displayed, parsed, aggregated, or some other process. Any transmission of the data described herein can, for example, occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can comprise transmitting the data over an air interface (e.g., using radio signals (i.e., wirelessly)). The transmission of any of the data described herein can comprise transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a year, make, model, and engine identifier. The processor can determine a vehicle identifier by comparing the received data to a data structure that defines vehicle identifiers. As another example, data (arranged as a vehicle component identifier) can represent a vehicle component. A processor can determine what type of vehicle component is represented by that data by comparing the data to a structure that defines a variety of vehicle components. As yet another example, the data (arranged as a symptom identifier) can represent a symptom exhibited or exhibitable by a vehicle. A processor can determine what type of symptom is represented by that data by comparing the data to a structure that defines a variety of symptoms.

The data can comprise metadata. The metadata describes other data. The metadata can be stored as tags associated with the data the metadata describes.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing particular embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions, the intent of using the term "at least one of" immediately preceding a list of at least two components or functions, and the intent of using the term "one or more of" immediately preceding a list of at least two components or functions is to cover each embodiment including a listed component or function independently and each embodiment comprising each possible combination of at least two of the listed components or functions. In other words, the terms "at least one" and "one or more of" immediately preceding a list of at least components or functions modify the group of listed components or functions rather than each component or function. For example, an embodiment described as comprising "A, B, and/or C," or "at least one of A, B, and C," or "one or more of A, B, and C," or "at least one of A, B or C," or "one or more of A, B, or C" is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C. The use of ordinal numbers such as "first," "second," "third" and so on is to distinguish respective elements rather than to denote a particular order of those elements unless the context of using those terms explicitly indicates otherwise.

Embodiments of the present disclosure can thus relate to one of the enumerated example embodiment (EEEs) listed below.

EEE 1 is a method comprising: receiving, by at least one processor of a server, a request sent from a first vehicle service tool, wherein the request comprises vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles; determining, by the at least one processor of the server, an ordered group of information set identifiers based on the additional search term, wherein each information set identifier is associated with an information set category; determining, by the at least one processor of the server, multiple information sets to populate a response to the request, wherein determining the multiple information sets comprises determining, for each information set identifier of the ordered group of information set identifiers, an information set pertaining to (i) the subset of vehicles, (ii) the additional search term, and (iii) the information set category associated with the information set identifier; and transmitting, by the server to the first vehicle service tool, the response to the request, the response comprising data indicative of the ordered group of information set identifiers and the determined multiple information sets.

EEE 2 is the method of EEE 1, wherein determining the ordered group of information set identifiers based on the additional search term comprises determining, from among multiple selectable ordered groups of information set identifiers, a selectable ordered group of information set identifiers associated with the additional search term, wherein the multiple selectable ordered groups of information set identifiers comprise a first ordered group of multiple information set identifiers associated with the symptom identifier, but not the vehicle component identifier, a second ordered group of multiple information set identifiers associated with the vehicle component identifier, but not the symptom identifier, and a third ordered group of multiple information set identifiers associated with the symptom identifier and the vehicle component identifier, wherein the determined ordered group of information set identifiers comprises (i) the first ordered group of multiple information set identifiers if the additional search term comprises the symptom identifier, but not the vehicle component identifier, (ii) the second ordered group of multiple information set identifiers if the additional search term comprises the vehicle component identifier, but not the symptom identifier, or (iii) the ordered group of multiple information set identifiers if the additional search term comprises the symptom identifier and the vehicle component identifier, and wherein each information set identifier in each of the multiple selected ordered groups of information set identifiers is associated with a different category of vehicle service information.

EEE 3 is the method of EEE 2, wherein each of the first ordered group of multiple information set identifiers, the second ordered group of multiple information set identifiers, and the third ordered group of multiple information set identifiers comprise identical information set identifiers, but in a different order.

EEE 4 is the method of EEE 2, wherein the first ordered group of multiple information set identifiers comprises at least one information set identifier not within either of the second ordered group of information set identifiers and the third second ordered group of information set identifiers, wherein the second ordered group of multiple information set identifiers comprises at least one information set identifier not within either of the first ordered group of information set identifiers and the third ordered group of information set identifiers, and wherein the third ordered group of multiple information set identifiers comprises at least one information set identifier not within either of the first ordered group of information set identifiers and the second ordered group of information set identifiers.

EEE 5 is the method of any one of EEE 1 to 4, further comprising: determining, by the at least one processor of the server, a set of rules that define a searching order for determining the multiple information sets from within a database of vehicle service information, wherein if the determined ordered group of information set identifiers comprises the first ordered group of multiple information set identifiers then the searching order is arranged as the vehicle identifying information and then the symptom identifier or the symptom identifier and then the vehicle identifying information, otherwise if the determined ordered group of information set identifiers comprises the second ordered group of multiple information set identifiers then the searching order is arranged as the vehicle identifying information and then the vehicle component identifier or the vehicle component identifier and then the vehicle identifying information, or if the determined ordered group of information set identifiers comprises the third ordered group of multiple information set identifiers then the searching order is arranged as: (i) the vehicle identifying information, then the symptom identifier, and then the vehicle component identifier, (ii) the vehicle identifying information, then the vehicle component identifier, and then the symptom identifier, (iii) the symptom identifier, then the vehicle identifying information, and then the vehicle component identifier, (iv) the symptom identifier, then the vehicle component identifier, and then the vehicle identifying information, (v) the vehicle component identifier, then the vehicle identifying information, and then the symptom identifier, or (vi) the vehicle component identifier, then the symptom identifier, and then the vehicle identifying information, and wherein determining the multiple information sets comprises searching the database based on the defined searching order.

EEE 6 is the method of any one of EEE 1 to 5, further comprising: determining, by the at least one processor of the server, multiple information set identifiers associated with the additional search term, wherein each information set identifier of the multiple information set identifiers is associated with a hierarchical value and an information set category; and determining, by the at least one processor, vehicle service information applicable to the information set category associated with each information set identifier of at least a subset of the ordered group of information set identifiers is available for providing in the response, wherein determining the ordered group of information set identifiers based on the additional search term comprises ordering each information set identifier of the at least a subset of the multiple information set identifiers based on the hierarchical value of that information set identifier with respect to the hierarchical value of each other information set identifier of the subset of the multiple information set identifiers.

EEE 7 is the method of any one of EEE 1 to 6, wherein the vehicle identifying information comprises: a vehicle manufacturer identifier, and (i) at least one vehicle model year identifier and at least one vehicle model identifier, or (ii) at least one vehicle model year identifier, at least one vehicle model identifier, and at least one engine identifier.

EEE 8 is the method of any one of EEE 1 to 7, wherein a particular information set associated with a particular information set identifier of the determined an ordered group of information set identifiers comprises a first article and a link to the first article, wherein the particular information set comprises vehicle service information for display in an accordion expandable from a first size to a second size and reducible from the second size to the first size, wherein the second size is larger than the first size, wherein the link to the first article is displayed in the accordion set to the first size, wherein the method further comprises: receiving, by the at least one processor, a selection of the link to the first article; and causing, by the at least one processor in response to receiving the selection, the accordion to expand from the first size to the second size, retrieve the article from the link to the first article, and display the retrieved article in the accordion set to the second size.

EEE 9 is the method of any one of EEE 1 to 8, wherein the multiple information sets comprise at least one information set selected from the group consisting of: a technical service bulletin information set, a component connector information set, a wiring diagram information set, a remove and replace procedure information set, a component operation information set, a component location information set, an additional replaced part information set, a commonly replaced parts information set, a real-fix tip information set, an original equipment manufacturer (OEM) specification information set, a common test strategies information set, an OEM code data and test procedure information set, a part and labor information set, and a post-repair information set.

EEE 10 is the method of any one of EEE 1 to 9, wherein the additional search term comprises at least the symptom identifier, the method further comprising: receiving, at the at least one processor of the server, a set of vehicle data sent by a second vehicle service tool, wherein the set of vehicle data comprises the vehicle identifying information, the symptom identifier, and parameter identifier (PID) data generated by a vehicle of the subset of vehicles; associating, by the at least one processor of the server, the set of vehicle data with tags indicative of the vehicle identifying information, the symptom identifier, and a PID category; and storing, within a database of information sets, the set of vehicle data and the associated tags, wherein an information set category associated with a particular information set identifier of the ordered group of information set identifiers comprises the PID category, and wherein the information set associated with the particular information set identifier comprises the PID data.

EEE 11 is the method of EEE 10, wherein the first vehicle service tool is the second vehicle service tool.

EEE 12 is the method of any one of EEE 1 to 11, further comprising: receiving, at the at least one processor of the server, untagged vehicle service information, determining, by the at least one processor of the server, at least a portion of the untagged vehicle service information pertains to (i) the subset of vehicles, the symptom identifier or the vehicle component, and (ii) a particular information set category, generating, by the at least one processor of the server, tagged vehicle service information by associating the at least a portion of the untagged vehicle service information with tags indicative of (i) the vehicle identifying information, the symptom identifier or the particular vehicle component, and (ii) the particular information set category; and storing, within a database of information sets, the tagged vehicle service information, wherein the multiple information sets comprise the tagged vehicle service information.

EEE 13 is the method of EEE 12, wherein the untagged vehicle service information comprises at least one repair order indicative of a prior repair made to a vehicle.

EEE 14 is the method of any one of EEE 1 to 13, wherein receiving the request comprises a receiver of the server receiving the request from a communication link by which the server and the first vehicle service tool communicate with each other.

EEE 15 is the method of any one of EEE 1 to 14, wherein the data indicative of the ordered group of information set identifiers comprises for each information set identifier of the ordered group of information set identifiers (i) an identifier indicative of the information set or the category associated with the information set identifier, and (ii) a display order position indicative of a display position relative to display positions of other information set identifiers of the ordered group of information set identifiers.

EEE 16 is the method of any one of EEE 1 to 15, wherein the symptom identifier comprises a diagnostic trouble code (DTC) identifier.

EEE 17 is the method of any one of EEE 1 to 16, further comprising: receiving, by the first vehicle service tool, the response to the request; and displaying, by a display of the first vehicle service tool, the determined ordered group of information set identifiers and at least a portion of the determined multiple information sets received as part of the response to the request.

EEE 18 is the method of any one of EEE 1 to 17, further comprising: determining, by the at least one processor of the server, an information set is not available for a particular information set identifier of the determined ordered group of information set identifiers; and altering, by the at least one processor of the server, the determined ordered group of information set identifiers by removing the information set identifier from the determined ordered group of information set identifiers.

EEE 19 is the method of any one of EEE 1 to 18, wherein the response to the request comprises data for displaying ordered group of information set identifiers and the determined multiple information sets in a particular display format in which vehicle service information of each of the multiple information sets is displayed in a data container of a display page.

EEE 20 is the method of EEE 19, wherein the data container of the display page comprises a display card, a table, a list, or a paragraph.

EEE 21 is a system comprising: at least one processor; and a computer-readable medium connected to the processor and comprising program instructions executable by the at least one processor to: receive a request sent from a first vehicle service tool, wherein the request comprises vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles; determine an ordered group of information set identifiers based on the additional search term, wherein each information set identifier is associated with an information set category; determine multiple information sets to populate a response to the request, wherein determining the multiple information sets comprises determining, for each information set identifier of the ordered group of information set identifiers, an information set pertaining to (i) the subset of vehicles, (ii) the additional search term, and (iii) the information set category associated with the information set identifier; and transmit to the first vehicle service tool the response to the request, the response comprising data indicative of the ordered group of information set identifiers and the determined multiple information sets.

EEE 22 is the system of EEE 21, wherein determining the ordered group of information set identifiers based on the additional search term comprises determining, from among multiple selectable ordered groups of information set identifiers, a selectable ordered group of information set identifiers associated with the additional search term, wherein the multiple selectable ordered groups of information set identifiers comprise a first ordered group of multiple information set identifiers associated with the symptom identifier, but not the vehicle component identifier, a second ordered group of multiple information set identifiers associated with the vehicle component identifier, but not the symptom identifier, and a third ordered group of multiple information set identifiers associated with the symptom identifier and the vehicle component identifier, wherein the determined ordered group of information set identifiers comprises (i) the first ordered group of multiple information set identifiers if the additional search term comprises the symptom identifier, but not the vehicle component identifier, (ii) the second ordered group of multiple information set identifiers if the additional search term comprises the vehicle component identifier, but not the symptom identifier, or (iii) the ordered group of multiple information set identifiers if the additional search term comprises the symptom identifier and the vehicle component identifier, and wherein each information set identifier in each of the multiple selected ordered groups of information set identifiers is associated with a different category of vehicle service information.

EEE 23 is the system of EEE 22, wherein each of the first ordered group of multiple information set identifiers, the second ordered group of multiple information set identifiers, and the third ordered group of multiple information set identifiers comprise identical information set identifiers, but in a different order.

EEE 24 is the system of EEE 22, wherein the first ordered group of multiple information set identifiers comprises at least one information set identifier not within either of the second ordered group of information set identifiers and the third second ordered group of information set identifiers, wherein the second ordered group of multiple information set identifiers comprises at least one information set identifier not within either of the first ordered group of information set identifiers and the third ordered group of information set identifiers, and wherein the third ordered group of multiple information set identifiers comprises at least one information set identifier not within either of the first ordered group of information set identifiers and the second ordered group of information set identifiers.

EEE 25 is the system of any one of EEE 21 to 24, wherein the program instructions are also executable by the at least one processor to: determine a set of rules that define a searching order for determining the multiple information sets from within a database of vehicle service information, wherein if the determined ordered group of information set identifiers comprises the first ordered group of multiple information set identifiers then the searching order is arranged as the vehicle identifying information and then the symptom identifier or the symptom identifier and then the vehicle identifying information, otherwise if the determined ordered group of information set identifiers comprises the second ordered group of multiple information set identifiers then the searching order is arranged as the vehicle identifying information and then the vehicle component identifier or the vehicle component identifier and then the vehicle identifying information, or if the determined ordered group of information set identifiers comprises the third ordered group of multiple information set identifiers then the searching order is arranged as: (i) the vehicle identifying information, then the symptom identifier, and then the vehicle component identifier, (ii) the vehicle identifying information, then the vehicle component identifier, and then the symptom identifier, (iii) the symptom identifier, then the vehicle identifying information, and then the vehicle component identifier, (iv) the symptom identifier, then the vehicle component identifier, and then the vehicle identifying information, (v) the vehicle component identifier, then the vehicle identifying information, and then the symptom identifier, or (vi) the vehicle component identifier, then the symptom identifier, and then the vehicle identifying information, and wherein the program instructions to determine the multiple information sets comprise program instructions to search the database based on the defined searching order.

EEE 26 is the system of any one of EEE 21 to 25, wherein the program instructions are also executable by the at least one processor to: determine multiple information set identifiers associated with the additional search term, wherein each information set identifier of the multiple information set identifiers is associated with a hierarchical value and an information set category; and determine vehicle service information applicable to the information set category associated with each information set identifier of at least a subset of the ordered group of information set identifiers is available for providing in the response, wherein the program instructions to determine the ordered group of information set identifiers based on the additional search term comprise program instructions to order each information set identifier of the at least a subset of the multiple information set identifiers based on the hierarchical value of that information set identifier with respect to the hierarchical value of each other information set identifier of the subset of the multiple information set identifiers.

EEE 27 is the system of any one of EEE 21 to 26, wherein the vehicle identifying information comprises: a vehicle manufacturer identifier, and (i) at least one vehicle model year identifier and at least one vehicle model identifier, or (ii) at least one vehicle model year identifier, at least one vehicle model identifier, and at least one engine identifier.

EEE 28 is the system of any one of EEE 21 to 27, wherein a particular information set associated with a particular information set identifier of the determined an ordered group of information set identifiers comprises a first article and a link to the first article, wherein the particular information set comprises vehicle service information for display in an accordion expandable from a first size to a second size and reducible from the second size to the first size, wherein the second size is larger than the first size, wherein the link to the first article is displayed in the accordion set to the first size, wherein the program instructions are also executable by the at least one processor to: receive a selection of the link to the first article; and cause, in response to receiving the selection, the accordion to expand from the first size to the second size, retrieve the article from the link to the first article, and display the retrieved article in the accordion set to the second size.

EEE 29 is the system of any one of EEE 21 to 28, wherein the multiple information sets comprise at least one information set selected from the group consisting of: a technical service bulletin information set, a component connector information set, a wiring diagram information set, a remove and replace procedure information set, a component operation information set, a component location information set, an additional replaced part information set, a commonly replaced parts information set, a real-fix tip information set, an original equipment manufacturer (OEM) specification information set, a common test strategies information set, an OEM code data and test procedure information set, a part and labor information set, and a post-repair information set.

EEE 30 is the system of any one of EEE 21 to 29, wherein the additional search term comprises at least the symptom identifier, wherein the program instructions are also executable by the at least one processor to: receive a set of vehicle data sent by a second vehicle service tool, wherein the set of vehicle data comprises the vehicle identifying information, the symptom identifier, and parameter identifier (PID) data generated by a vehicle of the subset of vehicles; associate the set of vehicle data with tags indicative of the vehicle identifying information, the symptom identifier, and a PID category; and store, within a database of information sets, the set of vehicle data and the associated tags, wherein an information set category associated with a particular information set identifier of the ordered group of information set identifiers comprises the PID category, and wherein the information set associated with the particular information set identifier comprises the PID data.

EEE 31 is the system of EEE 30, wherein the first vehicle service tool is the second vehicle service tool.

EEE 32 is the system of any one of EEE 21 to 31, wherein the program instructions are also executable by the at least one processor to: receive untagged vehicle service information, determine at least a portion of the untagged vehicle service information pertains to (i) the subset of vehicles, the symptom identifier or the vehicle component, and (ii) a particular information set category, generate tagged vehicle service information by associating the at least a portion of the untagged vehicle service information with tags indicative of (i) the vehicle identifying information, the symptom identifier or the particular vehicle component, and (ii) the particular information set category; and store, within a database of information sets, the tagged vehicle service information, wherein the multiple information sets comprise the tagged vehicle service information.

EEE 33 is the system of EEE 32, wherein the untagged vehicle service information comprises at least one repair order indicative of a prior repair made to a vehicle.

EEE 34 is the system of any one of EEE 21 to 33, wherein the program instructions to receive the request comprise program instruction to cause a receiver of the server receiving the request from a communication link by which the server and the first vehicle service tool communicate with each other.

EEE 35 is the system of any one of EEE 21 to 34, wherein the data indicative of the ordered group of information set identifiers comprises for each information set identifier of the ordered group of information set identifiers (i) an identifier indicative of the information set or the category associated with the information set identifier, and (ii) a display order position indicative of a display position relative to display positions of other information set identifiers of the ordered group of information set identifiers.

EEE 36 is the system of any one of EEE 21 to 35, wherein the symptom identifier comprises a diagnostic trouble code (DTC) identifier.

EEE 37 is the system of any one of EEE 21 to 36, wherein the program instructions are also executable by the at least one processor to: receive, by the first vehicle service tool, the response to the request; and display, by a display of the first vehicle service tool, the determined ordered group of information set identifiers and at least a portion of the determined multiple information sets received as part of the response to the request.

EEE 38 is the system of any one of EEE 21 to 37, wherein the program instructions are also executable by the at least one processor to: determine an information set is not available for a particular information set identifier of the determined ordered group of information set identifiers; and alter the determined ordered group of information set identifiers by removing the information set identifier from the determined ordered group of information set identifiers.

EEE 39 is the system of any one of EEE 21 to 38, wherein the response to the request comprises data for displaying ordered group of information set identifiers and the determined multiple information sets in a particular display format in which vehicle service information of each of the multiple information sets is displayed in a data container of a display page.

EEE 40 is the system of EEE 39, wherein the data container of the display page comprises a display card, a table, a list, or a paragraph.

EEE 41 is a computer-readable medium having stored thereon instructions executable by at least one processor to cause a server to perform functions comprising: (a) receiving a request sent from a first vehicle service tool, wherein the request comprises vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles; (b) determining an ordered group of information set identifiers based on the additional search term, wherein each information set identifier is associated with an information set category; (c) determining multiple information sets to populate a response to the request, wherein determining the multiple information sets comprises determining, for each information set identifier of the ordered group of information set identifiers, an information set pertaining to (i) the subset of vehicles, (ii) the additional search term, and (iii) the information set category associated with the information set identifier; and (d) transmitting to the first vehicle service tool the response to the request, the response comprising data indicative of the ordered group of information set identifiers and the determined multiple information sets.

EEE 42 is the computer-readable medium of EEE 41, wherein determining the ordered group of information set identifiers based on the additional search term comprises determining, from among multiple selectable ordered groups of information set identifiers, a selectable ordered group of information set identifiers associated with the additional search term, wherein the multiple selectable ordered groups of information set identifiers comprise a first ordered group of multiple information set identifiers associated with the symptom identifier, but not the vehicle component identifier, a second ordered group of multiple information set identifiers associated with the vehicle component identifier, but not the symptom identifier, and a third ordered group of multiple information set identifiers associated with the symptom identifier and the vehicle component identifier, wherein the determined ordered group of information set identifiers comprises (i) the first ordered group of multiple information set identifiers if the additional search term comprises the symptom identifier, but not the vehicle component identifier, (ii) the second ordered group of multiple information set identifiers if the additional search term comprises the vehicle component identifier, but not the symptom identifier, or (iii) the ordered group of multiple information set identifiers if the additional search term comprises the symptom identifier and the vehicle component identifier, and wherein each information set identifier in each of the multiple selected ordered groups of information set identifiers is associated with a different category of vehicle service information.

EEE 43 is the computer-readable medium of EEE 42, wherein each of the first ordered group of multiple information set identifiers, the second ordered group of multiple information set identifiers, and the third ordered group of multiple information set identifiers comprise identical information set identifiers, but in a different order.

EEE 44 is the computer-readable medium of EEE 42, wherein the first ordered group of multiple information set identifiers comprises at least one information set identifier not within either of the second ordered group of information set identifiers and the third second ordered group of information set identifiers, wherein the second ordered group of multiple information set identifiers comprises at least one information set identifier not within either of the first ordered group of information set identifiers and the third ordered group of information set identifiers, and wherein the third ordered group of multiple information set identifiers comprises at least one information set identifier not within either of the first ordered group of information set identifiers and the second ordered group of information set identifiers.

EEE 45 is the computer-readable medium of any one of EEE 42 to 44, wherein the instructions are also executable by at least one processor to cause the server to perform functions comprising: determining a set of rules that define a searching order for determining the multiple information sets from within a database of vehicle service information, wherein if the determined ordered group of information set identifiers comprises the first ordered group of multiple information set identifiers then the searching order is arranged as the vehicle identifying information and then the symptom identifier or the symptom identifier and then the vehicle identifying information, otherwise if the determined ordered group of information set identifiers comprises the second ordered group of multiple information set identifiers then the searching order is arranged as the vehicle identifying information and then the vehicle component identifier or the vehicle component identifier and then the vehicle identifying information, or if the determined ordered group of information set identifiers comprises the third ordered group of multiple information set identifiers then the searching order is arranged as: (i) the vehicle identifying information, then the symptom identifier, and then the vehicle component identifier, (ii) the vehicle identifying information, then the vehicle component identifier, and then the symptom identifier, (iii) the symptom identifier, then the vehicle identifying information, and then the vehicle component identifier, (iv) the symptom identifier, then the vehicle component identifier, and then the vehicle identifying information, (v) the vehicle component identifier, then the vehicle identifying information, and then the symptom identifier, or (vi) the vehicle component identifier, then the symptom identifier, and then the vehicle identifying information, and wherein determining the multiple information sets comprises searching the database based on the defined searching order.

EEE 46 is the computer-readable medium of any one of EEE 42 to 45, wherein the instructions are also executable by at least one processor to cause the server to perform functions comprising: determining multiple information set identifiers associated with the additional search term, wherein each information set identifier of the multiple information set identifiers is associated with a hierarchical value and an information set category; and determining vehicle service information applicable to the information set category associated with each information set identifier of at least a subset of the ordered group of information set identifiers is available for providing in the response, wherein determining the ordered group of information set identifiers based on the additional search term comprises ordering each information set identifier of the at least a subset of the multiple information set identifiers based on the hierarchical value of that information set identifier with respect to the hierarchical value of each other information set identifier of the subset of the multiple information set identifiers.

EEE 47 is the computer-readable medium of any one of EEE 42 to 46, wherein the vehicle identifying information comprises: a vehicle manufacturer identifier, and (i) at least one vehicle model year identifier and at least one vehicle model identifier, or (ii) at least one vehicle model year identifier, at least one vehicle model identifier, and at least one engine identifier.

EEE 48 is the computer-readable medium of any one of EEE 42 to 47, wherein a particular information set associated with a particular information set identifier of the determined an ordered group of information set identifiers comprises a first article and a link to the first article, wherein the particular information set comprises vehicle service information for display in an accordion expandable from a first size to a second size and reducible from the second size to the first size, wherein the second size is larger than the first size, wherein the link to the first article is displayed in the accordion set to the first size, wherein the instructions are also executable by at least one processor to cause the server to perform functions comprising: receiving a selection of the link to the first article; and causing, in response to receiving the selection, the accordion to expand from the first size to the second size, retrieve the article from the link to the first article, and display the retrieved article in the accordion set to the second size.

EEE 49 is the computer-readable medium of any one of EEE 42 to 48, wherein the multiple information sets comprise at least one information set selected from the group consisting of: a technical service bulletin information set, a component connector information set, a wiring diagram information set, a remove and replace procedure information set, a component operation information set, a component location information set, an additional replaced part information set, a commonly replaced parts information set, a real-fix tip information set, an original equipment manufacturer (OEM) specification information set, a common test strategies information set, an OEM code data and test procedure information set, a part and labor information set, and a post-repair information set.

EEE 50 is the computer-readable medium of any one of EEE 42 to 49, wherein the additional search term comprises at least the symptom identifier, wherein the instructions are also executable by at least one processor to cause the server to perform functions comprising: receiving a set of vehicle data sent by a second vehicle service tool, wherein the set of vehicle data comprises the vehicle identifying information, the symptom identifier, and parameter identifier (PID) data generated by a vehicle of the subset of vehicles; associating the set of vehicle data with tags indicative of the vehicle identifying information, the symptom identifier, and a PID category; and storing, within a database of information sets, the set of vehicle data and the associated tags, wherein an information set category associated with a particular information set identifier of the ordered group of information set identifiers comprises the PID category, and wherein the information set associated with the particular information set identifier comprises the PID data.

EEE 51 is the computer-readable medium of EEE 50, wherein the first vehicle service tool is the second vehicle service tool.

EEE 52 is the computer-readable medium of any one of EEE 42 to 51, wherein the instructions are also executable by at least one processor to cause the server to perform functions comprising: receiving untagged vehicle service information, determining at least a portion of the untagged vehicle service information pertains to (i) the subset of vehicles, the symptom identifier or the vehicle component, and (ii) a particular information set category, generating tagged vehicle service information by associating the at least a portion of the untagged vehicle service information with tags indicative of (i) the vehicle identifying information, the symptom identifier or the particular vehicle component, and (ii) the particular information set category; and storing, within a database of information sets, the tagged vehicle service information, wherein the multiple information sets comprise the tagged vehicle service information.

EEE 53 is the computer-readable medium of EEE 52, wherein the untagged vehicle service information comprises at least one repair order indicative of a prior repair made to a vehicle.

EEE 54 is the computer-readable medium of any one of EEE 42 to 53, wherein receiving the request comprises a receiver of the server receiving the request from a communication link by which the server and the first vehicle service tool communicate with each other.

EEE 55 is the computer-readable medium of any one of EEE 42 to 54, wherein the data indicative of the ordered group of information set identifiers comprises for each information set identifier of the ordered group of information set identifiers (i) an identifier indicative of the information set or the category associated with the information set identifier, and (ii) a display order position indicative of a display position relative to display positions of other information set identifiers of the ordered group of information set identifiers.

EEE 56 is the computer-readable medium of any one of EEE 42 to 55, wherein the symptom identifier comprises a diagnostic trouble code (DTC) identifier.

EEE 57 is the computer-readable medium of any one of EEE 42 to 56, wherein the instructions are also executable by at least one processor to cause the server to perform functions comprising: determining an information set is not available for a particular information set identifier of the determined ordered group of information set identifiers; and altering the determined ordered group of information set identifiers by removing the information set identifier from the determined ordered group of information set identifiers.

EEE 58 is the computer-readable medium of any one of EEE 42 to 57, wherein the response to the request comprises data for displaying ordered group of information set identifiers and the determined multiple information sets in a particular display format in which vehicle service information of each of the multiple information sets is displayed in a data container of a display page.

EEE 59 is the computer-readable medium of EEE 58, wherein the data container of the display page comprises a display card, a table, a list, or a paragraph.

EEE 60 is a method comprising: receiving, by at least one processor of a vehicle service tool (VST), an input associated with vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles; transmitting, by the at least one processor to a server, a request comprising the vehicle identifying information and the additional search term; receiving, by the at least one processor, a response to the request, the response comprising data indicative of an ordered group of information set identifiers and multiple information sets of vehicle service information; and displaying, by a display connected to the at least one processor, the multiple information sets of vehicle service information according to the ordered group of information set identifiers.

EEE 61 is the method of EEE 60, wherein displaying the multiple information sets of vehicle service information according to the ordered group of information set identifiers comprises displaying, by the display, the multiple information sets of vehicle service information in a particular display format in which vehicle service information of each of the multiple information sets is displayed in a data container of a display page.

EEE 62 is the method of EEE 60 or 61, wherein the data container of the display page comprises a display card, a table, a list, or a paragraph.

EEE 63 is the method of any one of EEE 60 to 62, wherein the data container of the display page comprises a display card, and wherein displaying the multiple information sets of vehicle service information according to the ordered group of information set identifiers comprises displaying, by the display, a first display card in an unexpanded state, and wherein the method further comprises: displaying, by the display, a display card resize selector associated with the first display card; receiving, by the at least one processor, a selection of the display card resize selector while the first display card is displayed in the unexpanded state; and displaying, by the display in response to the at least one processor receiving the selection of the display card resize selector while the first display card is displayed in the unexpanded state, the first display card in a first expanded state, wherein a size of the first display card is greater when the first display card is displayed in the first expanded state compared to the unexpanded state.

EEE 64 is the method of EEE 63, further comprising: receiving, by the at least one processor, a selection of the display card resize selector while the first display card is displayed in the first expanded state; and displaying, by the display in response to receiving the selection of the display card resize selector while the first display card is displayed in the first expanded state, the first display card in a second expanded state or in the unexpanded state, wherein the size of the first display card is greater when the first display card is displayed in the second expanded state compared to the first expanded state.

EEE 65 is the method of any one of EEE 60 to 64, wherein displaying the multiple information sets of vehicle service information according to the ordered group of information set identifiers comprises displaying, by the display, a first display card including a link to additional displayable content, wherein the method further comprises: receiving, by the at least one processor, a selection of the link to the additional displayable content; receiving, by the at least one processor in response to receiving the selection of the link, the additional displayable content; and displaying, by the display in response to receiving the selection of the link, the additional displayable content.

EEE 66 is the method of any one of EEE 60 to 65, further comprising: determining, by the at least one processor, feedback data indicative of which information set or information sets of the multiple information sets was selected while being displayed by the display; and outputting, by the at least one processor to a network interface of the VST, the feedback data for transmission to the server.

EEE 67 is the method of EEE 66, wherein the selection of each information set comprises a selection of a link within the displayed information set, a selection of a resize selector associated with the information set, a selection of an added-to-report icon associated with the information set, a selection of an add-to-report icon associated with the information set, a selection of an ask-a-community icon associated with the information set, or a selection of a comment icon associated with the information set.

EEE 68 is the method of any one of EEE 60 to 67, wherein the vehicle service tool comprises a connector connectable to a vehicle of the subset of vehicles, wherein receiving the input associated with the vehicle identifying information and the additional search term comprises receiving by the at least one processor via the connector at least one message from the vehicle, and wherein the at least one message comprises the vehicle identifying information, the additional search term, or the vehicle identifying information and the additional search term.

EEE 69 is the method of any one of EEE 60 to 68, wherein displaying the multiple information sets of vehicle service information comprises displaying a particular information set within an accordion in an unexpanded state, and wherein at least a portion of the vehicle service information of the particular information set is not visible with the accordion in the unexpanded state.

EEE 70 is a system comprising: at least one processor of a vehicle service tool (VST); a display connected to the at least one processor; and a computer-readable medium connected to the at least one processor and comprising program instructions executable by the at least one processor to: receive an input associated with vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles; transmit, to a server, a request comprising the vehicle identifying information and the additional search term; receive a response to the request, the response comprising data indicative of an ordered group of information set identifiers and multiple information sets of vehicle service information; and display, by the display, the multiple information sets of vehicle service information according to the ordered group of information set identifiers.

EEE 71 is the system of EEE 70, wherein the program instructions executable by the at least one processor to display the multiple information sets of vehicle service information according to the ordered group of information set identifiers comprises program instructions to display, by the display, the multiple information sets of vehicle service information in a particular display format in which vehicle service information of each of the multiple information sets is displayed in a data container of a display page.

EEE 72 is the system of EEE 70 or 71, wherein the data container of the display page comprises a display card, a table, a list, or a paragraph.

EEE 73 is the system of any one of EEE 70 to 72, wherein the data container of the display page comprises a display card, wherein the program instructions executable by the at least one processor to display the multiple information sets of vehicle service information according to the ordered group of information set identifiers comprises program instructions to display, by the display, a first display card in an unexpanded state, and wherein the program instructions are further executable by the at least one processor to: display, by the display, a display card resize selector associated with the first display card; receive a selection of the display card resize selector while the first display card is displayed in the unexpanded state; and display, by the display in response to the at least one processor receiving the selection of the display card resize selector while the first display card is displayed in the unexpanded state, the first display card in a first expanded state, wherein a size of the first display card is greater when the first display card is displayed in the first expanded state compared to the unexpanded state.

EEE 74 is the system of EEE 73, wherein the program instructions are further executable by the at least one processor to: receive a selection of the display card resize selector while the first display card is displayed in the first expanded state; and display, by the display in response to receiving the selection of the display card resize selector while the first display card is displayed in the first expanded state, the first display card in a second expanded state or in the unexpanded state, wherein the size of the first display card is greater when the first display card is displayed in the second expanded state compared to the first expanded state.

EEE 75 is the system of any one of EEE 70 to 74, wherein the program instructions executable by the at least one processor to display the multiple information sets of vehicle service information according to the ordered group of information set identifiers comprise program instructions to display, by the display, a first display card including a link to additional displayable content, wherein the program instructions are further executable by the at least one processor to: receive a selection of the link to the additional displayable content; receiving, in response to receiving the selection of the link, the additional displayable content; and display, by the display in response to receiving the selection of the link, the additional displayable content.

EEE 76 is the system of any one of EEE 70 to 75, wherein the program instructions executable by the at least one processor to; determine feedback data indicative of which information set or information sets of the multiple information sets was selected while being displayed by the display; and output, to a network interface of the VST, the feedback data for transmission to the server.

EEE 77 is the system of EEE 76, wherein the selection of each information set comprises a selection of a link within the displayed information set, a selection of a resize selector associated with the information set, a selection of an added-to-report icon associated with the information set, a selection of an add-to-report icon associated with the information set, a selection of an ask-a-community icon associated with the information set, or a selection of a comment icon associated with the information set.

EEE 78 is the system of any one of EEE 70 to 77, wherein the vehicle service tool comprises a connector connectable to a vehicle of the subset of vehicles, wherein the program instructions executable by the at least one processor to receive the input associated with the vehicle identifying information and the additional search term comprise program instructions to receive via the connector at least one message from the vehicle, and wherein the at least one message comprises the vehicle identifying information, the additional search term, or the vehicle identifying information and the additional search term.

EEE 79 is the system of any one of EEE 70 to 78, wherein the program instructions executable by the at least one processor to display the multiple information sets of vehicle service information comprise program instructions to display a particular information set within an accordion in an unexpanded state, and wherein at least a portion of the vehicle service information of the particular information set is not visible with the accordion in the unexpanded state.

EEE 80 is a computer-readable medium having stored thereon instructions executable by at least one processor to cause a vehicle service tool (VST) to perform functions comprising: receiving an input associated with vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles; transmitting, to a server, a request comprising the vehicle identifying information and the additional search term; receiving a response to the request, the response comprising data indicative of an ordered group of information set identifiers and multiple information sets of vehicle service information; and displaying, by a display connected to the at least one processor, the multiple information sets of vehicle service information according to the ordered group of information set identifiers.

EEE 81 is the computer-readable medium of EEE 80, wherein displaying the multiple information sets of vehicle service information according to the ordered group of information set identifiers comprises displaying, by the display, the multiple information sets of vehicle service information in a particular display format in which vehicle service information of each of the multiple information sets is displayed in a data container of a display page.

EEE 82 is the computer-readable medium of EEE 80 or 81, wherein the data container of the display page comprises a display card, a table, a list, or a paragraph.

EEE 83 is the computer-readable medium of any one of EEE 80 to 82, wherein the data container of the display page comprises a display card, and wherein displaying the multiple information sets of vehicle service information according to the ordered group of information set identifiers comprises displaying, by the display, a first display card in an unexpanded state, and wherein the instructions are also executable by at least one processor to cause the VST to perform functions comprising: displaying, by the display, a display card resize selector associated with the first display card; receiving, by the at least one processor, a selection of the display card resize selector while the first display card is displayed in the unexpanded state; and displaying, by the display in response to the at least one processor receiving the selection of the display card resize selector while the first display card is displayed in the unexpanded state, the first display card in a first expanded state, wherein a size of the first display card is greater when the first display card is displayed in the first expanded state compared to the unexpanded state.

EEE 84 is the computer-readable medium of EEE 83, wherein the instructions are also executable by at least one processor to cause the VST to perform functions comprising: receiving, by the at least one processor, a selection of the display card resize selector while the first display card is displayed in the first expanded state; and displaying, by the display in response to receiving the selection of the display card resize selector while the first display card is displayed in the first expanded state, the first display card in a second expanded state or in the unexpanded state, wherein the size of the first display card is greater when the first display card is displayed in the second expanded state compared to the first expanded state.

EEE 85 is the computer-readable medium of any one of EEE 80 to 84, wherein displaying the multiple information sets of vehicle service information according to the ordered group of information set identifiers comprises displaying, by the display, a first display card including a link to additional displayable content, wherein the instructions are also executable by at least one processor to cause the VST to perform functions comprising: receiving, by the at least one processor, a selection of the link to the additional displayable content; receiving, by the at least one processor in response to receiving the selection of the link, the additional displayable content; and displaying, by the display in response to receiving the selection of the link, the additional displayable content.

EEE 86 is the computer-readable medium of any one of EEE 80 to 85, wherein the instructions are also executable by at least one processor to cause the VST to perform functions comprising: determining, by the at least one processor, feedback data indicative of which information set or information sets of the multiple information sets was selected while being displayed by the display; and outputting, by the at least one processor to a network interface of the VST, the feedback data for transmission to the server.

EEE 87 is the computer-readable medium of EEE 86, wherein the selection of each information set comprises a selection of a link within the displayed information set, a selection of a resize selector associated with the information set, a selection of an added-to-report icon associated with the information set, a selection of an add-to-report icon associated with the information set, a selection of an ask-a-community icon associated with the information set, or a selection of a comment icon associated with the information set.

EEE 88 is the computer-readable medium of any one of EEE 80 to 87, wherein the vehicle service tool comprises a connector connectable to a vehicle of the subset of vehicles, wherein receiving the input associated with the vehicle identifying information and the additional search term comprises receiving by the at least one processor via the connector at least one message from the vehicle, and wherein the at least one message comprises the vehicle identifying information, the additional search term, or the vehicle identifying information and the additional search term.

EEE 89 is the computer-readable medium of any one of EEE 80 to 88, wherein displaying the multiple information sets of vehicle service information comprises displaying a particular information set within an accordion in an unexpanded state, and wherein at least a portion of the vehicle service information of the particular information set is not visible with the accordion in the unexpanded state.

EEE 90 is the method of any one of EEE 1 to 20, wherein the request further comprises a service status indicator determined by the first VST, and wherein determining the ordered group of information set identifiers is further based on the service status indicator.

EEE 91 is the method of any one of EEE 1 to 20 or 90, wherein the request further comprises a customer identifier, and wherein determining the ordered group of information set identifiers is further based on the customer identifier.

EEE 92 is the method of EEE 91, wherein the customer identifier comprises a technician identifier, a repair shop identifier or a vehicle service tool identifier.

EEE 93 is the system of any one of EEE 21 to 40, wherein the request further comprises a service status indicator determined by the first VST, and wherein determining the ordered group of information set identifiers is further based on the service status indicator.

EEE 94 is the system of any one of EEE 21 to 40 or 93, wherein the request further comprises a customer identifier, and wherein determining the ordered group of information set identifiers is further based on the customer identifier.

EEE 95 is the system of EEE 94, wherein the customer identifier comprises a technician identifier, a repair shop identifier or a vehicle service tool identifier.

EEE 96 is the computer-readable medium of any one of EEE 41 to 59, wherein the request further comprises a service status indicator determined by the first VST, and wherein determining the ordered group of information set identifiers is further based on the service status indicator.

EEE 97 is the computer-readable medium of any one of EEE 41 to 59 or 96, wherein the request further comprises a customer identifier, and wherein determining the ordered group of information set identifiers is further based on the customer identifier.

EEE 98 is the computer-readable medium of EEE 97, wherein the customer identifier comprises a technician identifier, a repair shop identifier or a vehicle service tool identifier.

EEE 99 is the method of any one of EEE 60 to 69, wherein the input further comprises a service status indicator, and wherein the request further comprises the service status indicator.

EEE 100 is the method of any one of EEE 60 to 69 or 99, wherein the input further comprises a customer identifier, and wherein the request further comprises the customer identifier.

EEE 101 is the method of EEE 100, wherein the customer identifier comprises a technician identifier, a repair shop identifier or a vehicle service tool identifier.

EEE 102 is the system of any one of EEE 70 to 79, wherein the input further comprises a service status indicator determined by the first VST, and wherein the request further comprises the service status indicator.

EEE 103 is the system of any one of EEE 70 to 79 or 102, wherein the input further comprises a customer identifier, wherein the request further comprises the customer identifier.

EEE 104 is the system of EEE 103, wherein the customer identifier comprises a technician identifier, a repair shop identifier or a vehicle service tool identifier.

EEE 105 is the computer-readable medium of any one of EEE 80 to 89, wherein the input further comprises a service status indicator determined by the first VST, and wherein the request further comprises the service status indicator.

EEE 106 is the computer-readable medium of any one of EEE 80 to 89 or 105, wherein the input further comprises a customer identifier, and wherein the request further comprises the customer identifier.

EEE 107 is the computer-readable medium of EEE 106, wherein the customer identifier comprises a technician identifier, a repair shop identifier or a vehicle service tool identifier.

EEE 108 is the system of any one of EEE 21 to 40 or 93 to 95, further comprising: a housing, wherein at least one of a portion of the at least one processor or a portion of the computer-readable medium is arranged inside the housing.

EEE 109 is the system of any one of EEE 70 to 79 or 102 to 104, further comprising: a housing, wherein at least one of a portion of the at least one processor, a portion of the display, or a portion of the computer-readable medium is arranged inside the housing.

We claim:

1. A method comprising:

receiving, by one or more processors of a server, a request sent from a first vehicle service tool, wherein the request comprises vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles;

determining, by the one or more processors of the server, an ordered group of information set identifiers based on the additional search term, wherein each information set identifier is associated with an information set category;

altering, by the one or more processors of the server, the ordered group of information set identifiers by removing a particular information set identifier from the ordered group of information set identifiers;

determining, by the one or more processors of the server, multiple information sets to populate a response to the request, wherein determining the multiple information sets comprises determining, for each information set identifier of the altered ordered group of information set identifiers, an information set pertaining to (i) the subset of vehicles, (ii) the additional search term, and (iii) the information set category associated with the information set identifier; and transmitting, by the server to the first vehicle service tool, the response to the request, the response comprising data indicative of the altered ordered group of information set identifiers and the determined multiple information sets, wherein (1) altering the ordered group of information set identifiers occurs in response to the one or more processors of the server determining an information set is not available for the particular information set identifier of the ordered group of information set identifiers, or (2) the ordered group of information set identifiers is a default ordered group of information set identifiers and altering the ordered group of information set identifiers occurs in response to the one or more processors of the server determining a difference between (i) a personalized organized group of information set identifiers associated with the first vehicle service tool or a user of the first vehicle service tool, and (ii) the ordered group of information set identifiers.

2. The method of claim 1,
wherein determining the ordered group of information set identifiers based on the additional search term comprises determining, from among multiple selectable ordered groups of information set identifiers, a selectable ordered group of information set identifiers associated with the additional search term,
wherein the multiple selectable ordered groups of information set identifiers comprise a first ordered group of multiple information set identifiers associated with the symptom identifier, but not the vehicle component identifier, a second ordered group of multiple information set identifiers associated with the vehicle component identifier, but not the symptom identifier, and a third ordered group of multiple information set identifiers associated with the symptom identifier and the vehicle component identifier,
wherein the ordered group of information set identifiers comprises (i) the first ordered group of multiple information set identifiers if the additional search term comprises the symptom identifier, but not the vehicle component identifier, (ii) the second ordered group of multiple information set identifiers if the additional search term comprises the vehicle component identifier, but not the symptom identifier, or (iii) the third ordered group of multiple information set identifiers if the additional search term comprises the symptom identifier and the vehicle component identifier, and
wherein each information set identifier in each of the multiple selected ordered groups of information set identifiers is associated with a different category of vehicle service information.

3. The method of claim 2, wherein each of the first ordered group of multiple information set identifiers, the second ordered group of multiple information set identifiers, and the third ordered group of multiple information set identifiers comprise identical information set identifiers, but in a different order.

4. The method of claim 2,
wherein the first ordered group of multiple information set identifiers comprises at least one information set identifier not within either of the second ordered group of information set identifiers and the third ordered group of multiple information set identifiers,
wherein the second ordered group of multiple information set identifiers comprises at least one information set identifier not within either of the first ordered group of multiple information set identifiers and the third ordered group of multiple information set identifiers, and
wherein the third ordered group of multiple information set identifiers comprises at least one information set identifier not within either of the first ordered group of multiple information set identifiers and the second ordered group of information set identifiers.

5. The method of claim 2, further comprising:
determining, by the one or more processors of the server, a set of rules that define a searching order for determining the multiple information sets from within a database of vehicle service information,
wherein if the ordered group of information set identifiers comprises the first ordered group of multiple information set identifiers then the searching order is arranged as the vehicle identifying information and then the symptom identifier or the symptom identifier and then the vehicle identifying information, otherwise if the ordered group of information set identifiers comprises the second ordered group of multiple information set identifiers then the searching order is arranged as the vehicle identifying information and then the vehicle component identifier or the vehicle component identifier and then the vehicle identifying information, or if the ordered group of information set identifiers comprises the third ordered group of multiple information set identifiers then the searching order is arranged as: (i) the vehicle identifying information, then the symptom identifier, and then the vehicle component identifier, (ii) the vehicle identifying information, then the vehicle component identifier, and then the symptom identifier, (iii) the symptom identifier, then the vehicle identifying information, and then the vehicle component identifier, (iv) the symptom identifier, then the vehicle component identifier, and then the vehicle identifying information, (v) the vehicle component identifier, then the vehicle identifying information, and then the symptom identifier, or (vi) the vehicle component identifier, then the symptom identifier, and then the vehicle identifying information, and
wherein determining the multiple information sets comprises searching the database based on the defined searching order.

6. The method of claim 1, further comprising:
determining, by the one or more processors of the server, multiple information set identifiers associated with the additional search term, wherein each information set identifier of the multiple information set identifiers is associated with a respective hierarchical value and a respective information set category; and
determining, by the one or more processors, vehicle service information applicable to the information set category associated with each information set identifier of at least a subset of the ordered group of information set identifiers is available for providing in the response,
wherein determining the ordered group of information set identifiers based on the additional search term comprises ordering each information set identifier of at least the subset of the multiple information set identifiers based on a respective hierarchical value associated with that information set identifier with respect to a respective hierarchical value associated with each other information set identifier of the subset of the multiple information set identifiers.

7. The method of claim 1, wherein the vehicle identifying information comprises: a vehicle manufacturer identifier, and (i) at least one vehicle model year identifier and at least one vehicle model identifier, or (ii) at least one vehicle model year identifier, at least one vehicle model identifier, and at least one engine identifier.

8. The method of claim 1,
wherein a particular information set associated with a particular information set identifier of the altered ordered group of information set identifiers comprises a first article and a link to the first article,
wherein the particular information set comprises vehicle service information for display in an accordion expandable from a first size to a second size and reducible from the second size to the first size,
wherein the second size is larger than the first size,
wherein the link to the first article is displayed in the accordion set to the first size, wherein the method further comprises:
receiving, by the one or more processors, a selection of the link to the first article; and
causing, by the one or more processors in response to receiving the selection, the accordion to expand from the first size to the second size, retrieve the first article from the link to the first article, and display the first article in the accordion set to the second size.

9. The method of claim 1, wherein the multiple information sets comprise at least one information set selected from the group consisting of: a technical service bulletin information set, a component connector information set, a wiring diagram information set, a line routing information set, a remove and replace procedure information set, a component operation information set, a vehicle component calibration information set, a component location information set, an additional replaced part information set, a commonly replaced parts information set, a real-fix tip information set, a specification information set, a common test strategies information set, an OEM code data and test procedure information set, a part and labor information set, an associated vehicle component information set, a post-repair information set, a collision repair information set, a parameter identifier data information set, and a vehicle scan tool function information set.

10. The method of claim 1,
wherein the additional search term comprises at least the symptom identifier,
the method further comprising:
receiving, at the one or more processors of the server, a set of vehicle data sent by a second vehicle service tool, wherein the set of vehicle data comprises the vehicle identifying information, the symptom identifier, and parameter identifier (PID) data generated by a vehicle of the subset of vehicles;
associating, by the one or more processors of the server, the set of vehicle data with tags indicative of the vehicle identifying information, the symptom identifier, and a PID category; and
storing, within a database of information sets, the set of vehicle data and the associated tags,
wherein an information set category associated with a particular information set identifier of the ordered group of information set identifiers comprises the PID category, and
wherein the information set associated with the particular information set identifier comprises the PID data.

11. The method of claim 10, wherein the first vehicle service tool is the second vehicle service tool.

12. The method of claim 1, further comprising:
receiving, at the one or more processors of the server, untagged vehicle service information;
determining, by the one or more processors of the server, at least a portion of the untagged vehicle service information pertains to (i) the subset of vehicles, the symptom identifier or the vehicle component identifier, and (ii) a particular information set category;
generating, by the one or more processors of the server, tagged vehicle service information by associating at least the portion of the untagged vehicle service information with tags indicative of (i) the vehicle identifying information, the symptom identifier, or the vehicle component identifier, and (ii) the particular information set category; and
storing, within a database of information sets, the tagged vehicle service information,
wherein the multiple information sets comprise the tagged vehicle service information.

13. The method of claim 12, wherein the untagged vehicle service information comprises at least one repair order indicative of a prior repair made to a vehicle.

14. The method of claim 1, wherein receiving the request comprises a receiver of the server receiving the request from a communication link by which the server and the first vehicle service tool communicate with each other.

15. The method of claim 1, wherein the data indicative of the ordered group of information set identifiers comprises for each information set identifier of the ordered group of information set identifiers (i) an identifier indicative of the information set or the category associated with the information set identifier, and (ii) a display order position indicative of a display position relative to display positions of other information set identifiers of the ordered group of information set identifiers.

16. The method of claim 1, wherein the symptom identifier comprises a diagnostic trouble code (DTC) identifier.

17. The method of claim 1, further comprising:
receiving, by the first vehicle service tool, the response to the request; and
displaying, by a display of the first vehicle service tool, the ordered group of information set identifiers and at least a portion of the determined multiple information sets received as part of the response to the request.

18. The method of claim 1, wherein the response to the request comprises data for displaying ordered group of information set identifiers and the determined multiple information sets in a particular display format in which vehicle service information of each of the multiple information sets is displayed in a data container of a display page.

19. The method of claim 18, wherein the data container of the display page comprises a display card, a table, a list, or a paragraph.

20. A system comprising:
one or more processors; and
a non-transitory computer-readable medium connected to the processor and comprising program instructions executable by the one or more processors to:
receive a request sent from a first vehicle service tool, wherein the request comprises vehicle identifying information and an additional search term, wherein the additional search term comprises: (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles;
determine an ordered group of information set identifiers based on the additional search term, wherein each information set identifier is associated with an information set category;
alter the ordered group of information set identifiers by removing a particular information set identifier from the ordered group of information set identifiers;
determine multiple information sets to populate a response to the request, wherein determining the multiple information sets comprises determining, for each information set identifier of the ordered group of information set identifiers, an information set pertaining to (i) the subset of vehicles, (ii) the additional search term, and (iii) the information set category associated with the information set identifier; and transmit to the first vehicle service tool the response to the request, the response comprising data indicative of the ordered group of information set identifiers and the determined multiple information sets, wherein (1) altering the ordered group of information set identifiers occurs in response to the one or more processors determining an information set is not available for the particular information set identifier of the ordered group of information set identifiers, or (2) the ordered group of information set identifiers is a default ordered group of information set identifiers and altering the ordered group of information set identifiers occurs in response to the one or more processors determining a difference between (i) a personalized organized group of information set identifiers associated with the first vehicle service tool or a user of the first vehicle service tool, and (ii) the ordered group of information set identifiers.

21. A non-transitory computer-readable medium having stored thereon instructions executable by one or more processors to cause a server to perform functions comprising:

receiving a request sent from a first vehicle service tool, wherein the request comprises vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles;

determining an ordered group of information set identifiers based on the additional search term, wherein each information set identifier is associated with an information set category;

altering, by the one or more processors of the server, the ordered group of information set identifiers by removing a particular information set identifier from the ordered group of information set identifiers;

determining multiple information sets to populate a response to the request, wherein determining the multiple information sets comprises determining, for each information set identifier of the ordered group of information set identifiers, an information set pertaining to (i) the subset of vehicles, (ii) the additional search term, and (iii) the information set category associated with the information set identifier; and transmitting to the first vehicle service tool the response to the request, the response comprising data indicative of the ordered group of information set identifiers and the determined multiple information sets, wherein (1) altering the ordered group of information set identifiers occurs in response to the one or more processors of the server determining an information set is not available for the particular information set identifier of the ordered group of information set identifiers, or (2) the ordered group of information set identifiers is a default ordered group of information set identifiers and altering the ordered group of information set identifiers occurs in response to the one or more processors of the server determining a difference between (i) a personalized organized group of information set identifiers associated with the first vehicle service tool or a user of the first vehicle service tool, and (ii) the ordered group of information set identifiers.

22. A method comprising:

receiving, by one or more processors of a vehicle service tool, an input associated with vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles;

transmitting, by the one or more processors to a server, a request comprising the vehicle identifying information and the additional search term;

receiving, by the one or more processors, a response to the request, the response comprising data indicative of an ordered group of information set identifiers based at least in part on the additional search term and multiple information sets of vehicle service information based on the vehicle identifying information;

customizing, by the one or more processors, the ordered group of information set identifiers based on a learned pattern of vehicle service information selections previously made from multiple different displayable pages including sets of vehicle service information pertaining to ordered groups of information set identifiers, wherein the selections were made by a particular technician, a particular repair shop, or through use of the vehicle service tool, wherein customizing the ordered group of information set identifiers includes adding an information set identifier to the ordered group of information set identifiers, removing a particular information set identifier from the ordered group of information set identifiers, or establishing a different order for the ordered group of information set identifiers; and displaying, by a display connected to the one or more processors, a subset of the multiple information sets of vehicle service information based on the customized ordered group of information set identifiers.

23. The method of claim 22, wherein displaying the multiple information sets of vehicle service information according to the ordered group of information set identifiers comprises displaying, by the display, the multiple information sets of vehicle service information in a particular display format in which vehicle service information of each of the multiple information sets is displayed in a data container of a display page.

24. The method of claim 23, wherein the data container of the display page comprises a display card, a table, a list, or a paragraph.

25. The method of claim 23, wherein the data container of the display page comprises a display card, and wherein displaying the multiple information sets of vehicle service information according to the ordered group of information set identifiers comprises displaying, by the display, a first display card in an unexpanded state, and wherein the method further comprises:
displaying, by the display, a display card resize selector associated with the first display card;
receiving, by the one or more processors, a selection of the display card resize selector while the first display card is displayed in the unexpanded state; and
displaying, by the display in response to the one or more processors receiving the selection of the display card resize selector while the first display card is displayed in the unexpanded state, the first display card in a first expanded state, wherein a size of the first display card is greater when the first display card is displayed in the first expanded state compared to the unexpanded state.

26. The method of claim 25, further comprising:
receiving, by the one or more processors, a selection of the display card resize selector while the first display card is displayed in the first expanded state; and
displaying, by the display in response to receiving the selection of the display card resize selector while the first display card is displayed in the first expanded state, the first display card in a second expanded state or in the unexpanded state,
wherein the size of the first display card is greater when the first display card is displayed in the second expanded state compared to the first expanded state.

27. The method of claim 22,
wherein displaying the multiple information sets of vehicle service information according to the ordered group of information set identifiers comprises displaying, by the display, a first display card including a link to additional displayable content,
wherein the method further comprises:
receiving, by the one or more processors, a selection of the link to the additional displayable content;
receiving, by the one or more processors in response to receiving the selection of the link, the additional displayable content; and
displaying, by the display in response to receiving the selection of the link, the additional displayable content.

28. The method of claim 22, further comprising:
determining, by the one or more processors, feedback data indicative of a selection of an information set or information sets of the multiple information sets displayed on the display; and
outputting, by the one or more processors to a network interface of the vehicle service tool, the feedback data for transmission to the server.

29. The method of claim 28, wherein the selection of an information set comprises a selection of a link within the displayed information set, a selection of a resize selector associated with the information set, a selection of an added-to-report icon associated with the information set, a selection of an add-to-report icon associated with the information set, a selection of an ask-a-community icon associated with the information set, or a selection of a comment icon associated with the information set.

30. The method of claim 22,
wherein the vehicle service tool comprises a connector connectable to a vehicle of the subset of vehicles,
wherein receiving the input associated with the vehicle identifying information and the additional search term comprises receiving, at the one or more processors via the connector connectable to the vehicle of the subset of vehicles, at least one message from the vehicle, and
wherein the at least one message from the vehicle comprises the vehicle identifying information, the additional search term, or the vehicle identifying information and the additional search term.

31. The method of claim 22,
wherein displaying the multiple information sets of vehicle service information comprises displaying a particular information set within an accordion in an unexpanded state, and
wherein at least a portion of the vehicle service information of the particular information set is not visible with the accordion in the unexpanded state.

32. A system comprising:
one or more processors of a vehicle service tool;
a display connected to the one or more processors; and
a non-transitory computer-readable medium connected to the one or more processors and comprising program instructions executable by the one or more processors to:
receive an input associated with vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles;
transmit, to a server, a request comprising the vehicle identifying information and the additional search term;
receive a response to the request, the response comprising data indicative of an ordered group of information set identifiers based at least in part on the additional search term and multiple information sets of vehicle service information based on the vehicle identifying information;
customize the ordered group of information set identifiers based on a learned pattern of vehicle service information selections previously made from multiple different displayable pages including sets of vehicle service information pertaining to ordered groups of information set identifiers, wherein the selections were made by a particular technician, a particular repair shop, or through use of the vehicle service tool, wherein customizing the ordered group of information set identifiers includes adding an information set identifier to the ordered group of information set identifiers, removing a particular information set identifier from the ordered group of information set identifiers, or establishing a different order for the ordered group of information set identifiers; and
display, by the display, a subset of the multiple information sets of vehicle service information based on the customized ordered group of information set identifiers.

33. A non-transitory computer-readable medium having stored thereon instructions executable by one or more processors to cause a vehicle service tool to perform functions comprising:
receiving an input associated with vehicle identifying information and an additional search term, wherein the additional search term comprises (i) a symptom identifier, but not a vehicle component identifier, (ii) the vehicle component identifier, but not the symptom identifier, or (iii) the symptom identifier and the vehicle component identifier, wherein the vehicle identifying information identifies a subset of vehicles within a set of all vehicles, wherein the symptom identifier identifies a symptom exhibitable within each vehicle of the subset of vehicles, and wherein the vehicle component identifier identifies a component on each vehicle of the subset of vehicles;

transmitting, to a server, a request comprising the vehicle identifying information and the additional search term;

receiving a response to the request, the response comprising data indicative of an ordered group of information set identifiers based at least in part on the additional search term and multiple information sets of vehicle service information based on the vehicle identifying information;

customize, the ordered group of information set identifiers based on a learned pattern of vehicle service information selections previously made from multiple different displayable pages including sets of vehicle service information pertaining to ordered groups of information set identifiers, wherein the selections were made by a particular technician, a particular repair shop, or through use of the vehicle service tool, wherein customizing the ordered group of information set identifiers includes adding an information set identifier to the ordered group of information set identifiers, removing a particular information set identifier from the ordered group of information set identifiers, or establishing a different order for the ordered group of information set identifiers; and displaying, by a display connected to the one or more processors, a subset of the multiple information sets of vehicle service information based on the customized ordered group of information set identifiers.

* * * * *